US012609251B2

(12) United States Patent
Ng et al.

(10) Patent No.: US 12,609,251 B2
(45) Date of Patent: Apr. 21, 2026

(54) STRUCTURAL SUPERCAPACITORS WITH REINFORCED INTERFACES TO INCREASE MULTIFUNCTIONAL EFFICIENCY

(71) Applicant: THE REGENTS OF THE UNIVERSITY OF CALIFORNIA, Oakland, CA (US)

(72) Inventors: Tse Nga Ng, San Diego, CA (US); Lulu Yao, Fremont, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 93 days.

(21) Appl. No.: 18/391,126

(22) Filed: Dec. 20, 2023

(65) Prior Publication Data

US 2024/0222036 A1    Jul. 4, 2024

Related U.S. Application Data

(60) Provisional application No. 63/436,216, filed on Dec. 30, 2022.

(51) Int. Cl.
*H01G 11/32* (2013.01)
*H01G 11/58* (2013.01)

(52) U.S. Cl.
CPC ............. *H01G 11/32* (2013.01); *H01G 11/58* (2013.01)

(58) Field of Classification Search
None
See application file for complete search history.

(56) References Cited

U.S. PATENT DOCUMENTS 5,597,661 A * 1/1997 Takeuchi ........... C08G 65/3322
                                                252/500
5,665,490 A * 9/1997 Takeuchi ............... H01B 1/122
                                                29/25.03
(Continued)

FOREIGN PATENT DOCUMENTS

CN         107275119 B   * 12/2018
EP             2270909 A1 * 1/2011   ............. H01G 11/86

OTHER PUBLICATIONS

Wang et al., "Wide Potential Windo Supercapacitors Using Open-Shell Donor-Acceptor Conjugated Polymers with Stable N-Doped States," Advanced Energy Materials (2019), DOI: 10.1002/aenm. 201902806, 8 pages.

*Primary Examiner* — Dion R. Ferguson
(74) *Attorney, Agent, or Firm* — Sheppard, Mullin, Richter & Hampton LLP

(57) ABSTRACT

Embodiments of the presently disclosed technology provide improved structural supercapacitors that increase multifunctional efficiency (i.e., improve energy-storage and mechanical load-bearing capacity/performance). Structural supercapacitors of the present technology achieve such improvements in part by focusing on interfaces between structural electrodes and structural electrolytes. For example, the present technology can provide improved structural electrodes by coating carbon fiber-based structures with a uniquely stable conjugated redox polymer and a carbon-based compound. Such coating (at the interface between the structural electrode and a structural electrolyte) can improve and tensile strength for the structural electrode. The present technology can also provide improved structural electrolytes that leverage a "gradient" configuration for a structural electrolyte where composition of the structural electrolyte is tuned such that regions of the structural electrolyte immediately adjacent to structural electrodes (Continued)

incorporate a higher concentration of an ion-conducting polymer and salt than "middle" regions of the structural electrolyte.

20 Claims, 92 Drawing Sheets

(56) References Cited

U.S. PATENT DOCUMENTS

| | | | | |
|---|---|---|---|---|
| 9,831,045 B2 * | 11/2017 | Hucker | ................. | H01G 11/58 |
| 10,147,557 B2 * | 12/2018 | Hudak | ................. | C09D 179/00 |
| 11,004,618 B2 * | 5/2021 | El-Kady | ................. | H01G 11/32 |
| 2023/0087931 A1 * | 3/2023 | Ng | ................. | C08K 3/042 |
| | | | | 252/511 |
| 2024/0222036 A1 * | 7/2024 | Ng | ................. | H01G 11/48 |

* cited by examiner

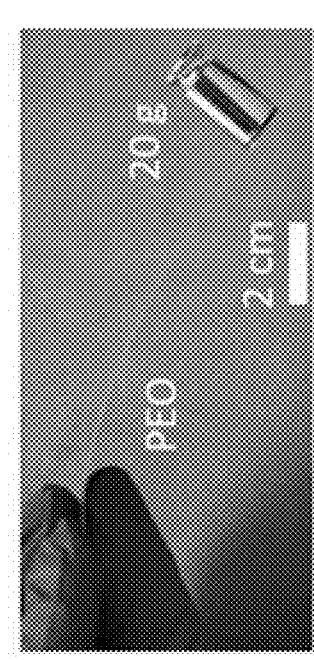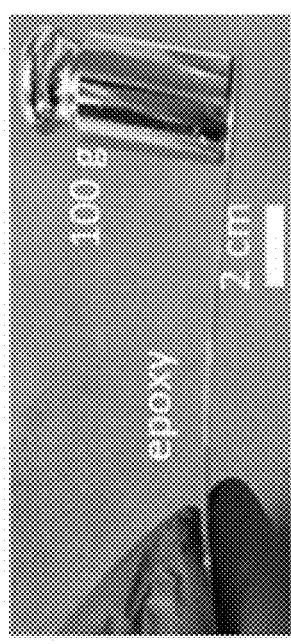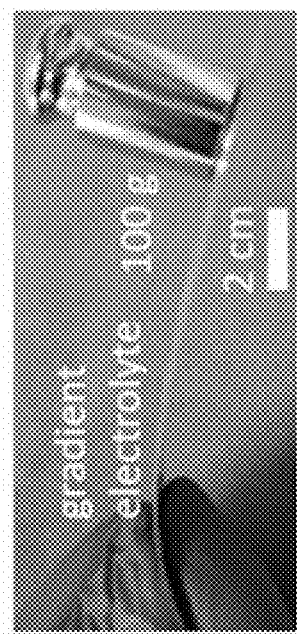
FIG. 17

2010

Energy density and tensile modulus of state-of-the-art structural supercapacitors. The efficiency $\eta_E$ was calculated with $E_{typ}$ = 2.5 Wh kg⁻¹ and $\eta_M$ with $M_{typ}$ = 31.5 GPa. The letter labels correspond to VG, vertical graphene; PANI, polyaniline; CAG, carbon aerogel.

| Electrode materials (reference) (label) | Energy density (Wh kg⁻¹) | Tensile modulus (GPa) | $\eta_E$ | $\eta_M$ | $\eta_{mult}$ |
|---|---|---|---|---|---|
| 2L OxTh-rGO-CF (this work) | 1.369 | | 0.548 | | 0.872 |
| 9L OxTh-rGO-CF (this work) | 1.823 | 10.2 | 0.729 | 0.324 | 1.053 |
| H-9L OxTh-rGO-CF (this work) | 2.443 | | 0.977 | | 1.301 |
| CF-ZnO (14) (a) | 1.562 | 21 | 0.062 | 0.667 | 0.729 |
| CF-VG-MnO₂ (54) (b) | 0.0122 | 4.313 | 0.0049 | 0.137 | 0.142 |
| PANI-CF (55) (c) | 0.0494 | 0.907 | 0.020 | 0.0288 | 0.0485 |
| Graphene-CF (56) (d) | $6.6 \times 10^{-5}$ | 20.72 | $2.66 \times 10^{-5}$ | 0.658 | 0.658 |
| CAG-CF (57) (e) | 0.093 | 33.9 | 0.037 | 1.045 | 1.082 |

FIG. 20

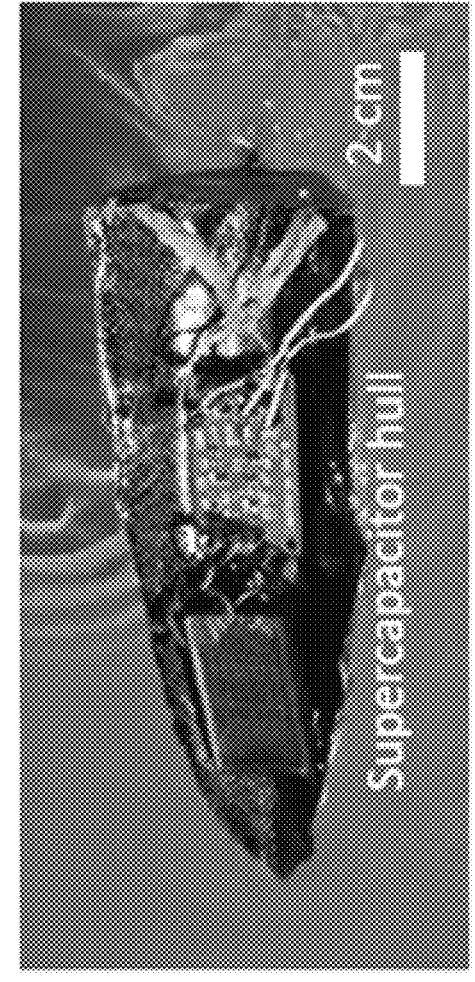
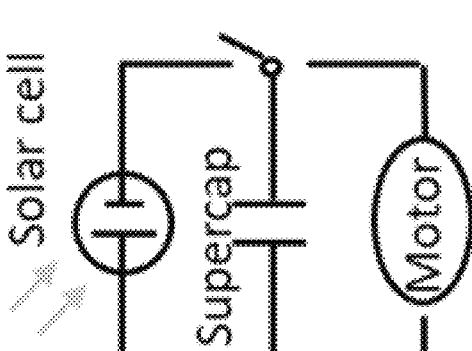
FIG. 23

| Nominal QxTh-rGO loading (mg) | Measured QxTh-rGO loading (mg) | Total electrode mass (mg) | Specific capacitance of Cathode (F/g) | Specific capacitance of Anode (F/g) |
|---|---|---|---|---|
| 0.25 | 0.254 | 10.18 | 3.62 | 5.82 |
| 0.5 | 0.59 | 10.52 | 8.12 | 12.15 |
| 1 | 0.99 | 10.92 | 13.17 | 21.45 |
| 1.5 | 1.37 | 11.30 | 17.58 | 32.71 |
| 2 | 1.79 | 11.72 | 22.13 | 43.72 |
| 2.5 | 2.10 | 12.03 | 25.36 | 51.01 |
| 3 | 3.04 | 12.97 | 34.00 | 64.04 |

FIG. 36

| Electrode Materials, in reference [#] | Tensile strength (MPa) | Tensile Modulus (GPa) | Electrode capacitance (F g⁻¹) | Potential Window (V) | Capacity retention after # of redox cycles |
|---|---|---|---|---|---|
| QxTh-rGO on CF (this work) | 4500 | 103 | 65 | 3 | 96.1% at 10k |
| CF (measured in this work) | 4300 | 84 | 0.16 | 3 | not measured |
| MXene Ti₃C₃Tₓ/ANF[1] | 104 | 1.42 | 278 | 0.8 | 91% at 10k |
| CNT/ANF[2] | 53 | 5.4 | 135 | 0.8 | 98.4% at 5k |
| MXene/CNF[3] | 341 | 20.2 | 298 | 0.9 | ~100% at 10k |
| Mxene/rGO/AD[4] | 699 | 5.8 | 269 | 0.8 | 98% at 17k |
| rGO/ANF[5] | 101 | 14 | 125 | 1 | 93% at 1k |
| Cu-Co-Se on woven carbon fiber[6] | 481 | 32.7 | 28 | 1 | 96.5% at 2k |
| Carbon Nanofibers[7] | 900; 700 | 38.1; 15.9 | 25; 100 | 1; 1 | 80% at 4k; 91% at |

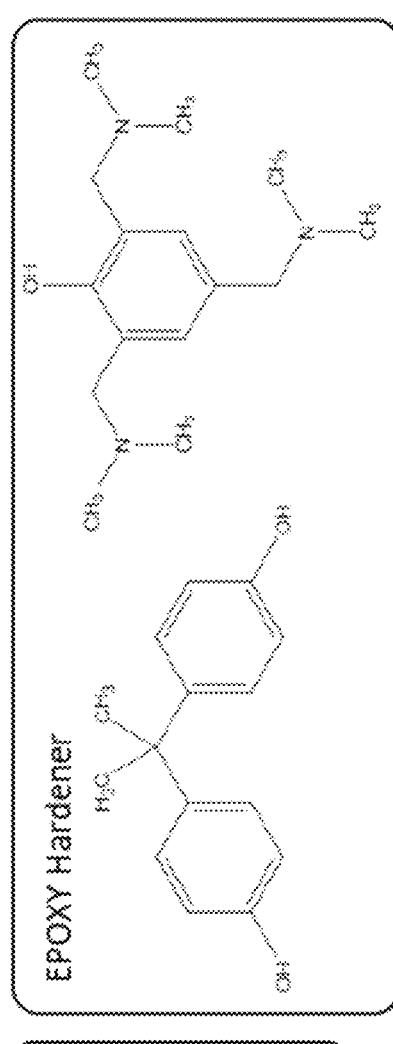
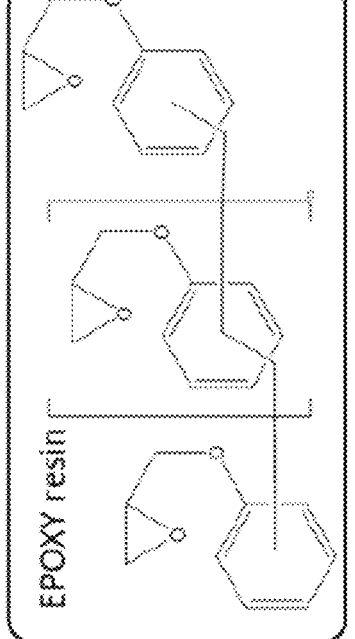
FIG. 57

| PEO % | Salt % | Ionic conductivity (mS/cm) |
|---|---|---|
| 0 | 6 | 0.01 |
| 0 | 16 | 0.04 |
| 19 | 5 | 0.06 |
| 6 | 6 | 0.05 |
| 10 | 5 | 0.14 |
| 5 | 10 | 0.21 |
| 10 | 10 | 0.35 |
| 18 | 9 | 0.37 |
| 10 | 14 | 0.33 |
| 10 | 18 | 0.4 |
| 31 | 7 | 0.17 |
| 35 | 7 | 0.24 |
| 32 | 4 | 0.06 |

| Materials [reference #] | Power Density (W kg⁻¹) | Energy Density (Wh kg⁻¹) | Stability, %capacitance retention after # of redox cycles | Tensile strength (MPa) | Tensile modulus (GPa) | Flexural strength (MPa) | Flexural modulus (GPa) | Potential window (V) | Device (d) or electrode only (e) |
|---|---|---|---|---|---|---|---|---|---|
| 2L QxTh-rGO@CF (this work) | 34.6 | 1,369 @35 W/kg | 100% @2k; 84% @10k (3 V); 83.3% 35k (2.1 V) | 167 | 10.2 | 91 | 16 | 3 | d |
| 9L QxTh-rGO@CF (this work) | 22.9 to up to 1025 | 0.058 @1019 W/kg; 1.823 @22.897 W/kg | — | — | — | — | — | 3 | d |
| H-9L QxTh-rGO@CF (this work) | 17.8 to up to 585 | 0.176 @1025 W/kg; 2.443 @17.75 W/kg; 0.21@585 W/kg | — | — | — | — | — | 3 | d |
| CF-VG-MnO₂ [¹] | 2.21 | 0.0122 | | 85.6 | 4.31 | 32 | 2.44 | 0.8 | d |
| PANI-CF [²] | 58.4 | 0.494 | | 5.1 | 0.9 (shear G₁₂) | — | — | 1 | d |

| Materials [reference #] | Power Density (W kg⁻¹) | Energy Density (W h kg⁻¹) | Stability, %capacitance retention after # of redox cycles | Tensile strength (MPa) | Tensile modulus (GPa) | Flexural strength (MPa) | Flexural modulus (GPa) | Potential window (V) | Device (d) or electrode only (e) |
|---|---|---|---|---|---|---|---|---|---|
| CAG-CF [10] | 5.2 | 0.093 | — | 110 | 32.9 | — | — | 3 | d |
| ACF [11] | 0.788 | 0.0000366 | — | 110 | 33 | — | — | 1 | d |
| CF [12] | — | — | 96% @6k | 47.5 | 8.47 | 47.49 | 8.48 | 0.4 | d |
| ACF [13] | 34.4 | 0.01177 | — | — | — | — | — | — | d |
| Pure CF [13] | 35.2 | 0.0205 | — | 1.75 | — | — | — | — | d |
| CF [14] | 10 | 2.640 | 84% @2k | 80 | — | — | — | 1 | d |
| CAG-CF [15] | 42.3 | 0.190 | 90% @900 | — | — | — | — | 2.7 | d |
| AC-CF [16] | 233 | 7130 in gel electrolyte, only an electrode, not a device | 90% @1k | 257.8 | 23.2 | — | — | 3 | e |
| CF-ZnO [17] | 19.9 | 156.2 | 93.2% @2.5k | 325 | 21 | — | — | 0.5 | e |
| WCF, Cu0.5Co0.5 Se [?] | 36.7 | 0.1916 | 96.5% @2k | 488.9 | 32.65 | — | — | 0.5 | e |
| N-doping ZnCuSe@ CF [18] | 39.2 | 1930 in ionic liquid electrolyte | 82.4% @4k | 454.0 | 35.29 | — | — | 1 | e |

9L Structure:

Single-Sided Coating On
the Outer Two Layers;

Double-Sided Coating On
Inner Layers

2L Structure:
Single-Sided Coating

☐ QXTH-RGO Anode
▨ Separator
▨ QxTh-rGO Cathode
☐ Carbon Fiber

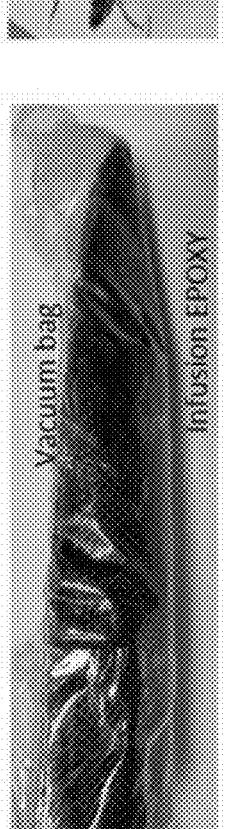
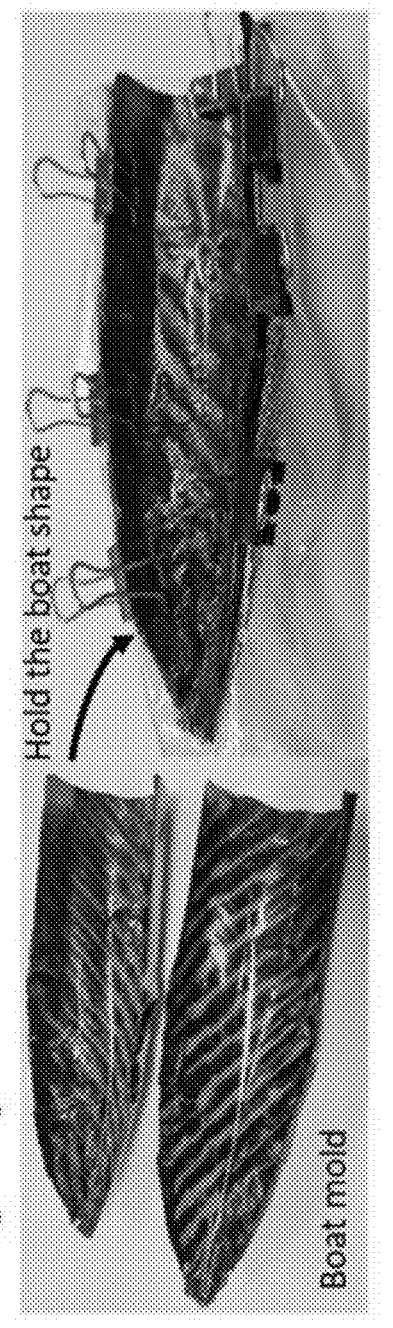
FIG. 82

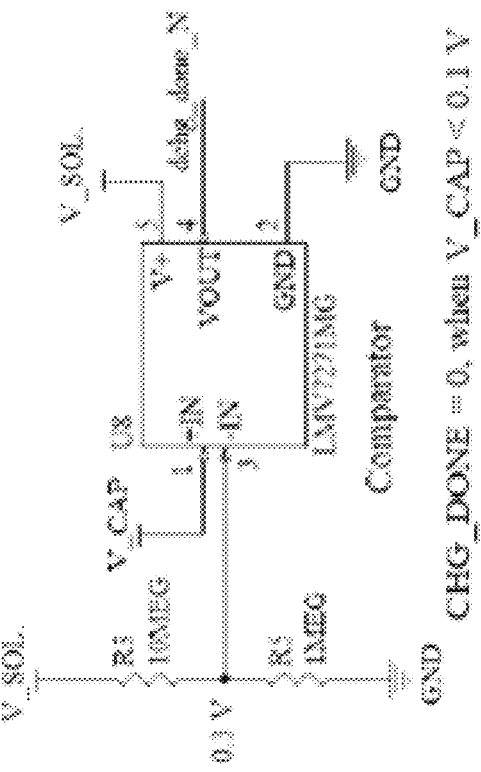
CHG_DONE = 0, when V_CAP < 0.1 V
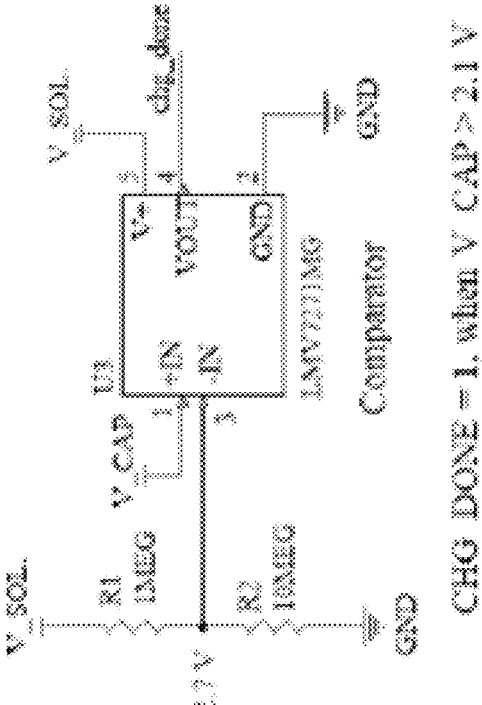
CHG_DONE = 1, when V_CAP > 2.1 V
FIG. 83A Specific masses and dimensions of electrodes and devices used for calculations of gravimetric capacitance and energy/power densities.

| Component masses | Dimensions | Notes |
|---|---|---|
| CF: 9.9 mg; loading of OxTh-rGO showed in table 51 | All are round samples with 1 cm diameter | Gravimetric capacitance accounted for weights of both CF substrate and redox active materials |
| Cathode: 15.57 mg (CF with 3-mg OxTh-rGO); anode: 14.32 mg (CF with 2-mg OxTh-rGO); cellulose separator: 1.02 mg; electrolyte: PEO = 35.8 mg, uniform = 46.6 mg, gradient = 45.12 mg | Area of 1 cm by 1 cm | Calculations of gravimetric capacitance and energy/power densities included all components of electrodes, separator, and electrolyte conductive tape as contact leads, sealed by PET film |
| Electrodes: OxTh-rGO (4.5 mg cathode and 3 mg anode) on 2 CF pieces (together 36.06 mg); cellulose separator: 1.97 mg; gradient electrolyte: 75.48 mg | Capacitor area of 1 cm by 1.5 cm, with the thickness roughly about 0.56 mm | Samples sealed by PET film |
| 9L device: for each CF layer, OxTh-rGO loading is 2/mg on each side of cathode: 1.9 mg on each side of anode: 1.26 mg for each CF piece; H9L device: for each CF layer, OxTh-rGO loading is 6.2 mg on each side of cathode: 4.1 mg on each side of anode: total mass of devices: 2L device: 75 mg; 9L device: 343 mg (2× 15.3 mg single-sided cathode + 3× 18-mg double-sided cathode + 4× 16.3-mg double-sided anode: 8× 1.02-mg separators; gradient electrolyte = 185 mg); H9L device: 485 mg (2× 18.8 mg for single-sided cathode + 3× 25 mg for double-sided cathode + 4× 20.8-mg double-sided anode; 8× 1.02-mg separators; gradient electrolyte: 232 mg) | Area of 1 cm by 1 cm | Conductive tape as contact leads, sealed by PET film |
| Boat prototype: 2.72 F structural supercapacitor: 2L configuration = 25.1 g, not including encapsulation | Boat length around 15 cm | Encapsulation: 11 g; solar cell: 3 V, 20 mA; motor 3.7 V, 30,000 rpm |

STRUCTURAL SUPERCAPACITORS WITH REINFORCED INTERFACES TO INCREASE MULTIFUNCTIONAL EFFICIENCY

REFERENCE TO RELATED APPLICATION

The present application claims priority to U.S. Provisional Patent Application No. 63/436,216, filed Dec. 30, 2022 and titled "STRUCTURAL SUPERCAPACITORS WITH REINFORCED INTERFACES TO INCREASE MULTI-FUNCTIONAL EFFICIENCY," which is incorporated herein by reference in its entirety.

STATEMENT REGARDING FEDERALLY SPONSORED R&D

This invention was made with government support under Grant No. PFI-TT 2120103, awarded by the National Science Foundation. The government has certain rights in the Invention.

TECHNICAL FIELD

Various embodiments generally relate to supercapacitors. More particularly, various embodiments are related to structural supercapacitors with reinforced interfaces to increase multifunctional efficiency.

DESCRIPTION OF THE RELATED ART

Today's electrochemical storage devices can be limited in electric storage capacity, a key challenge that limits operational time of wireless devices and invokes range anxiety in the electric transportation sector.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 17 depicts example photographs showing deflection of example supercapacitors during example experiments carried out in accordance with embodiments of the disclosed technology.

FIG. 20 depicts a table illustrating data from example experiments carried out in accordance with embodiments of the disclosed technology.

FIG. 23 depicts an example model boat hull constructed using structural supercapacitors, in accordance with embodiments of the disclosed technology.

FIG. 36 depicts an example table illustrating data from example experiments carried out in accordance with embodiments of the disclosed technology.

FIG. 56 depicts an example table illustrating data from example experiments carried out in accordance with embodiments of the disclosed technology.

FIG. 57 depicts an example diagram, in accordance with embodiments of the disclosed technology.

FIG. 60 depicts an example table illustrating data from example experiments carried out in accordance with embodiments of the disclosed technology.

FIGS. 73A-73B depict an example table illustrating data from example experiments carried out in accordance with embodiments of the disclosed technology.

FIG. 82 depicts an example sealing process to encapsulate the structural supercapacitor boat hull, in accordance with embodiments of the presently disclosed technology.

FIGS. 83A-83B depict example circuit diagrams and an example photograph, in accordance with embodiments of the presently disclosed technology.

FIG. 90 depicts an example table illustrating data from example experiments carried out in accordance with embodiments of the disclosed technology.

DETAILED DESCRIPTION OF THE EMBODIMENTS

Figure 1:
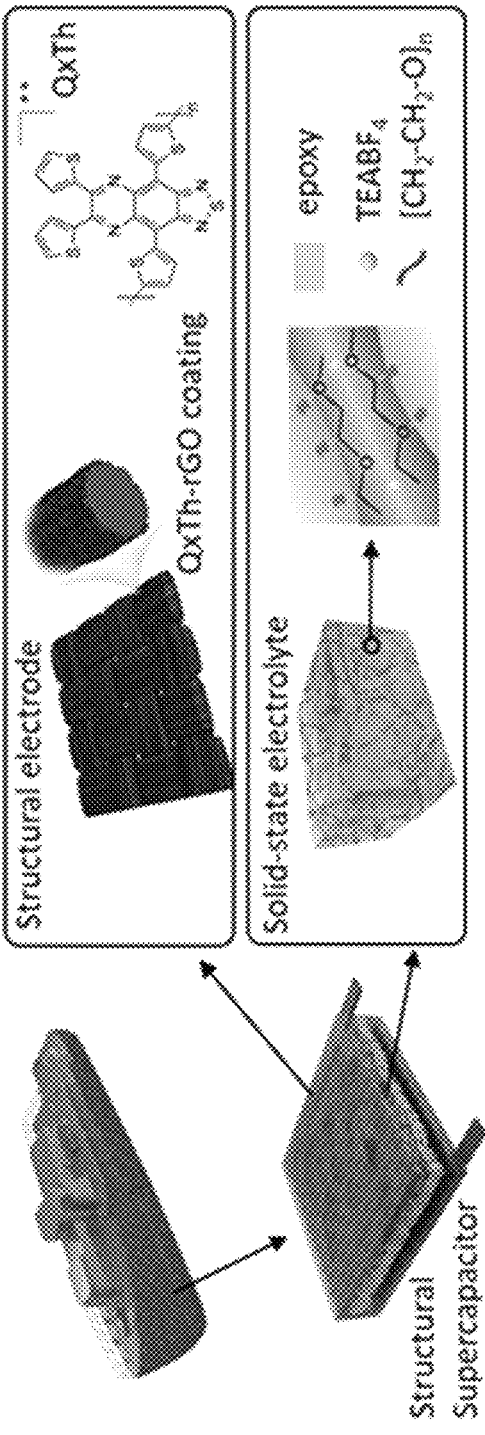
FIG. 1 depicts example schematics of a structural supercapacitor, in accordance with embodiments of the disclosed technology.

Structural supercapacitors can significantly expand the energy storage capacity of a system by integrating mechanical load-bearing and energy-storage functions in a multifunctional structure. In other words, structural supercapacitors that perform both energy-storage and mechanical load-bearing functions can achieve increased energy-storage capacity and weight savings by satisfying "two needs with one deed." Structural supercapacitors can be especially valuable in electric transportation applications (e.g., applications involving electrically powered vehicles)—where increased energy-storage capacity can improve travel range and weight savings can reduce overall energy consumption (thereby also increasing travel range).

For example, carbon fibers used for structural reinforcement also exhibit good conductivity. Accordingly, carbon fibers could be used in a structural supercapacitor that incorporates both electrochemical and mechanical load-bearing functions. In particular, carbon fibers can serve as mechanical load-bearing electrode scaffolds. The electrode scaffolds can be stacked with separators and electrolytes to complete a mechanical load-bearing electrochemical cell (i.e., a structural supercapacitor). Such a structural supercapacitor incorporates both electrochemical and mechanical functions—and could be particularly attractive to aviation and marine industries where structural composites are already prevalent. For example, such a structural supercapacitor (in combination with similar structural supercapacitors) could be used to construct the hull of a boat—while at the same time storing energy used to power the boat.

However, designing a structural supercapacitor (i.e., a multi-functional electrochemical storage device that performs both energy-storage and mechanical load-bearing functions) can be a significant challenge. This is in part because in many cases design features which improve electrochemical performance/efficiency reduce mechanical load-bearing performance/efficiency, or vice versa.

For example, for many existing structural electrodes (utilized in structural supercapacitors), there is a trade-off between mechanical strength and specific capacitance. For instance, in certain existing structural electrodes, carbon fiber electrodes are treated by chemical activation processes at high temperature in order to increase specific capacitance. However, such treatment can reduce structural strength due to damaged carbon fibers. As another example, some existing structural electrodes modify the surface of carbon fibers with carbon aerogel or metal oxide in order to improve specific capacitance. However such treatment does not generally contribute to mechanical reinforcement.

Designing structural electrolytes (also utilized in structural supercapacitors) can also be a significant challenge. Ionic conductivity is typically inversely proportional to the mechanical modulus of the composite. Accordingly, many existing structural electrolyte designs (i.e., electrolyte designs that perform mechanical load-bearing functions) suffer from low ionic conductivity that can lead to loss of energy and power density as charge exchange sites are substantially inaccessible. In certain existing structural electrolyte designs, cross-linked epoxy resins are used in matrices for laminates and have been blended with ionic-liquid salts to form phase-segregated structural electrolytes. However, mechanical moduli for these cross-linked epoxy resins can be drastically diminished due to disruptions to cross-linking. Meanwhile, epoxy matrices with low salt content may demonstrate improved mechanical properties at a cost of decreased ionic conductivity. Some existing designs add silica or alumina fillers to increase ion diffusion paths, however such improvements are generally incremental and the associated low ionic conductivity can still be severely limiting, resulting in a peak power an order of magnitude less than typical mono-functional devices.

As described above, designing a structural supercapacitor (i.e., a multi-functional electrochemical storage device that performs both energy-storage and mechanical load-bearing functions) can be a significant challenge. This is in part because in many cases design features which improve electrochemical performance/efficiency reduce mechanical load-bearing performance/efficiency, or vice versa. Thus, structural supercapacitors often lag behind their mono-functional counterparts (i.e., supercapacitors performing only energy-storage functions) in terms of energy-storage capacity/efficiency. Accordingly, supercapacitor designs/configurations that resolve the conventional trade-off between improving electrochemical performance/efficiency and improving mechanical load-bearing performance/efficiency would be highly desirable.

Against this backdrop, the present technology provides improved structural supercapacitors that increase multi-functional efficiency (i.e., improve energy-storage and mechanical load-bearing capacity/performance). In some cases, structural supercapacitors of the present technology can provide energy-storage capacity comparable to their mono-functional counterparts.

Structural supercapacitors of the present technology achieve such improvements in part by focusing on interfaces between structural electrodes and structural electrolytes (see e.g., FIG. 1).

For example, the present technology can provide improved structural electrodes by coating carbon fiber-based structures (e.g., a carbon fiber weave, a carbon fiber fabric, etc.) with a uniquely stable conjugated redox polymer (e.g., a stable conjugated open shell redox polymer such as poly-4,6,7,9-tetra(thiophen-2-yl)-[1,2,5]thiadiazolo[3,4-g] quinoxaline (QxTh)) and a carbon-based compound (e.g., graphene oxide (rGO)). Such coating (at the interface between the structural electrode and a structural electrolyte) can improve both pseudocapacitive capacitance (associated with improved energy-storage) and tensile strength (associated with improved mechanical load-bearing) for the structural electrode. For instance, such a conjugated redox polymer-carbon-based compound coating can contribute Faradaic charge storage with a large 3 V potential window and raise specific capacitance significantly compared to prior structural electrodes. In certain embodiments, in addition to above-described favorable electronic properties, the conjugated redox polymer-carbon-based compound coating can enhance mechanical moduli of the of a structural electrode due to sulfur-containing moieties that can form hydrogen bonds or react with cross-linkers in a structural electrolyte.

The present technology can also provide improved structural electrolytes by again focusing on the interface between structural electrode and structural electrolyte. For example, the present technology can leverage a "gradient" configuration for a structural electrolyte where composition of the structural electrolyte (e.g., composition of a structural electrolyte comprising an epoxy resin, an ion-conducting polymer, and a salt) is tuned such that regions of the structural electrolyte immediately adjacent to structural electrodes (i.e., regions in close proximity to the structural electrolyte-structural electrode interface) incorporate higher concentrations of salt than "middle" regions of the structural electrolyte more remote from structural electrolyte-structural electrode interfaces. In other words, such a gradient configuration may comprise a structural electrolyte with increasing concentration of salt with increasing proximity to structural electrolyte-structural electrode interfaces. In certain embodiments, the above-described gradient configuration may also comprise the structural electrolyte with increasing concentration of ion-conducting polymer (e.g., polyethylene oxide (PEO)) with increasing proximity to structural electrolyte-structural electrode interfaces.

Here, such a gradient configuration strategically addresses the conventional trade-off between improving ionic conductivity (associated with increasing concentrations of salt and ion-conducting polymer—which facilitate increasing electrolyte salt access and promote fast kinetics) and improving mechanical modulus (associated with reducing concentrations of salt and ion-conducting polymer as increasing concentrations of salt and ion-conducting polymer generally reduce structural integrity) for a structural electrolyte. Through such a gradient configuration, structural electrolytes of the present technology can improve ionic conductivity in regions where increased ionic conductivity most impacts electrochemical kinetics of a structural supercapacitor (i.e., at the interfaces between structural electrode and structural electrolyte)—while improving mechanical load-bearing properties of the structural electrolyte in regions of the structural electrolyte where ionic conductivity for the structural electrolyte is relatively less important (i.e., "middle" regions of the structural electrolyte located further from interfaces with a structural electrode). In other words, the present technology tunes a structural electrolyte such that regions immediately adjacent to structural electrodes comprise a higher concentration of salt (and in some cases a higher concentration of ion-conducting polymer) at the structural electrode-structural electrolyte interface (thereby increasing electrolyte salt access and promoting fast kinetics at the structural electrode-structural electrolyte interface), whereas the middle region contains a lower concentration of salt (and in some cases a lower concentration of ion-conducting polymer) to better support mechanical load transfer while still maintaining ion percolation.

As alluded to above, the present technology provides improved structural electrodes and improved structural electrolytes, which can be combined in an improved structural supercapacitor.

Referring again to the improved structural electrodes, such structural electrodes may comprise carbon fiber-based structures (e.g., a carbon fiber weave, a carbon fiber fabric, etc.) coated with a uniquely stable conjugated redox polymer (e.g., a stable conjugated open shell redox polymer such as poly-QxTh) and a carbon-based compound (e.g., rGO). Here, it should be understood that the conjugated redox polymer (e.g., poly-QxTh) is a highly unique polymer with desirable energy-storage and mechanical load-bearing properties. As used herein, a conjugated redox polymer may refer to a redox polymer having a conjugated backbone. A conjugated backbone for a polymer may refer to a connection, in alternating single and double bonds, of n-orbitals of the monomers that form the polymer. An open-shell redox polymer may refer to a polymer (comprised of a plurality of monomers) that includes unpaired electrons when the polymer is in a ground state. In accordance with the present technology, a conjugated backbone for an open-shell redox polymer may facilitate delocalization of the unpaired electrons of the open-shell redox polymer—thereby stabilizing the open-shell redox polymer. In other words, such delocalization of unpaired electrons facilitated by the conjugated backbone can improve conventional/existing open-shell redox polymers which are often unstable due to their highly reactive, localized radical sites—historically limiting their practical implementation in devices such as electrodes. However, as alluded to above, embodiments of the present technology can leverage a new/unique class of open-shell redox polymers which feature a high degree of electronic coherence along their conjugated backbones. This electronic coherence promotes extensive delocalization and thermodynamic stabilization of unpaired electrons/spins, making it possible to increase potential window to 3 V with 80% capacitance retention after 5000 cycles. As will be described in greater detail below, a stable conjugated open shell redox polymer-carbon-based compound coating can also provide additional/unique mechanical reinforcement for the structural electrode. For instance, in example experiments, the maximum tensile strength (stress-to-failure point) of a stable conjugated open shell redox polymer-carbon-based compound-coated carbon fiber-based structure was higher than for a counterpart uncoated carbon fiber-based structure. Accordingly, such example experiments demonstrate that embodiments of the present technology can provide structural electrodes with improved energy-storage capacity/performance and improved mechanical load-bearing capacity performance.

Further details regarding embodiments of the present technology (including details regarding example experiments/example proof-of-concept experiments) follow.

Structural Electrodes

As alluded to above, structural electrodes of the present technology may be fabricated by coating a carbon fiber (CF)-based structure (e.g., a carbon fiber weave, a carbon fiber fabric, etc.) with a conjugated redox polymer (e.g., a stable conjugated open shell redox polymer such as poly-4,6,7,9-tetra(thiophen-2-yl)-[1,2,5]thiadiazolo[3,4-g]quinoxaline (poly-QxTh)) and a carbon-based compound (e.g., reduced graphene oxide (rGO)). The coating may be prepared by electrodeposition, in which a solution mixture of the carbon-based compound and monomers that form the conjugated redox polymer are film-coated (as used herein, film-coating may refer to techniques for depositing a thin layer of polymeric material onto a film/substrate and may include techniques such as drop-cast coating) onto the carbon fiber-based structure and reacted by cathodic electro-polymerization to form a pseudocapacitive coating. In certain embodiments, the stable open-shell conjugated redox polymer poly-QxTh may be selected as the conjugated redox polymer because of its high specific capacitance (297.6 F $g^{-1}$) and stability over a wide potential window of 3 V due to its open-shell characteristics. In some embodiments, rGO may be selected as the carbon-based compound to enhance the conductivity and porosity of the coating. Accordingly, in the example experiments described below, poly-QxTh was selected as the conjugated redox polymer and rGO was selected as the carbon-based compound. However, it should be understood that in various implementations different conjugated redox polymers and different carbon-based compounds may be used.

Figure 2:
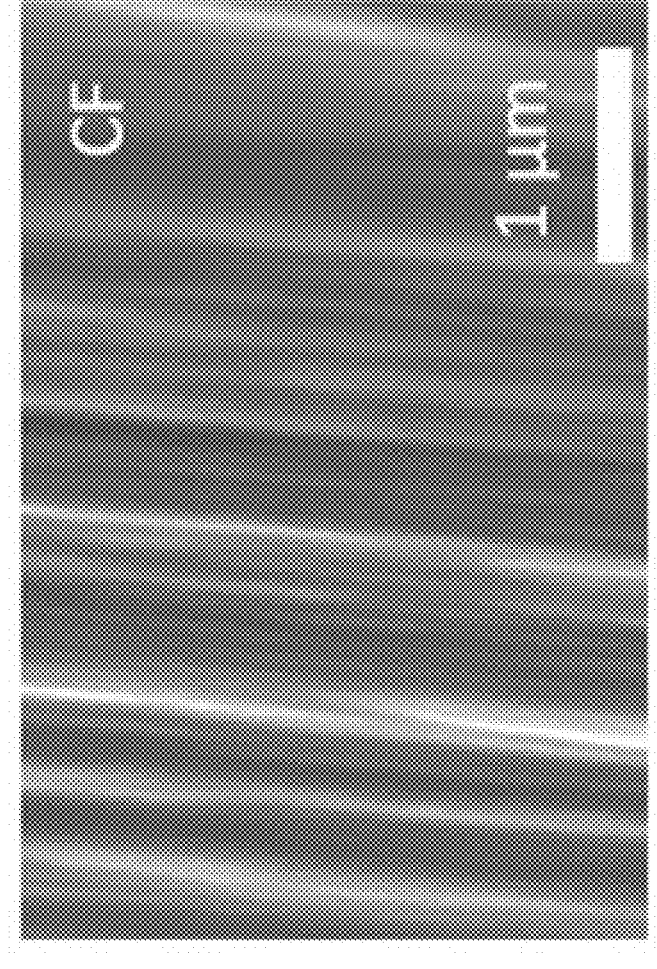
FIG. 2 depicts an example SEM image from an example experiment carried out in accordance with embodiments of the disclosed technology.
Figure 3:
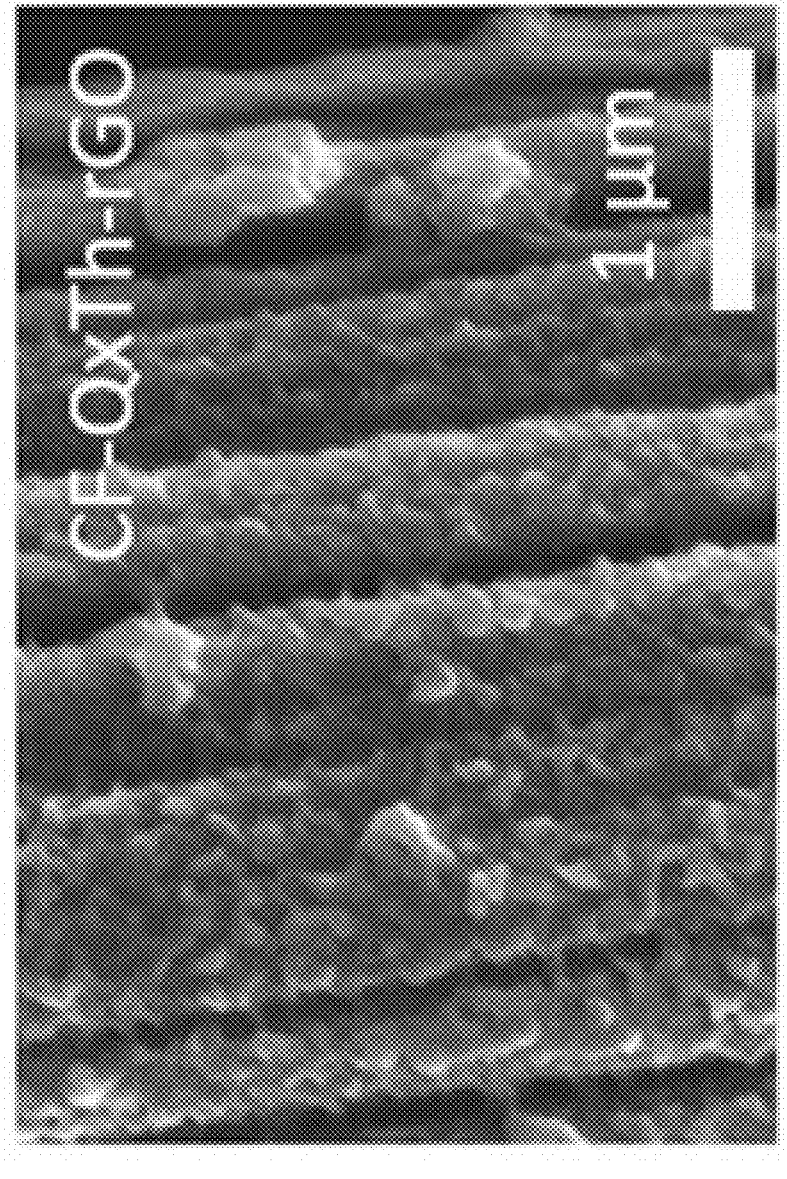
FIG. 3 depicts another example SEM image from an example experiment carried out in accordance with embodiments of the disclosed technology.

As seen in the scanning electron microscopy (SEM) images of FIG. 2, in example experiments the surface of the uncoated CF-based structure was smooth. However, after the polymerization process, a porous poly-QxTh-rGO coating was conformally deposited on the CF-based structure, as illustrated in FIG. 3. Such porosity can be beneficial for the transport of counter ions and tolerance of dimensional changes upon redox cycling.

Figure 4:
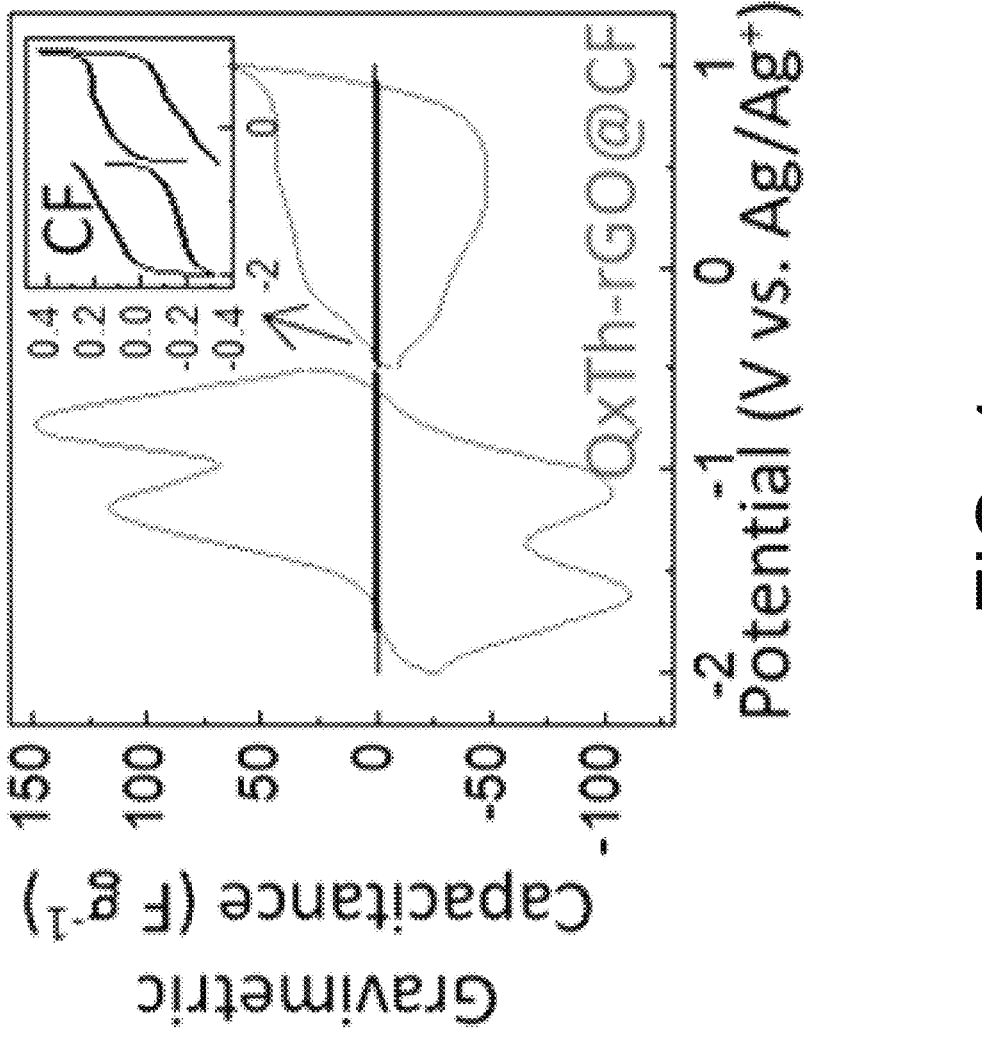
FIG. 4 depicts a graph illustrating data from example experiments carried out in accordance with embodiments of the disclosed technology.
Figure 5:
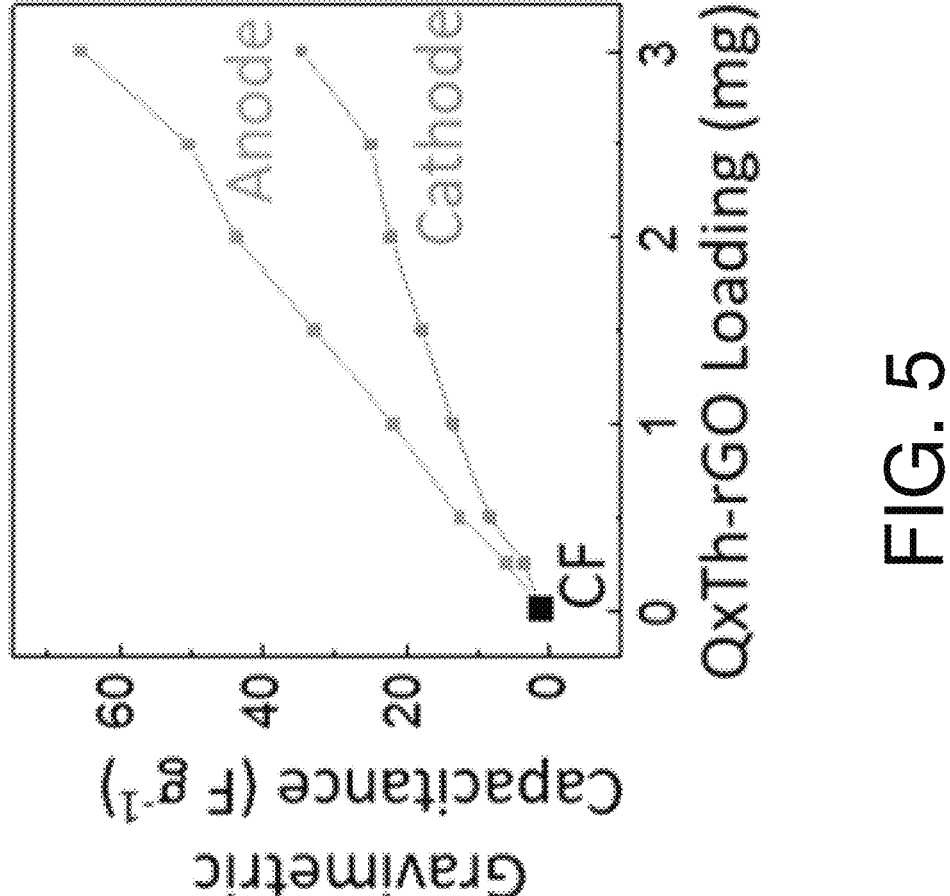
FIG. 5 depicts another graph illustrating data from example experiments carried out in accordance with embodiments of the disclosed technology.

From cyclic voltammetry measurements obtained during example experiments, FIG. 4 illustrates the gravimetric capacitance of poly-QxTh-rGO coated CF-based structural electrodes. Accounting for weight of the CF-based structure (e.g., 12.07 mg per 1 $cm^2$ electrode area), the uncoated CF-based structural electrode showed a capacitance of 0.16 F $g^{-1}$, while the poly-QxTh-rGO coated CF-based structural electrodes reached 65.2 F $g^{-1}$ when characterized as an anode (in the voltage range of −0.5 V to −2 V vs Ag/Ag+ reference), and 34.6 F $g^{-1}$ as a cathode (−0.5 V to 1 V vs Ag/Ag+), as illustrated in FIG. 5. In the example experiments, a coating of 3 mg of poly-QxTh-rGO on 9.93 mg of CF-based structure increased gravimetric capacitance by up to 400-fold compared to an uncoated CF-based structure alone. Specific capacitance can be raised further by depositing more poly-QxTh-rGO onto the CF-based structure surface. In example galvanostatic charge-discharge tests, the poly-QxTh-rGO coated CF-based structural electrode exhibited capacitance retention of 96.1% as an anode and 97.5% as a cathode after 10,000 full charge/discharge cycles. This retention result potentially indicates improved redox stability of poly-QxTh due to extended delocalization of charge density within this open-shell conjugated redox polymer.

Figure 6:
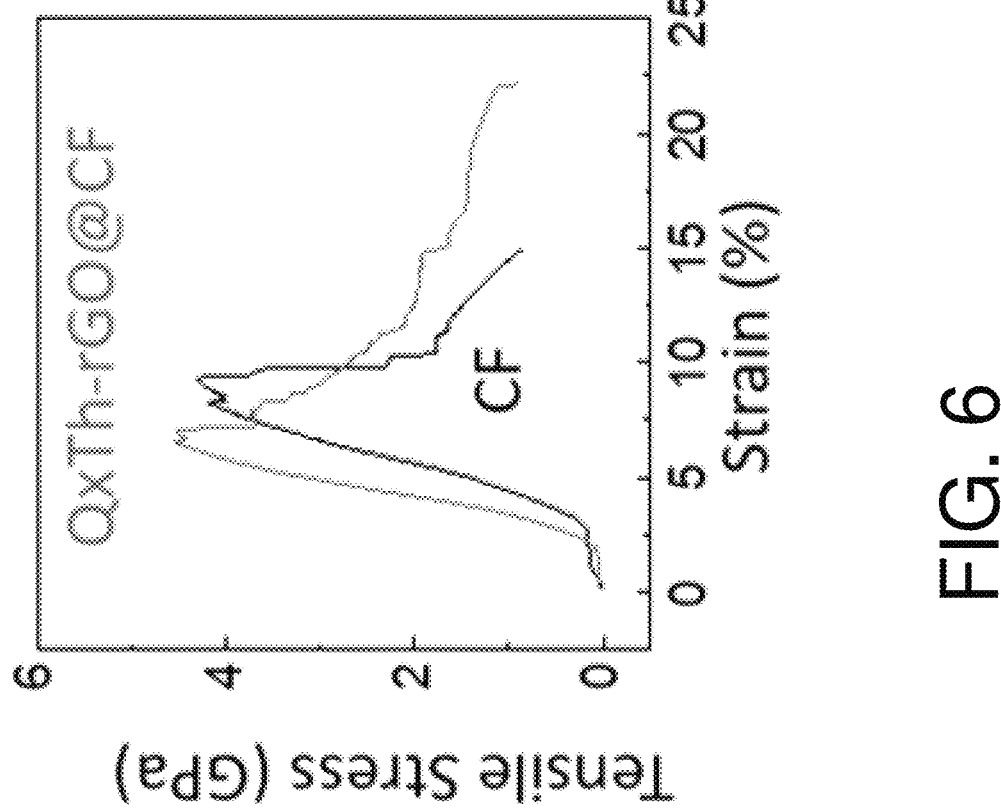
FIG. 6 depicts another graph illustrating data from example experiments carried out in accordance with embodiments of the disclosed technology.

In the example experiments, in addition to excellent electrochemical performance, the poly-QxTh-rGO coating provided additional mechanical reinforcement to the structural electrode. As illustrated in FIG. 6, the maximum tensile strength (stress-to-failure point) was 4.5 GPa for the poly-QxTh-rGO coated CF-based structural electrode, which was better than uncoated CF-based structural electrode at 4.3 GPa. The tensile modulus was 103 Gpa for the poly-QxTh-rGO coated CF-based structural electrode, also higher than the tensile modulus of uncoated CF-based structural electrode at 84 GPa. After example tensile strain tests, SEM images showed that the poly-QxTh-rGO coating was still conformally coated on the strained carbon fibers, confirming the strong adhesion of the poly-QxTh-rGO coating, superior to particulate pseudocapacitive materials that generally have issues with long-term adhesion to CF-based structures.

Figure 7:
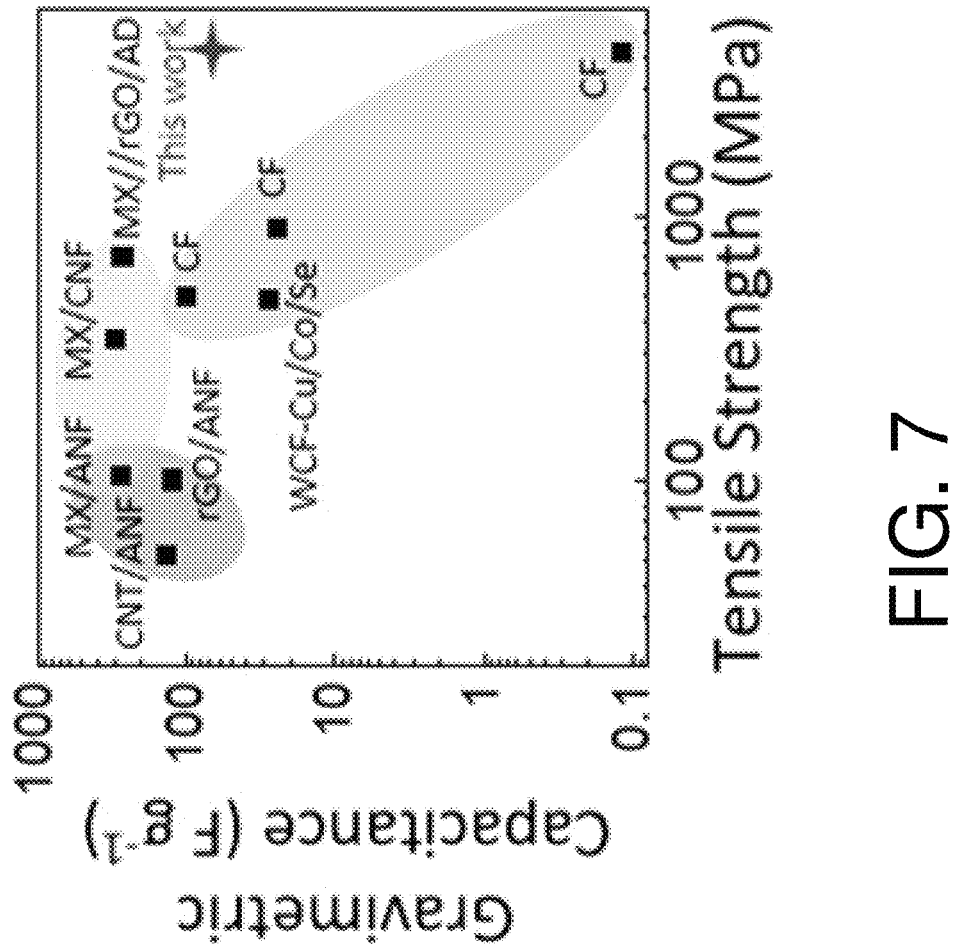
FIG. 7 depicts another graph illustrating data from example experiments carried out in accordance with embodiments of the disclosed technology.

As depicted in FIG. 7, among existing state-of-the-art structural electrodes, the poly-QxTh-rGO coated CF-based structural electrode exhibited the highest tensile strength, as the facile processing at room temperature did not damage the CF-based structure and retained the inherent structural organization that imparted robust mechanical properties to the CF-based structure. While the specific capacitance of the poly-QxTh-rGO coated CF-based structural electrode was not the highest in the comparison chart of FIG. 7, the existing state-of-the-art structural electrodes showed an order of magnitude lower tensile strength and moduli and were further limited in their operational voltage window V. The composites of MXene or aramid nanofibers were limited to a potential window below 1 V compared to the stability window of 3 V in the poly-QxTh-rGO coated CF-based structural electrode. Since energy density E is proportional to $E=0.5CV^2$, at a given capacitance C, the approach of expanding the potential window from 1 V to 3 V would offer a nine-fold increase in energy density.

Structural Electrolyte

For multi-functional laminates, a solid-state structural electrolyte can play a key role in ion conduction and load bearing, to achieve inherently more resilient and safer devices than conventional liquid/gel electrolytes when subjected to mechanical loads (here such solid-state structural electrolytes may be safer when subjected to mechanical loads due to reduced risk of leakage from corrosive liquid/gel electrolytes if a structural supercapacitor were to break/crack). Here, various embodiments of the present technology may select epoxy resin as a base for a solid-state structural electrolyte. Embodiments can accordingly adjust composition of the solid-state structural electrolyte in terms of salt concentration, ion-conducting polymer concentration (as alluded to above, increasing concentrations of salt and ion-conducting polymer can increase electrolyte salt access and promote fast kinetics), and gradient configuration in order to maximize the electrochemical and mechanical performance of the solid-state structural electrolyte.

An epoxy resin can provide cross-linked bonds at interfaces to strongly bind structural electrode and separator components together for high strength. The addition of an ion-conducting polymer (e.g., polyethylene oxide (PEO)), can create diffusion channels as a percolation network through the epoxy matrix, allowing the present technology to replace expensive ionic-liquid salts utilized in existing designs with more economical salts such as tetraethylammonium tetrafluoroborate ($TEABF_4$) salts. In other words, the ion-conducting polymer (e.g., PEO) can act as a percolating agent for ion conduction. The ion-conducting polymer may also be electrically insulating (i.e., to prevent/mitigate short circuits), but ion-conducting. Moreover, as a common binder, an ion-conducting polymer such as PEO can crosslink with epoxy to maintain mechanical modulus. Such a crosslink can produce a structural electrolyte/structural supercapacitor that would be stronger as a solid than existing ionic-liquid channels, while enhancing ionic conductivity of the solid-state structural electrolyte. The above-described solid-state structural electrolytes (sometimes referred to herein more simply as "structural electrolytes") of the present technology may also be unaffected by aggregation problems like mesoscopic inorganic fillers.

Figure 8:
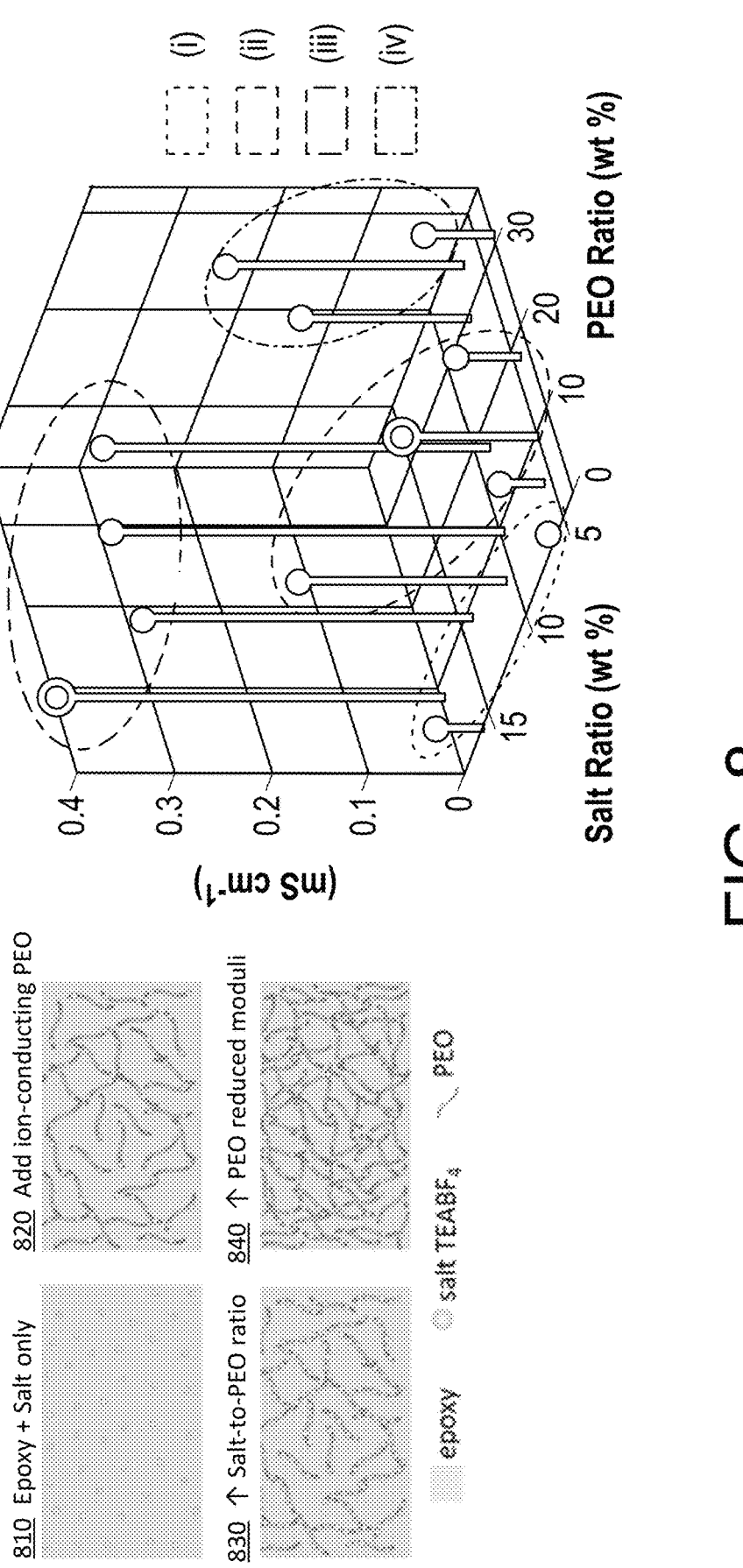
FIG. 8 depicts example schematics of structural electrolyte composition, in accordance with embodiments of the disclosed technology.

Solid-state structural electrolyte compositions from example experiments displayed are displayed in FIG. 8. In these example experiments, PEO was used as the ion-conducting polymer. The salt and PEO ratios (by wt %) were calculated from the weight of the respective component divided by the total weight ($TEABF_4$ salt+PEO+epoxy resin). For epoxy mixed with electrolyte salts only (see e.g., diagram 810 and ratio (i) from diagram 850 of FIG. 8), the electrolyte ions were not able to diffuse in the cross-linked resin, and the ionic conductivity was very low >0.04 mS $cm^{-1}$. Upon adding PEO to the resin (see e.g., diagram 820 and ratio (ii) of diagram 850 of FIG. 8), ion diffusion along PEO improved transport and raised the ionic conductivity to 0.14 mS $cm^{-1}$. If more salt was added per PEO amount (see e.g., diagram 830 and ratio (iii) of diagram 850 of FIG. 8), the ionic conductivity was increased further and reached up to 0.4 mS $cm^{-1}$. However, increasing the salt ratio beyond 20 wt % affected processing and mechanical performance, because the $TEABF_4$ salts were dissolved in a propylene carbonate solvent which slowed down the cross-linking reaction in the epoxy, and the residual solvent decreased the mechanical strength. Meanwhile, increasing the PEO (see e.g., diagram 840 and ratio (iv) of diagram 850 of FIG. 8) had a similar effect of reducing mechanical moduli because of the low rigidity of PEO. Accordingly, for device fabrication, example experiments utilized a combination of two electrolyte compositions, i.e., 18 wt % salt, 9 to 10 wt % PEO (i.e., ratio (iii) of diagram 850) and 5 wt % salt, 10 wt % PEO (i.e., ratio (ii) of diagram 850) respectively, to construct a functionally graded solid-state structural electrolyte (i.e., a solid-state structural electrolyte having increasing concentrations of salt and PEO with increasing proximity to electrolyte-electrode interfaces).

Integrated Structural Supercapacitor—Electrochemical Characterization

As alluded to above, in existing/conventional structural supercapacitors, the electrolyte is typically a uniform composite. The uniform composite electrolyte may be directed by vacuum infusion to flow through the electrodes and separator(s) of the structural supercapacitor. The components may then solidify together. Epoxy resin can be used to maintain rigidity for mechanical load-bearing support. Epoxy resin is electrochemically inert and thus limits surface adsorption and interfacial redox reactions that dictate electrochemical cell capacitance and energy storage capacity.

Figure 9:
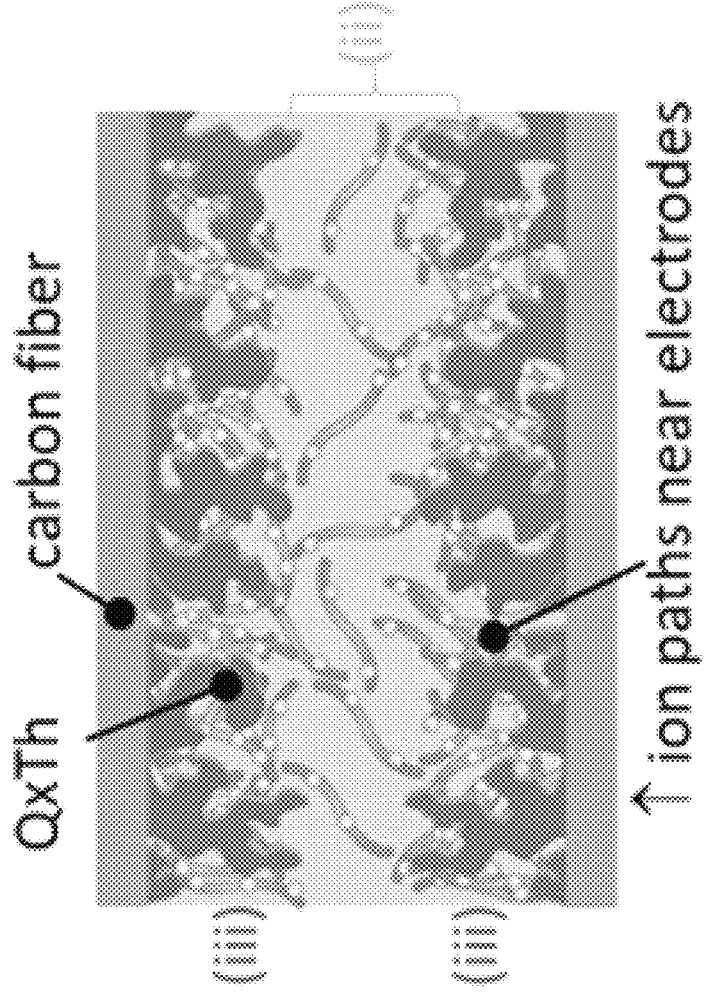
FIG. 9 depicts an example schematic of an example structural electrolyte with a gradient composition, in accordance with embodiments of the disclosed technology.
Figure 10:
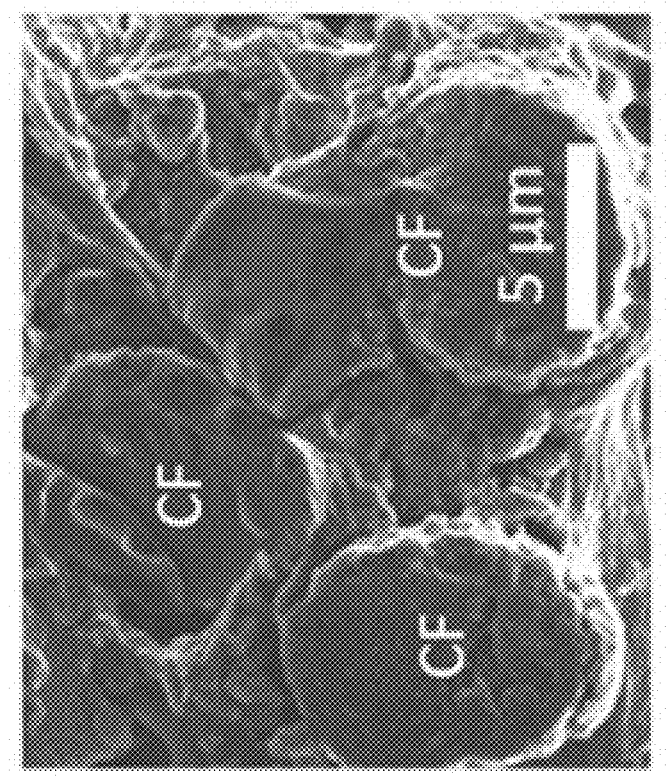
FIG. 10 depicts an example SEM image from an example experiment carried out in accordance with embodiments of the disclosed technology.

As described above, structural supercapacitors of the present technology replace the uniformly-composed electrolyte of existing/conventional structural supercapacitors, with a functionally graded solid-state structural electrolyte (see e.g., FIG. 9) to improve ion exchange at electrolyte-electrode interfaces—while maintaining improved mechanical load-bearing properties in regions further from the electrolyte-electrode interfaces. For example, for a functionally-graded (i.e., gradient) solid-state structural electrolyte, electrodes (of a structural supercapacitor) may be coated with an electrolyte with high salt and ion-conducting polymer ratios (see e.g., diagram 830 and ratio (iii) of diagram 850 of FIG. 8 and ratio (iii) in FIG. 9). This choice can facilitate ion access to electrode surfaces and may be favorable for capacitance. However, such high salt and ion-conducting polymer ratios can compromise mechanical properties of the epoxy of a solid-state structural electrolyte. Hence, to balance mechanical and electrochemical performance, the middle region of a solid-state structural electrolyte of the present technology (e.g. where a separator is embedded) can use a composition with lower salt and ion-conducting polymer ratios (see e.g., diagram 820 and ratio (ii) of diagram 850 of FIG. 8 and ratio (ii) in FIG. 9). Such an electrolyte with lower salt and ion-conducting polymer ratios may retain a sufficient (albeit lower) ion percolation network while offering improved mechanical strength. In example experiments, the different electrolytes were stencil-printed onto the electrodes or separator, partially cured, and then hot pressed together to complete curing. The solid-state structural electrolyte penetrated into and enclosed the electrodes very well to ensure intimate contact, as seen in the SEM image of FIG. 10.

Figure 11:
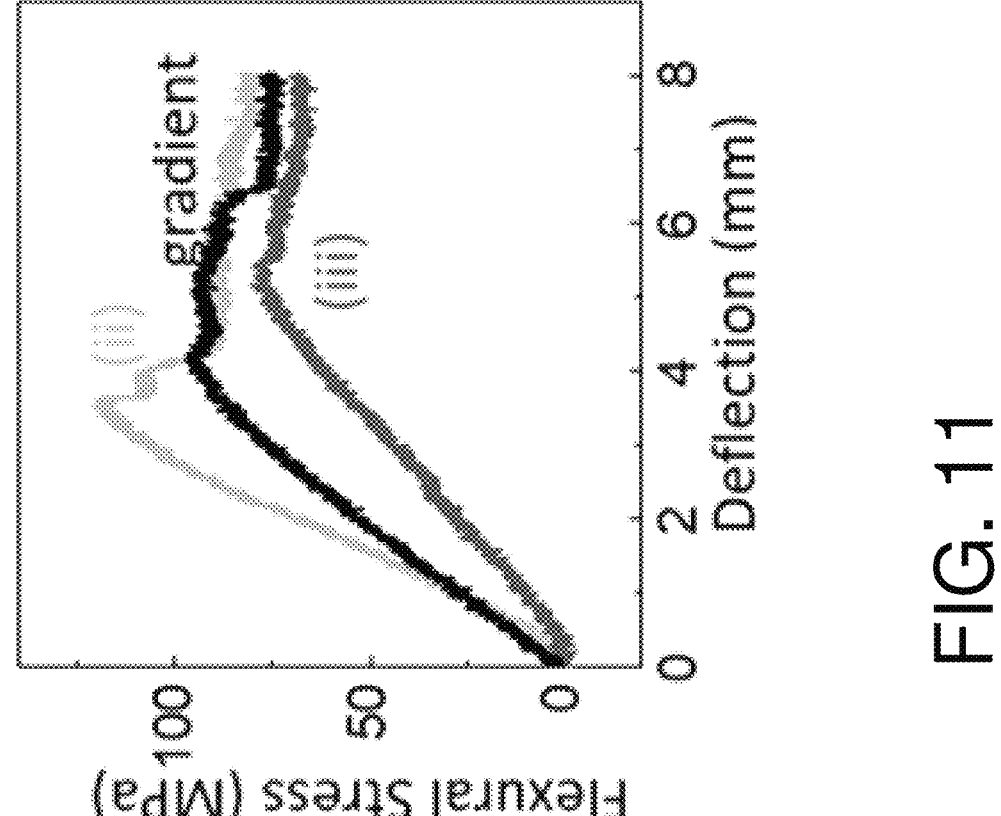
FIG. 11 depicts another graph illustrating data from example experiments carried out in accordance with embodiments of the disclosed technology.

FIG. 11 compares the flexural properties of different electrolytes from the example experiments. The uniform type (ii) electrolyte (see e.g., diagram 820 of FIG. 8) showed a high flexural strength of 130 MPa, but its ionic conductivity was only 0.14 mS cm$^{-1}$. In contrast, the uniform type (iii) electrolyte (see e.g., diagram 830 of FIG. 8) was lower in flexural strength at 75 MPa while higher in ionic conductivity at 0.4 mS cm$^{-1}$. The gradient solid-state structural electrolyte combined the two compositions and attained a flexural strength of 91 MPa, while maintaining a high ionic conductivity of 0.4 mS cm$^{-1}$. Thus, the gradient design gained the benefits of increased mechanical strength without sacrificing electrochemical performance.

Figure 12:
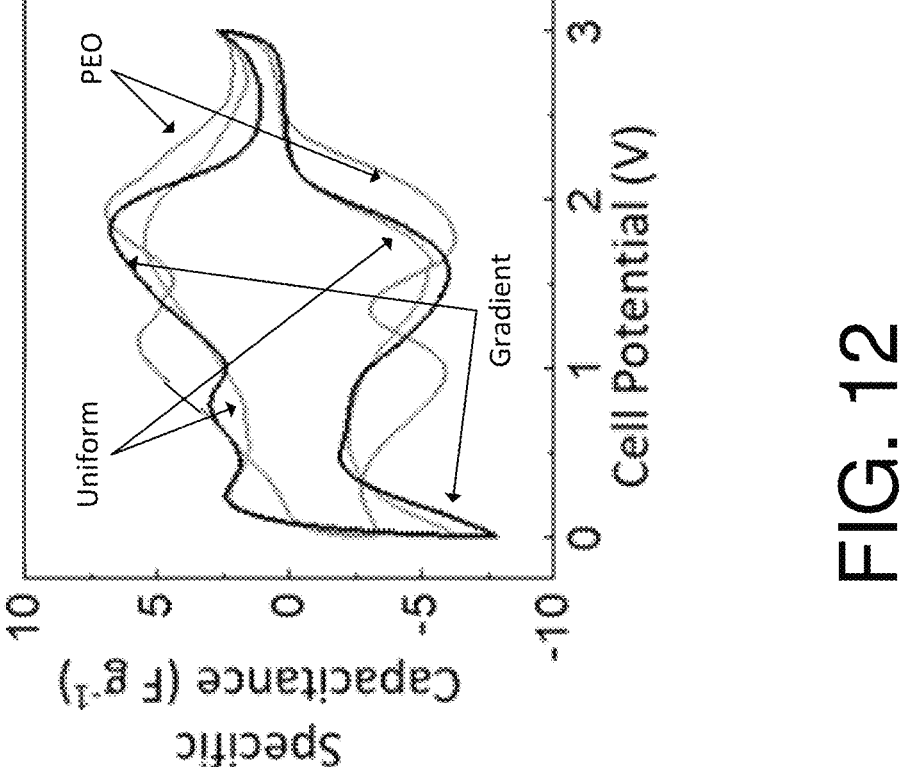
FIG. 12 depicts another graph illustrating data from example experiments carried out in accordance with embodiments of the disclosed technology.

FIG. 12 presents the electrochemical characteristics of three example devices, comparing the above gradient solid-state structural electrolyte, the uniform type (ii) electrolyte, and a non-structural PEO electrolyte without epoxy. The electrolyte with no epoxy and solely PEO (salt:PEO at 33 wt %) can be considered as an upper bound for the electrochemical performance in solid polymer electrolytes, but it is mono-functional and cannot support load-bearing functions because PEO will deform easily on account of its low mechanical moduli. In the example experiment, the uniform type (ii) electrolyte was comprised of a PEO-epoxy resin with a low salt ratio [see e.g., diagram 820 and ratio (ii) of diagram 850 of FIG. 8 and ratio (ii) in FIG. 9]. The associated device with the PEO electrolyte exhibited the lowest specific capacitance among the three structures and only one redox peak in the cyclic voltammetry data as opposed to two peaks in the other devices, indicating slow kinetics due to low ionic conductivity. The gradient solid-state structural electrolyte improved interfacial kinetics and increased the device specific capacitance by ~10% across all scan rates when compared to the uniform electrolyte (see e.g. FIG. 12).

Figure 13:
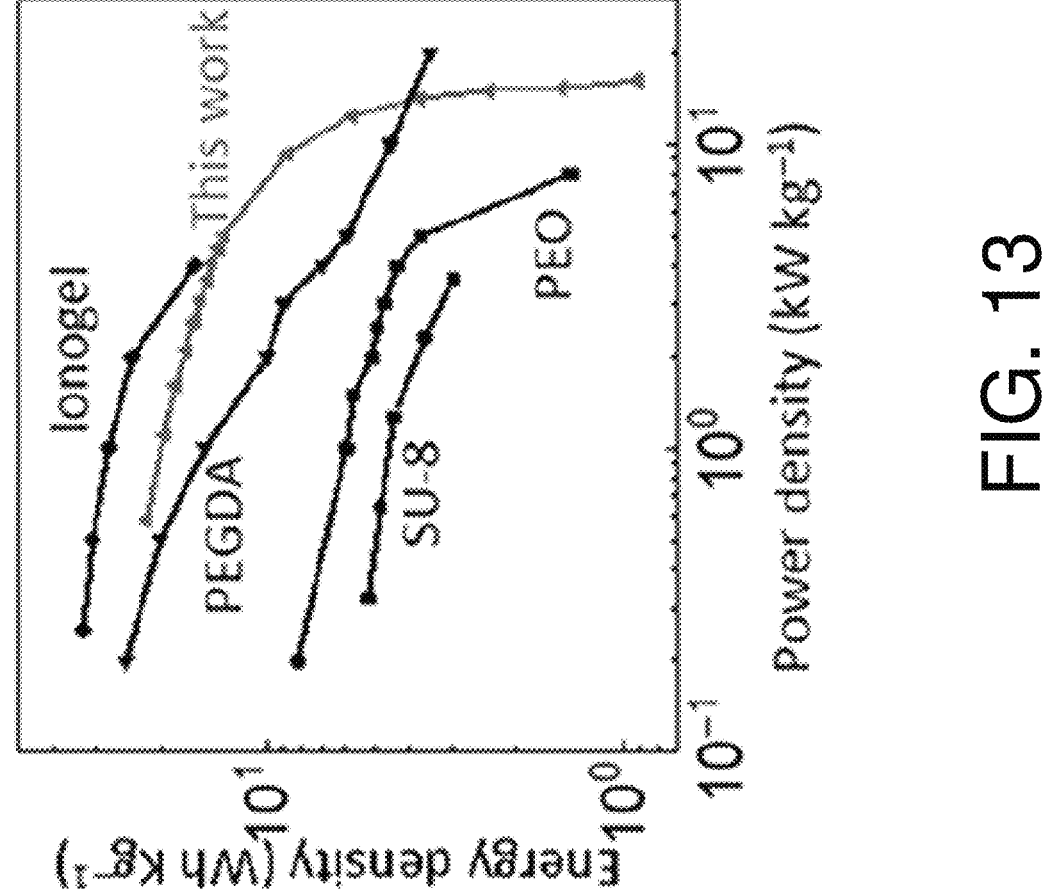
FIG. 13 depicts another graph illustrating data from example experiments carried out in accordance with embodiments of the disclosed technology.

The example structural supercapacitor of the present technology with the gradient solid-state structural electrolyte even exceeded the power and energy densities of devices with mono-functional gel electrolytes, as illustrated in FIG. 13. A reason for this improvement is that the example structural supercapacitor of the present technology used pseudocapacitive poly-QxTh-rGO coated CF-based structural electrodes that did not rely as much on interfacial porosity and ionic rearrangement as electric double layer (EDL) electrodes. Accordingly, the example structural supercapacitor of the present technology of the present technology may be favorable for pairing with solid-state structural electrolytes (including gradient solid-state structural electrolytes). This is in-part because the flexible backbone of the PEO entangles with the porous surface of the poly-QxTh-rGO coated CF-based structural electrode material to form more robust binding interfaces between structural electrodes and structural electrolyte.

An poly-QxTh-rGO coated CF-based structural electrode combined with a gradient solid-state structural electrolyte retained 83% of capacitance in comparison to when it was operated using a liquid electrolyte. In contrast, an EDL activated-carbon device with a solid electrolyte retained only 15% of capacitance. Here, when the poly-QxTh-rGO coated CF-based structural electrode (i.e., one example of a conjugated redox polymer-carbon-based compound coated CF-based structural electrode) and the gradient solid-state structural electrolyte were combined into a structural supercapacitor, the structural supercapacitor promoted fast kinetics to achieve power densities on the level of typical mono-functional supercapacitors. Importantly, such a structural supercapacitor of the present technology overcame a major drawback of low power outputs seen in conventional/existing structural supercapacitors.

Figure 14:
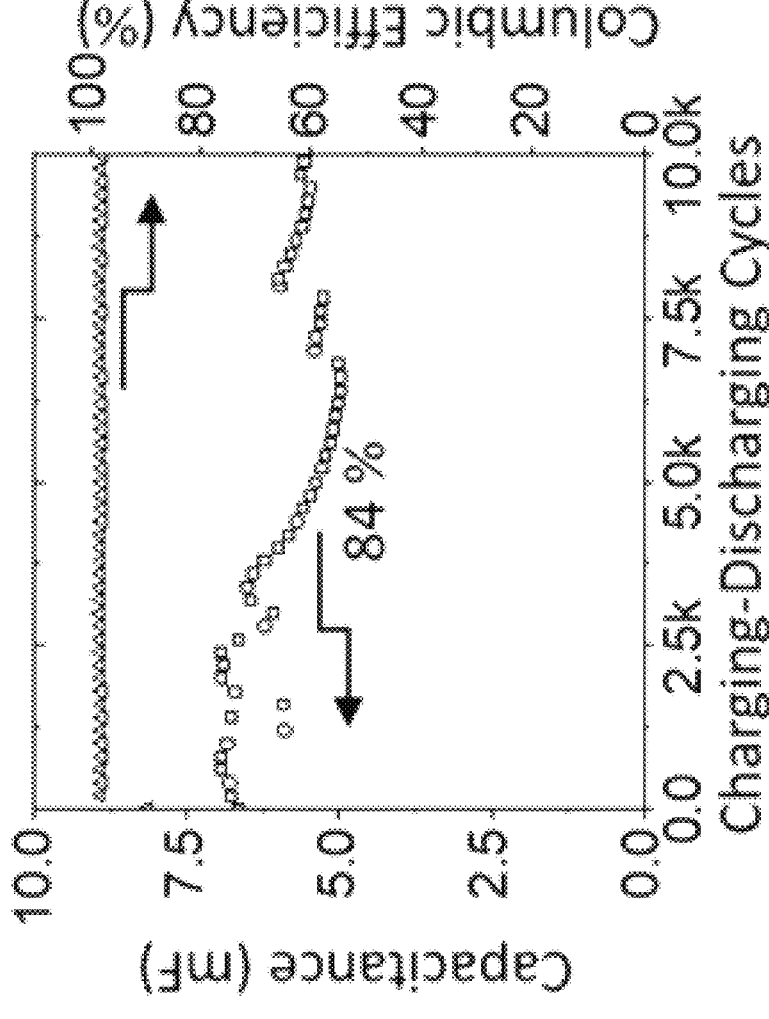
FIG. 14 depicts another graph illustrating data from example experiments carried out in accordance with embodiments of the disclosed technology.

The stability of the example structural supercapacitor of the present technology was excellent with >99% Coulombic efficiency and 84% capacitance retention after 10,000 full charge-discharge cycles over a wide potential window of 3 V (see e.g., FIG. 14). In example experiments, the cycle life of the example structural supercapacitor of the present technology was comparable or better than state-of-the-art structural supercapacitors. The self-discharge characteristics of the example structural supercapacitor of the present technology was better than an example commercial, with a 1 V decrease after 10 hours due in part to decreased side reactions in the solid-state gradient electrolytes.

Integrated Structural Supercapacitor—Mechanical Characterization

Figure 15:
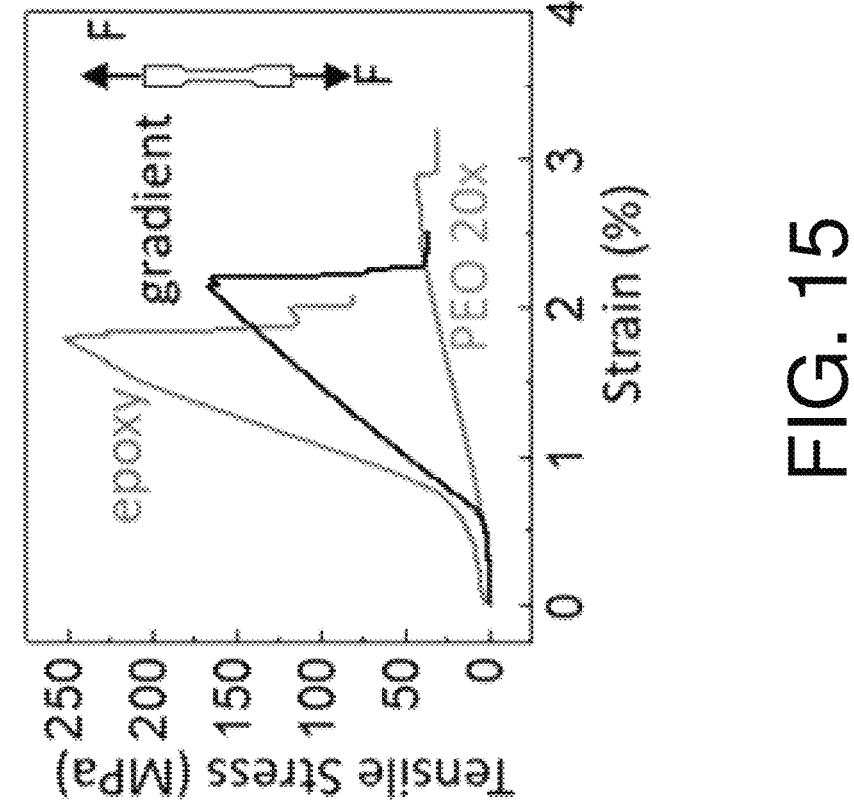
FIG. 15 depicts another graph illustrating data from example experiments carried out in accordance with embodiments of the disclosed technology.

In example experiments, the mechanical properties of an example structural supercapacitor of the present technology with a gradient solid-state structural electrolyte (i.e., a gradient-style structural supercapacitor) were compared to two supercapacitors incorporating mono-functional electrolytes: (1) an epoxy-only-style supercapacitor in which the electrolyte was bonded by epoxy only (maximum mechanical strength but no electrochemical function) and; (2) a PEO-bonded-style supercapacitor in which the electrolyte was bonded with PEO (maximum ionic conductivity but low structural rigidity). The example supercapacitors utilized structural electrodes comprising poly-QxTh-rGO-coated CF fabric and a cellulose separator sandwiched in between. The relatively weak binding strength of PEO-bonded-style supercapacitor led to separation of the layers at 2.1 MPa when the structure was placed under tensile strain. By contrast, the example gradient-style structural supercapacitor remained intact up to the tensile stress of 167 MPa. The epoxy-only-style supercapacitor sustained 255 MPa before failure, as seen in FIG. 15. The tensile modulus, namely the slope of tensile stress versus applied strain, was 10.2 GPa for the example gradient-style structural supercapacitor.

Figure 16:
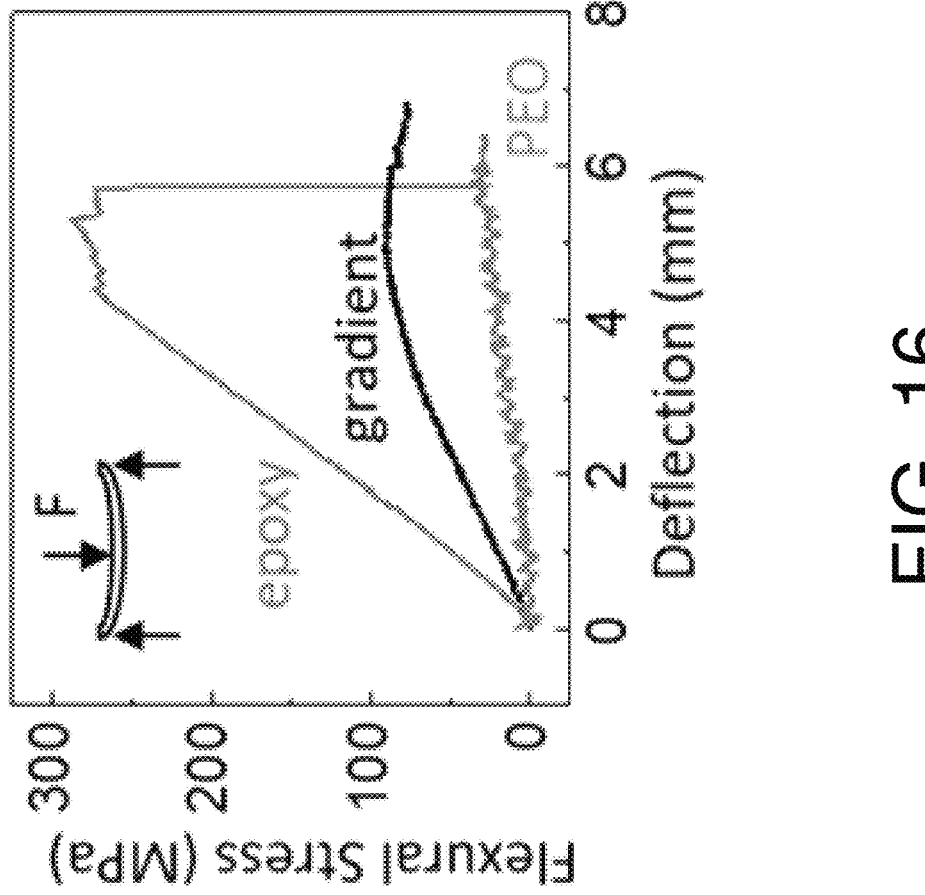
FIG. 16 depicts another graph illustrating data from example experiments carried out in accordance with embodiments of the disclosed technology.

In the example experiments, as illustrated in FIG. 16, the flexural properties were measured by a three-point bending setup that applied deflection to determine stiffness. The PEO-bonded-style supercapacitor was flexible and showed flexural stress <20 MPa. In contrast, the flexural strength was 91 MPa for the gradient-style structural supercapacitor, and 275 MPa for the epoxy-only-style supercapacitor when the devices reached permanent deformation. For visual comparisons, the photographs in FIG. 17 illustrate stiffness of each sample with a thickness of 0.8 mm, where the PEO-bonded-style supercapacitor was severely bent under a 20 g weight, and the gradient-style structural supercapacitor was able to support a 100 g weight, potentially strong enough to serve as structural material in electronic casings and internal parts of electric vehicles. Since practical applications might require thick carbon-fiber reinforced composites, example experiments also measured the flexural stress of structural supercapacitors integrated with multiple layers of carbon fibers (e.g., 8 electrodes with 7 separators) and observed that the flexural modulus was maintained. Therefore, it may be feasible to scale up and adapt layered composites for different target thicknesses according to the desired use case.

Integrated Structural Supercapacitor—Multifunctional Efficiency

Figure 18:
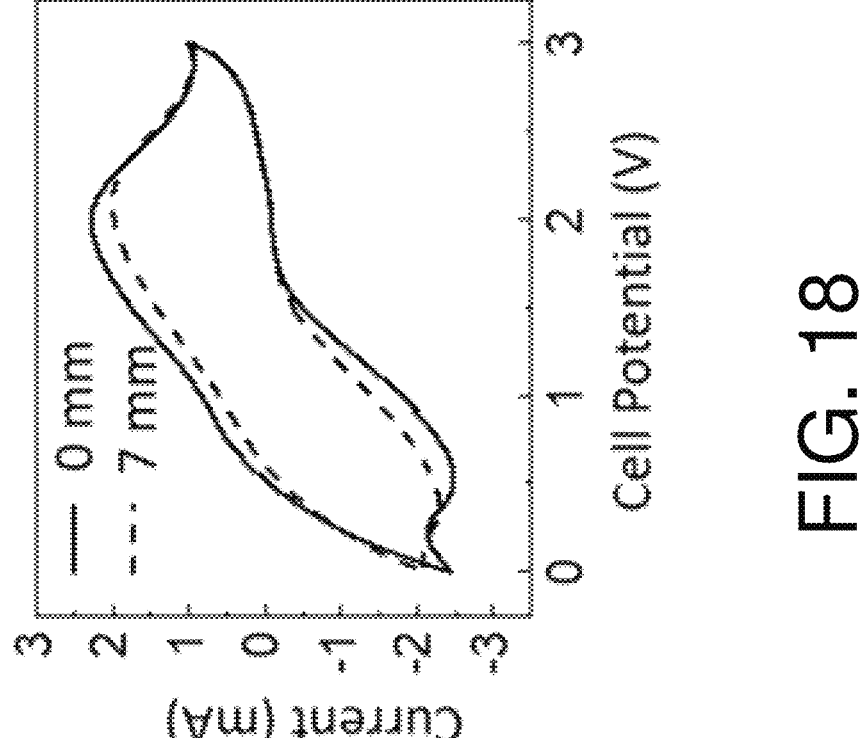
FIG. 18 depicts another graph illustrating data from example experiments carried out in accordance with embodiments of the disclosed technology.
Figure 19:
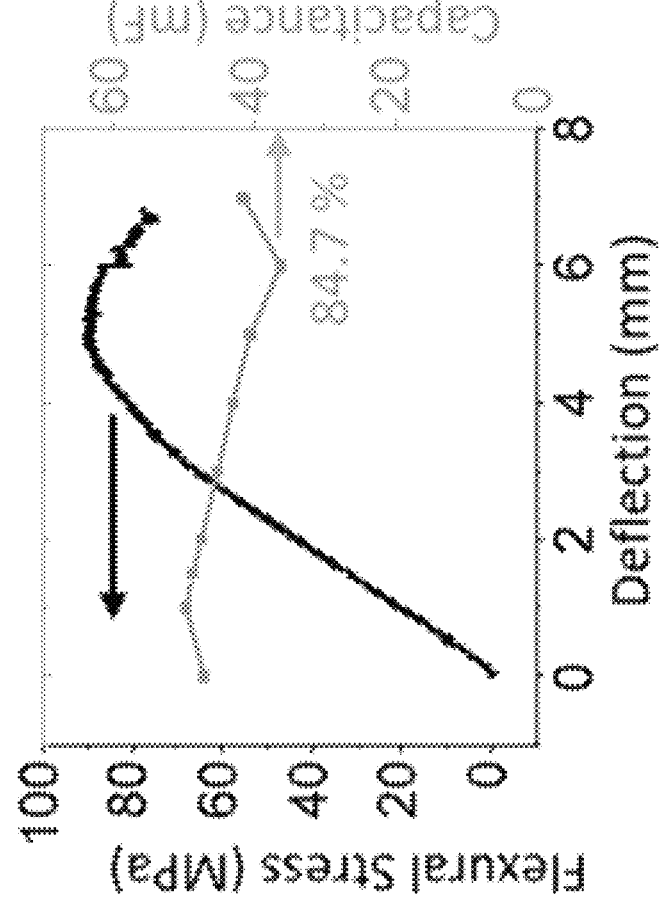
FIG. 19 depicts another graph illustrating data from example experiments carried out in accordance with embodiments of the disclosed technology.

In example experiments, simultaneous monitoring of electrochemical and mechanical characteristics were carried out on the example gradient-style structural supercapacitor. An example was the cyclic voltammetry measurements as a function of applied deflection shown in FIG. 18. From the current-voltage characteristics, the extracted capacitance was 47.1 mF in the initial flat state and 40 mF at 7 mm deflection, and thus the device retained 85% of its original capacitance even under large deformation. FIG. 19 illustrates a series of in-situ measurements (made in the example experiments) that concurrently tracked flexural stress and capacitance as the example gradient-style structural supercapacitor was subjected to increasing deflection. When the structural deflection was less than 3 mm, capacitance for the example gradient-style structural supercapacitor remained constant. Only when deflection exceeded 3 mm did the capacitance start to decrease, leveling off to 85% of the initial capacitance as the example gradient-style structural supercapacitor reached its peak flexural stress after which it was irreversibly deformed. The characterization here indicated that stable electrode-electrolyte interfaces in the example gradient-style structural supercapacitor maintained electrochemical and mechanical performance as external mechanical loads were applied.

Figure 21:
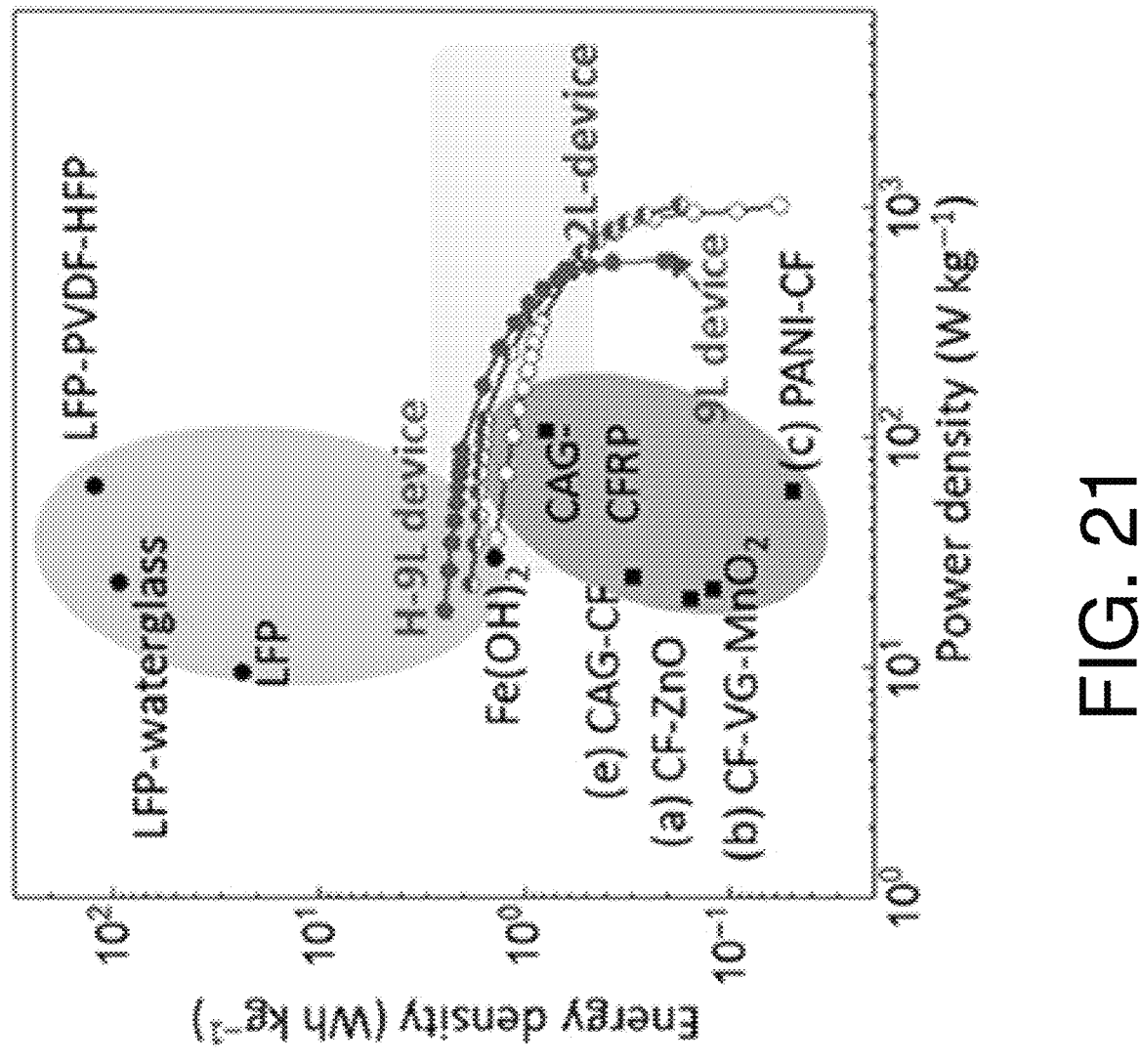
FIG. 21 depicts another graph illustrating data from example experiments carried out in accordance with embodiments of the disclosed technology.

FIG. 21 illustrates energy and power densities of state-of-the-art structural supercapacitors and batteries in comparison to example structural supercapacitors of the presently disclosed technology. Namely, FIG. 21 illustrates comparisons to a two layer (2L) structural supercapacitor of the presently disclosed technology, a nine layer (9L) structural supercapacitor of the presently disclosed technology, and a high-loading nine layer (H-9L) structural supercapacitor of the presently disclosed technology (i.e., a structural supercapacitor of the presently disclosed technology with higher loading of poly-Qx-Th-rGO coating).

While batteries are generally expected to have higher energy density than supercapacitors, the example 2L, 9L, and H-9L structural supercapacitors of the presently disclosed technology exceeded the energy density of the Fe(OH)$_2$ structural battery and achieved much larger power density than all the other structural energy storage devices. Metrics for the example 2L, 9L, and H-9L structural supercapacitors of the presently disclosed technology were calculated with a total device mass including electrodes, separator, and electrolyte.

Figure 77:
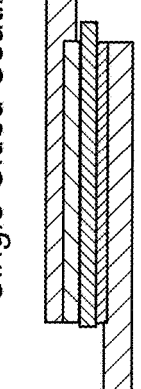
FIG. 77 depicts structures of 2-layer (2L) and 9-layer (9L) supercapacitors, in accordance with various examples of the presently disclosed technology.

The example 2L structural supercapacitor comprised a basic structure with poly-QxTh-rGO deposited on a side of each CF layer. The example 2L structural supercapacitor was able to provide 0.0575 Wh kg$^{-1}$ at 1019 W kg$^{-1}$ power density. However, considering the CF substrate contributed a large portion of the electrode mass but little capacitance, there was room to improve the device design by depositing the high-capacitance poly-QxTh-rGO on both sides of each CF layer and stacking the anodes and cathodes as shown in FIG. 77 to minimize CF mass. This arrangement was used in the 9L structural supercapacitor, which theoretically would have a charge-storage capacity equivalent to 8×2L structural supercapacitor while eliminating the mass of seven CF substrates. Thus, the gravimetric energy density may increase by 1.78-fold (i.e., 16/9) for the 9L structural supercapacitor compared to the 2L structural supercapacitor.

The measurements in FIG. 21 illustrate higher energy densities for the 9L structural supercapacitor than the 2L structural supercapacitor, although the power output was comparatively decreased for the 9L structural supercapacitor, potentially due to a small resistance increase introduced by stacking electrode current collectors. For the third structural supercapacitor labeled H-9L, the poly-QxTh-rGO loading was roughly doubled on each CF substrate compared to the 9L structural supercapacitor. The H-9L structural supercapacitor showed a lower power density than 9L structural supercapacitor because of the slower kinetics from the thicker poly-QxTh-rGO coating. Nonetheless, the H-9L structural supercapacitor still offered power density within the same order of magnitude as monofunctional supercapacitors. When delivering at a high power of 584.7 W kg$^{-1}$, the H-9L structural supercapacitor supplied an energy density of 0.2096 Wh kg$^{-1}$. The maximum energy density was 2.443 Wh kg$^{-1}$ at a power of 17.8 W kg$^{-1}$, which matched the level of monofunctional supercapacitors and made it competitive against commercial devices.

To quantify the potential advantages of multi-functional structures over their mono-functional counterparts, there have been different approaches to combine the structural and electrochemical properties and tie them into a multi-functional efficiency metric $\eta_{multi}$ defined as follows in Equation 1 below:

$$\eta_{multi} \equiv \eta_E + \eta_M = \frac{E_{multi}}{E_{typ}} + \frac{M_{multi}}{M_{typ}}; \qquad \text{Equation 1}$$

where $\eta_E$ and $\eta_M$ are the electrochemical or mechanical efficiency, respectively, and each of them is computed by comparing the specific electrochemical properties $E_{multi}$ (such as energy and power, etc.) or specific mechanical properties $M_{multi}$ (such as strength, stiffness, toughness, etc.) of the multi-functional laminate relative to baseline values $E_{typ}$ or $M_{typ}$ from typical mono-functional structures. If $\eta_{multi}$ is greater than 1, it indicates weight savings over conventional systems of using independent mono-functional components. To produce table 2010 of FIG. 20, Equation 1 has been simplified to consider only energy density for $\eta_E$ and only tensile modulus for $\eta_M$.

Regarding the benefit of multi-functionality, example experiments compared the example structural supercapacitor of the present technology to existing state-of-the-art structural supercapacitors listed in table 2010 of FIG. 20. Efficiency metrics were calculated based on the baseline values of $E_{typ}$=2.5 Wh kg$^{-1}$ for energy density and $M_{typ}$=31.5 GPa for tensile modulus from mono-functional standards. Other parameters of structural supercapacitors are summarized in table 7300 of FIGS. 73A-73B. Because $\eta_E$ and $\eta_M$ are ratios and by definition dependent on the denominator values and yet there are no consistent baseline values across publications, existing state-of-the-art structural supercapacitors are normalized in table 2010 with common baseline values chosen to provide fair analysis.

Figure 72:
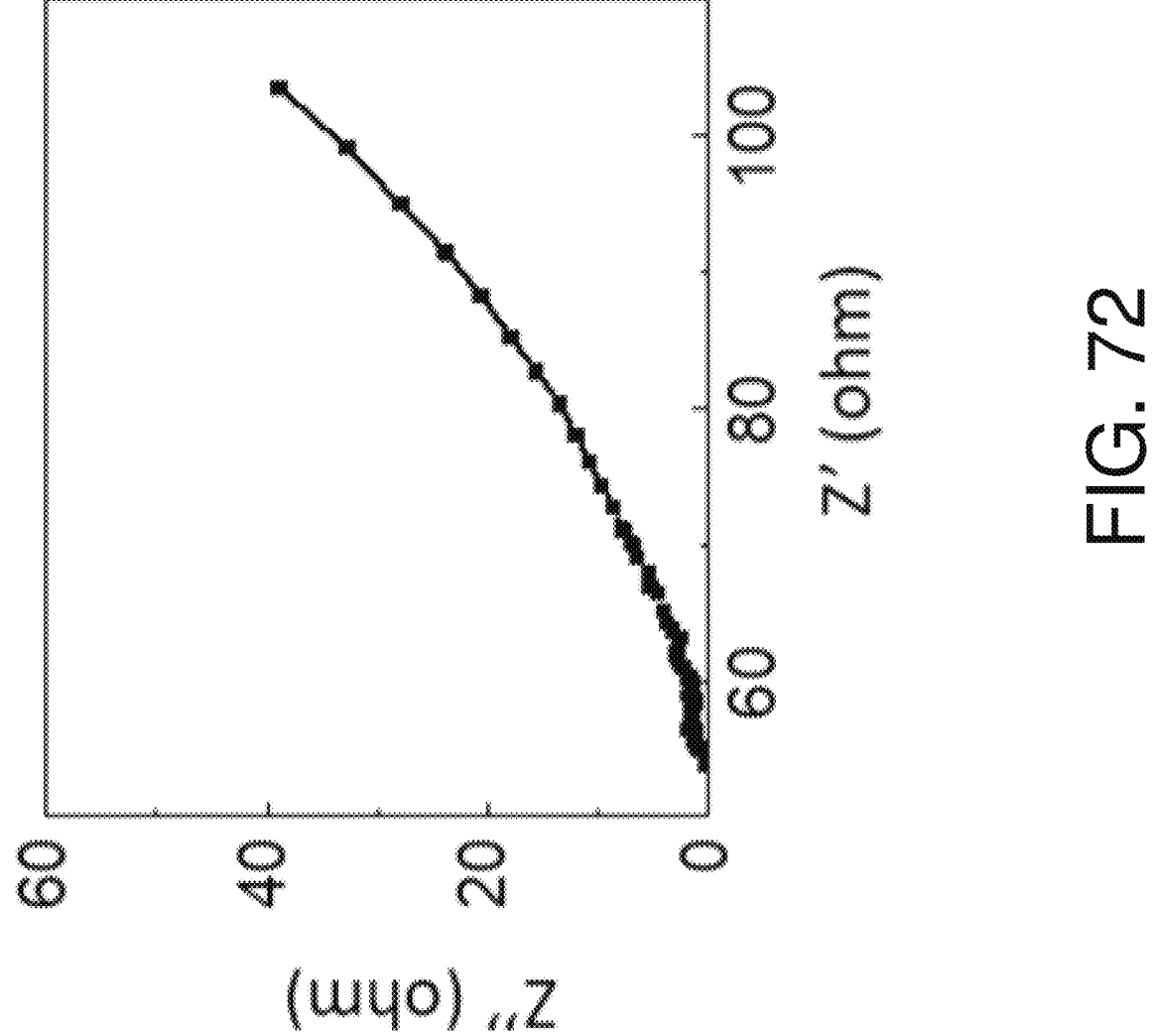
Figure 74:
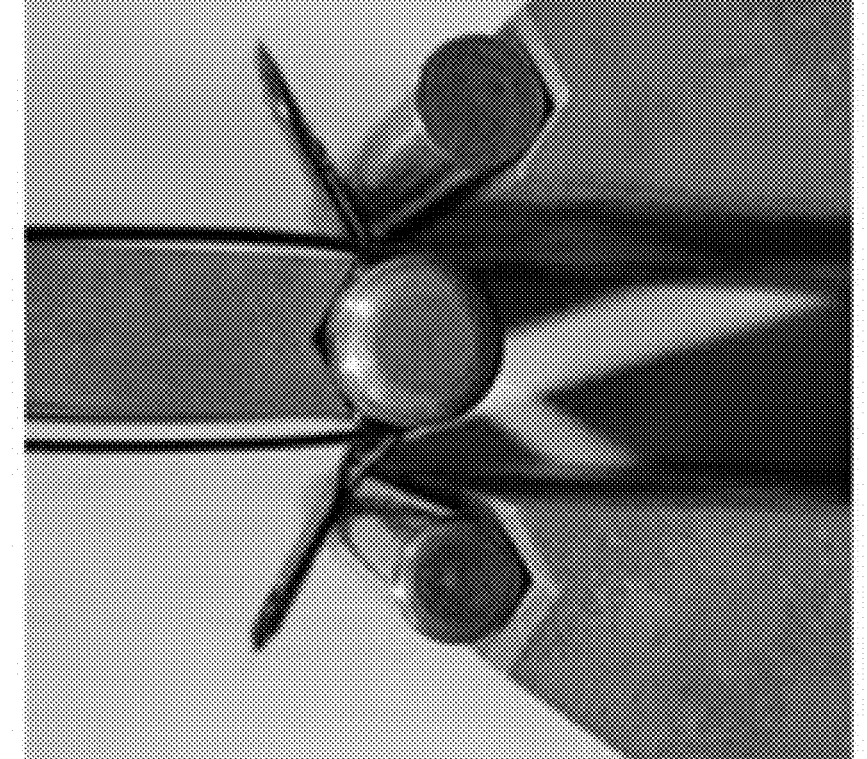
FIG. 74 depicts a photograph from example experiments carried out in accordance with embodiments of the disclosed technology.

The $\eta_E$ for structural supercapacitors of the present technology with gradient electrolyte was 0.548 for the 2L structural supercapacitor, 0.729 for the 9L structural supercapacitor, and reached 0.977 for the H-9L structural supercapacitor, the highest among the structures in table 2010. This high $\eta_E$ was attributed to the high gravimetric capacitance of the electrode, the good ionic conductivity from the gradient electrolyte, and the multilayer stacking configuration for mass savings. The $\eta_M$ of the structural supercapacitor of the present technology was 0.324 with the epoxy-reinforced design. The tensile modulus was measured for the 2L structural supercapacitor, and was assumed to remain the same for multilayer configurations, as shown in FIGS. 72-74. The total $\eta_{multi}$ was found to be 1.053 for the 9L structural supercapacitor and 1.301 for the H-9L structural supercapacitor. This means that structural supercapacitors of the present technology would offer a weight-saving advantage and provide a high multifunctional efficiency.

Figure 22:
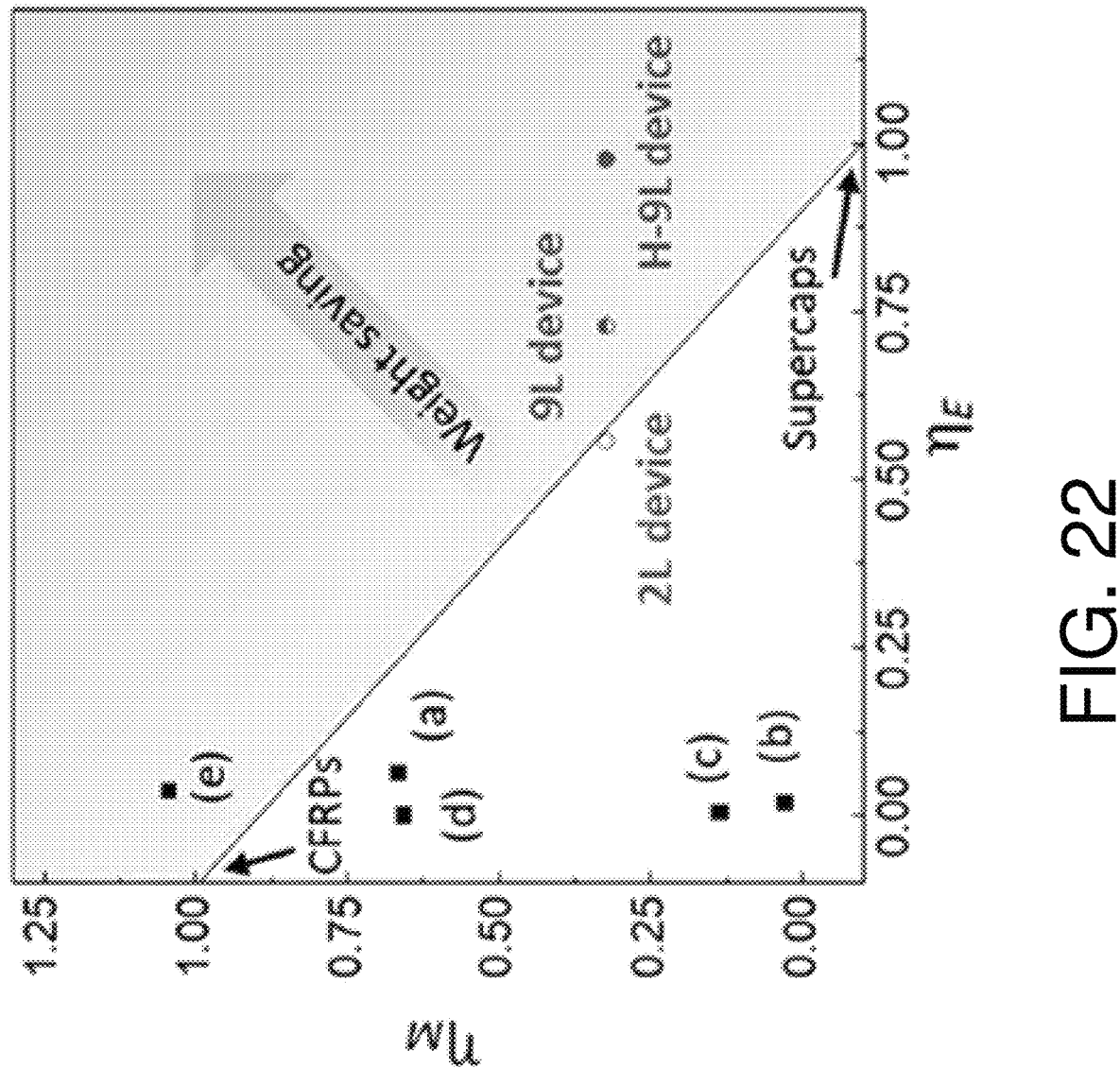
FIG. 22 depicts another graph illustrating data from example experiments carried out in accordance with embodiments of the disclosed technology.

It may also be noted that in FIG. 22 all the existing devices were clustered in the region with very low electro-chemical efficiency $\eta_E$. The example structural supercapacitor of the present technology with $\eta_E$ of 0.977 was the only device in the region with high electrochemical efficiency. Thus, while the example structural supercapacitor of the present technology would offer structural support with good mechanical efficiency $\eta_M$, it also contributed more heavily to electrochemical functions and $\eta_E$. This unique position would be complementary to applications in which energy capacity is very critical to their missions.

Figure 24:
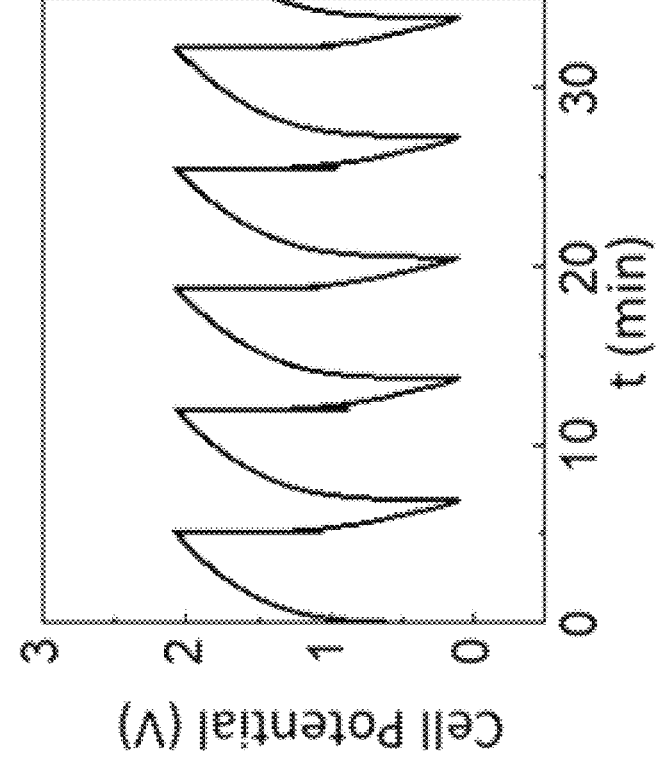
FIG. 24 depicts another graph illustrating data from example experiments carried out in accordance with embodiments of the disclosed technology.

Prototype Based on the Structural Supercapacitor: Electric Boat Powered by an Energy Harvesting System After device characterization, the example structural supercapacitor of the present technology was applied in a proof-of-concept demonstration. Motivated by the pervasive use of carbon-fiber laminates in boat building, a model boat was fabricated for which the entire hull consisted of example structural supercapacitors of the present technology serving dual functions of structural support and energy storage for powering the boat motor (see e.g., FIG. 23). The boat-hull supercapacitor was integrated into an energy-harvesting system with a solar cell that was as the sole energy input for the boat. A control circuit automatically toggled the connections of the supercapacitor to be charged by the solar cell or to be discharged to power the boat motor. Upon power-on, the control circuit would be in the charging mode until the supercapacitor reached the threshold voltage of 2.1 V. Once the supercapacitor voltage exceeded the set threshold, the control circuit switched to the discharging mode, in which the supercapacitor sent current to turn on the motor, and the boat cruised over water. When the supercapacitor voltage dropped to 0.1 V, the control circuit switched back to be in charging mode, and the charging/discharging process would repeat as seen in FIG. 24 until the circuit was turned off. The capacitance of the boat-hull supercapacitor was 2.72 F. It allowed 1.9 minutes of motor run time after 4.8 minutes of charging under the mid-afternoon sun. For the operational voltage between 0.1 V and 2.1 V, the structural supercapacitor was tested for 35,000 charge-discharge cycles and retained 83% of its initial capacitance, demonstrating excellent stability and long cycle life. This demonstration shows the supercapacitor capable of meeting the structural and energy storage requirements of an autonomous energy harvesting system operating in aquatic environments.

CONCLUSIONS

As described above, embodiments of the present technology provide a new design for structural supercapacitors which overcomes the bottlenecks at electrode and electrolyte interfaces. In example experiments, coating a CF-based structure with a pseudocapacitive conjugated redox polymer-carbon-based compound coating (e.g., poly-QxTh-rGO—having a wide potential window of 3 V substantially) raised gravimetric energy and power density for the resulting structural electrode. Moreover, the conjugated redox polymer strengthened electrode tensile properties better than particulate materials with weaker adhesion to carbon fibers. A gradient solid-state structural electrolyte was reinforced with an ion-conducting polymer (e.g., PEO) to maintain ion percolation without resorting to liquid ion channels. In certain example experiments, an epoxy-PEO-TEABF$_4$ resin was optimized to be functionally graded from the electrode to the separator interfaces, transitioning from a composition with high ionic conductivity near the electrode-electrolyte interface to one with high mechanical strength at the separator for mechanical load-bearing transfer. This gradient configuration can be useful in applications involving non-flammable solid electrolytes for enhancing device performance and safety.

Structural supercapacitors of the present technology were shown (in example experiments) to achieve state-of-the-art performance with an energy density of 2.443 Wh kg$^{-1}$ at the power output of 17.8 W kg$^{-1}$ and a tensile modulus of 10.2 GPa. In example experiments, an example a gradient-style supercapacitor pushed the maximum power density (1019 W kg$^{-1}$) into the same range as mono-functional supercapacitors, an important milestone for structural energy storage devices. The in-situ mechanical-electromechanical measurements established the device durability under mechanical loads, as the structure retained 85% capacitance at 80 MPa flexural stress. The flexural strength of 91 MPa and tensile strength of 167 MPa are sufficient for many electronic housings. After 10,000 full charge-discharge cycles over 3 V, the capacitance retention was 84%, and such long cycle life ensures that structural parts would not need to be replaced frequently.

Lastly, example experiments demonstrated the feasibility and benefits of using structural supercapacitors of the present technology in a prototype boat. The structural supercapacitors of the present technology were molded as a boat hull that realized weight and space savings and carried the entire energy-harvesting system. The hull stored the energy harvested by the on-board solar cell and in turn powered the boat motor. This autonomous system showed the ability of structural supercapacitors of the present technology to serve as energy reservoirs for renewable energy sources. Here the high-performing structural supercapacitors of the present technology can extend energy capacity to make electrified vehicles more compact and/or extend the operational time of electronics, adding a promising approach to move towards the goal of energy sustainability.

Procedures from the Example Experiments

The following describes specific procedures of the above-described example experiments. It should be understood that these procedures are purely exemplary, and structural electrodes, structural electrolytes, and structural supercapacitors of the present technology may be fabricated/tested using different materials, procedures, etc.

Electrode fabrication: In the example experiments, a solution of 5 mg mL$^{-1}$ QxTh monomer and 2 mg mL$^{-1}$ rGO in CH$_2$Cl$_2$ was mixed in a sonicator for 2 hours. Then the solution was drop casted onto a CF fabric (plain weave 1K, 10.5 mg cm$^{-2}$). The carbon fiber fabric was used as the working electrode in a three-electrode setup with 0.5 M TEABF$_4$ in propylene carbonate as the electrolyte. Meanwhile, the counter electrode was an active carbon electrode (mass ratio of active carbon (AC):polyinylidene fluoride (PVDF):carbon black is 7:2:1, with AC loading ~4 mg cm$^{-2}$) coated on carbon cloth substrate. The reference was an Ag/Ag$^+$ electrode. A constant current of 0.25 mA cm$^{-2}$ was applied to the CF fabric to conduct the electro-polymerization process until the working electrode reached 1 V vs. Ag/Ag$^+$ reference, typically depositing 3 mg of poly-QxThrGO coating on the 1 cm² electrode in roughly one hour at room temperature. The prepared poly-QxTh-rGO@CF electrodes were annealed at 200° C. for 30 min in inert nitrogen atmosphere. Following the same procedure as above for a single-sided coating, the poly-QxTh-rGO solution could be drop cast on the flip side of the CF fabric, and the same electro-polymerization process could be applied to prepare double-sided poly-QxThrGO@CF electrodes.

Solid polymer electrolyte preparation: The solutions of TEABF₄ (2 M dissolved in propylene carbonate PC), PEO (molecular weight of 400,000 dissolved in acetonitrile ACN with a 1:15 weight ratio), and epoxy without the hardener-part A (Dow 2-part epoxy, part 4001, extra-fast set epoxy, Hardman) were blended according to the ratios denoted in FIG. 8. Before usage, the epoxy hardener-part B was added at 1:1 ratio with the epoxy and then thoroughly mixed. As a specific example, an electrolyte of 20 mg TEABF₄: 40 mg PEO: 320 mg epoxy (see e.g., FIG. 8) was prepared as follows: (1) mix 50 μL of 2 M TEABF₄ in PC and 600 mg of the solution of PEO in ACN (equivalent to 40 mg PEO after ACN evaporated) and stir for 10 min to obtain a uniform, transparent solution; (2) add 160 mg epoxy part A, which greatly increases the solution viscosity, and stir until the gel is uniform; (3) add 160 mg epoxy hardener part B and stir to remove solvent. As solvent is removed, the gel should be used within an hour for stencil printing the electrolyte onto the electrodes or separators.

Structural supercapacitor fabrication: In the example experiments, structural supercapacitors were fabricated with poly-QxTh-rGO@CF electrode. To match the capacitance of cathode and anode, the cathode was loaded with the redox materials at 1.5 times of the anode. The selected electrolyte was stencil printed on one side of the cathode, anode, and the cellulose separator (30 μm thick), then placed under a vacuum for the electrolyte to vaporize its solvent and partially cure at 70° C. for 1 hr. Then the three components were stacked together and heat pressed together at 70° C. and cured for 2 hours at 70° C. Afterwards the structural supercapacitor was sealed by laminating PET films, and the electrical connections were copper wires attached by conductive tape onto the electrode, then sealed by epoxy (extra-fast set epoxy).

For the fabrication of the 9L and H-9L structural supercapacitors, the electrodes included two single-sided cathodes, three double-sided cathodes, and four double-sided anodes (see e.g., FIG. 77). The total capacitances of the cathode and anode electrodes were made to match for balancing materials utilization. Before assembly, the electrodes were held at −0.5 V for 1 min to keep at a neutral state. The electrolytes were stencil printed on both sides of the electrodes [using ratio (iii) electrolyte in diagram 850 of FIG. 8 and ratio (iii) of FIG. 9] and the cellulose separators [with ratio (ii) electrolyte in diagram 850 of FIG. 8 and ratio (ii) of FIG. 9], then placed under vacuum to evaporate solvent and partially cured at 70° C. for 1 hour. Then, the structural supercapacitor was assembled with following sequence: cathode-anode . . . cathode, where single-sided cathodes were used as the bottom and top layers of the structural supercapacitor, while double-sided electrodes were in between. Separators were put between every pair of cathode-anode. In this stacking configuration, eight pairs of cathode-anode were achieved with only nine layers of CFs, thus saving the mass and volume of seven carbon-fiber layers compared to 8×2L cells, which would use 16 layers of CF.

Materials morphology characterization: In the example experiments, a FEI scanning electron microscope at 5 kV was used for capturing materials morphology.

Electrochemical characterization: In the example experiments, electrochemical measurements were carried out via a BioLogic SP-200 potentiostat. For electrodes alone, they were tested in the three-electrode Swagelok cell configuration, with AC on carbon cloth (AC loading ~4 mg cm-2) as the counter electrode, Ag/Ag+ as the reference electrode, and 0.5 M TEABF4 in PC as electrolyte. The electrode measurements were conducted inside a glovebox with inert N2 atmosphere. The ionic conductivities of different electrolytes were inferred from electrochemical impedance spectroscopy performed at 0 V with an amplitude of 10 mV and frequencies ranging from 1 MHz to 100 mHz. The equivalent series resistance of the electrolyte samples were used to calculate ionic conductivity.

For the supercapacitors, they were encapsulated and measured in ambient. The power and energy densities were calculated based on following equation:

$$C = \frac{1}{\Delta Vv} \int_{V_1}^{V_2} i dV$$

Here, $V_1$ and $V_2$ are the starting and ending potentials in the discharge portion of the measurement, i is the current at each potential, $\Delta V = V_2 - V_1$ is the potential window, and v is the voltage scan rate. The calculated capacitance was an average value across the whole potential window.

The capacity, power, and energy densities were calculated on the basis of the following equations using galvano-static charge-discharge (GCD) characteristics.

$$Capacity = I \times t_d / M$$

$$E = \frac{I}{M} \int_0^{t_d} V dt$$

$$P = \frac{E}{t_d}$$

Here, I is the constant discharge current, $t_d$ is the time interval of the GCD discharge period, E is the energy density, V is the measured potential, P is the power density, and M is the mass of electrode materials (poly-QxTh-rGO-CF) in FIGS. 9-14, whereas in FIGS. 15-19 M is the total mass of the structural supercapacitor, including electrodes, separator, and electrolyte (but not including the encapsulation epoxy or PET films). The masses used for gravimetric calculations are listed in table 9000 of FIG. 90.

Mechanical strength measurement: In the example experiments, measurements of tensile stress versus strain and flexural stress under a three-point bending setup were conducted with a testing machine equipped with a 1.0 kN load cell. The loading rate was 1 mm min-1 for the tensile test and 0.5 mm min-1 for the three-point bending test. Commercial grade paper trimmer was used to cut CFs and separators into the target size. For tensile test on electrodes, carbon fiber fabrics were cut into 5 cm×2 cm rectangular shape, with thickness of ~0.58 mm. The length, width, and thickness for mechanical properties calculation of each sample was measured with micrometer (±1 μm) before the test. Then both ends (1 cm×2 cm) were encapsulated by bonding them to carbon-fiber reinforced polymer (CFRP) with epoxy, to prepare the regions for clamping to the load cell. The final defined test area was a 3 cm×2 cm rectangle. For the tests in FIGS. 15-19, all the samples were cut to 10 cm×1 cm rectangles, and then their two ends were also encapsulated by the same procedure as above. For the in-situ mechanical-electrochemical measurements, cyclic voltammetry sweeps were recorded for every 0.5 mm deflection to track the capacitance under mechanical loads.

The tensile stress σ and Young's modulus G were extracted according to the following equations:

$$\sigma = \frac{F}{d},$$

$$G = \frac{\nabla \sigma}{\nabla \varepsilon},$$

where F is the tensile force applied to the specimens, d is the thickness of the specimen, $\nabla\sigma$ and $\nabla\varepsilon$ are changes in the tensile stress and tensile strain, respectively, in the linear region.

The flexural stress $\sigma_f$ were calculated according to the following equation:

$$\sigma_f = \frac{3FL}{2bd^2},$$

where F is the deflection force, L is the support span, b and d are the width and thickness of the specimen, respectively.

Boat prototype fabrication and operation: The example boat hull was fabricated from a laminate of partially cured structural supercapacitor, prepared by pressing together the electrodes and cellulose separator coated with electrolyte resins for bonding. The hull was encapsulated by sandwiching it between two pieces of carbon aerogel-CF reinforced polymer (CFRP) and bonded to the hull by a layer of epoxy (see e.g., FIG. 82). A vacuum bag was used to shape the boat and de-gas the infusion epoxy. After curing overnight at room temperature, the boat hull was released from the vacuum bag. The partially cured laminate was pressed against a mold to shape the workpiece into a hull form, and it was left in vacuum overnight to remove residual solvents. Afterward, it was annealed at 70° C. for another 2 hours, and the fully cured structural supercapacitor hull was released from the mold. The boat hull was connected to the leads of the control circuit by copper wires attached with silver conductive tape. The control circuit was soldered to a solar cell and a DC coreless motor. The circuit components were placed inside the boat hull, while the motor shaft was mounted to the bottom of the boat on the CFRP encapsulation for driving the propeller outside the boat hull.

Figure 83B:
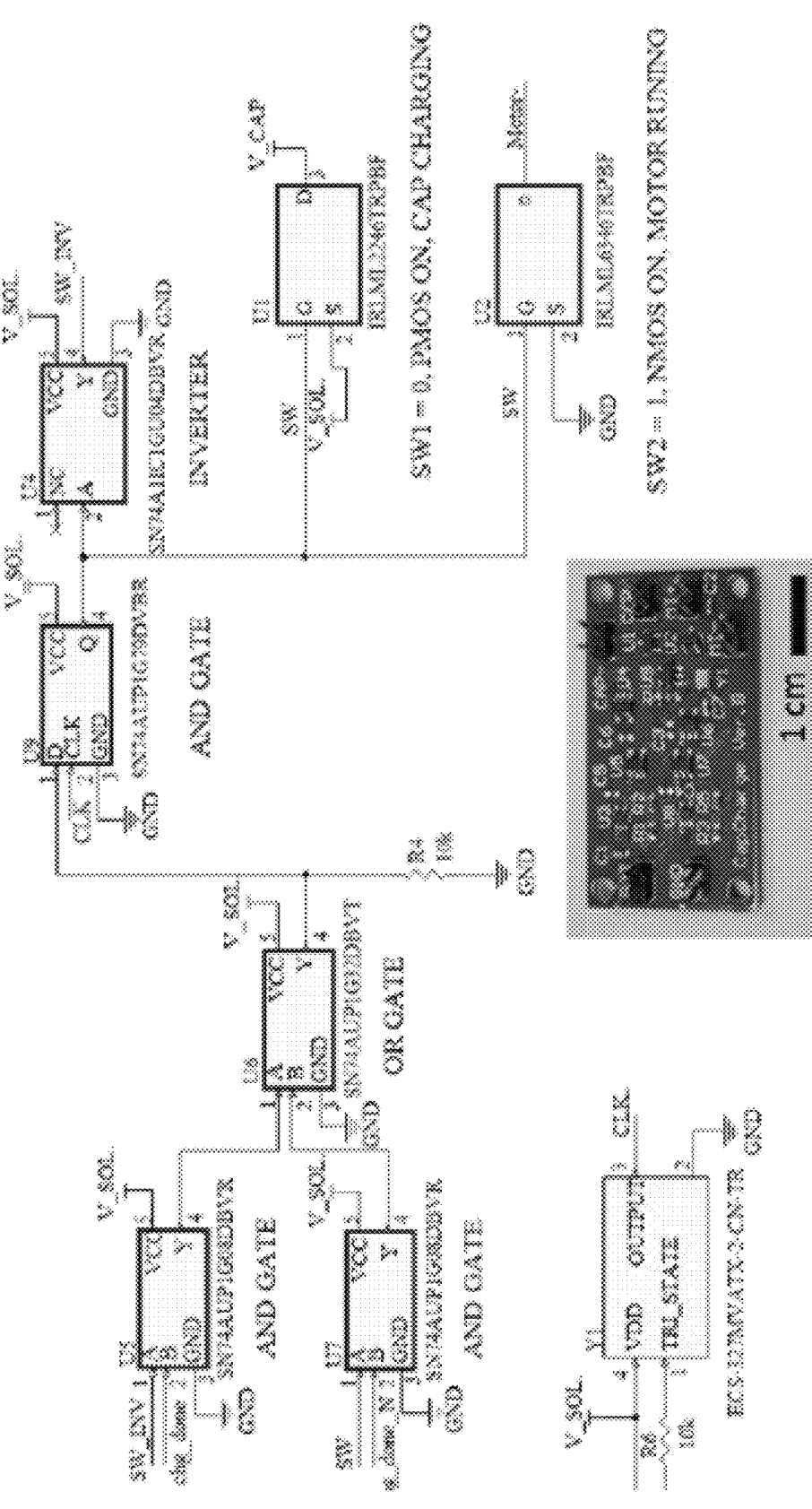

The example experiments leverages a finite-state machine (FSM) circuit to control the logic of the system. The FSM had two states: 0, charging and 1, discharging. The FSM was implemented using simple discrete logic gates and flip-flops (FIGS. 83A-83B). A 32.768-kHz crystal oscillator was used to provide clock for the digital circuit. Upon power on, the circuit initialized with state 0, the transistor PMOS U1 (IRLML2246) between the solar panel and the supercapacitor was turned on, and the charging process began. A comparator (LMV7271) was used to compare the supercapacitor voltage v_cap with the charging threshold voltage v_high and sent a charge-done signal when v_cap>v_high. When charge-done signal was high, the circuit switches to state-1 upon the next rising edge of the clock. Consequently, the transistor NMOS U2 (IRLML6346) between the supercapacitor and the motor was turned on, U1 was turned off, and the discharging process began. Similarly, another comparator compared the v_cap with the discharging threshold v_low and sent a discharge-done signal when v_cap<v_low. The circuit would switch back to state-0 in the next clock cycle, and the process continued so on and so forth unless the circuit was switched off.

Description of Additional Figures

Figure 25:
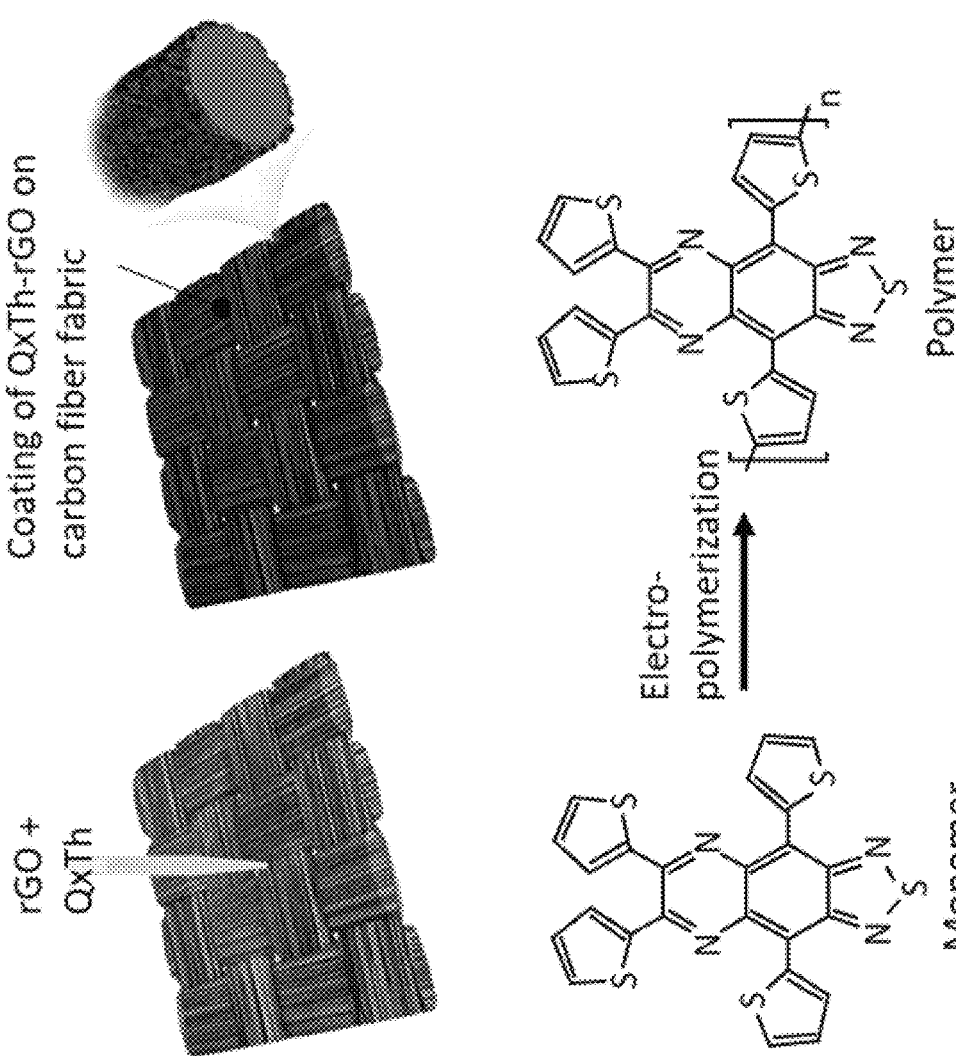
FIG. 25 depicts example diagrams illustrating the polymerization process on carbon fiber (CF), in accordance with various embodiments of the presently disclosed technology.

FIG. 25 depicts example diagrams illustrating the polymerization process on carbon fiber (CF), in accordance with various embodiments of the presently disclosed technology.

Figure 26:
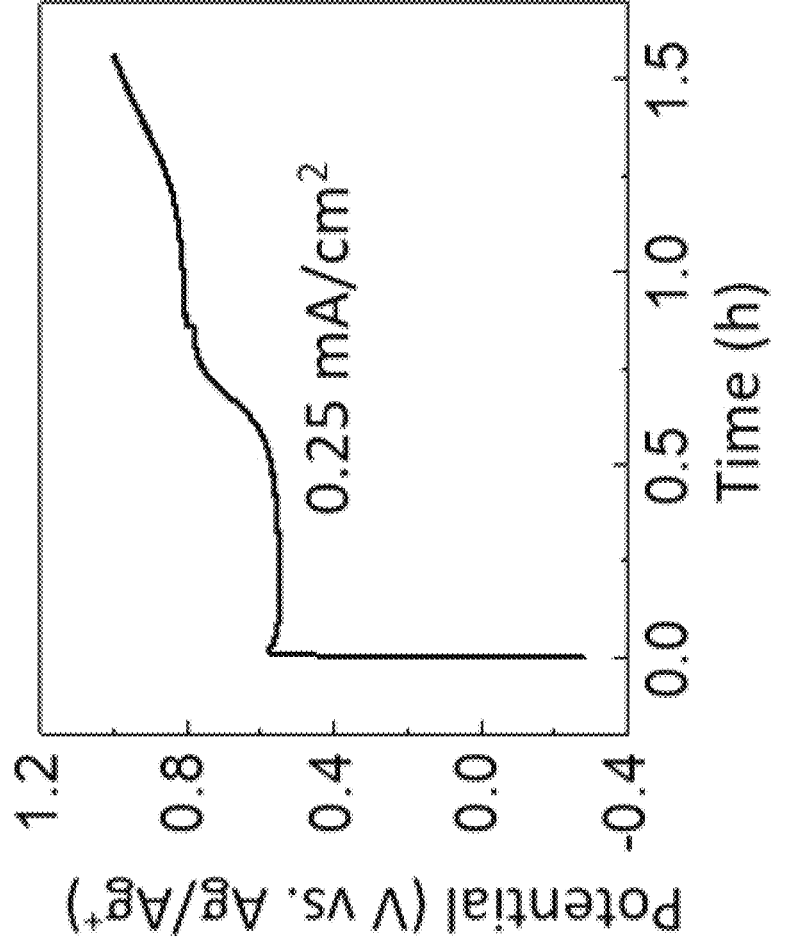
FIG. 26 depicts an example graph illustrating data from example experiments carried out in accordance with embodiments of the disclosed technology.

FIG. 26 depicts an example graph illustrating data from example experiments carried out in accordance with embodiments of the disclosed technology. Namely, FIG. 26 illustrates the potential of the working CF electrode as a constant current of 0.25 mA $cm^{-2}$ was applied in the cathodic electropolymerization process.

Figure 27:
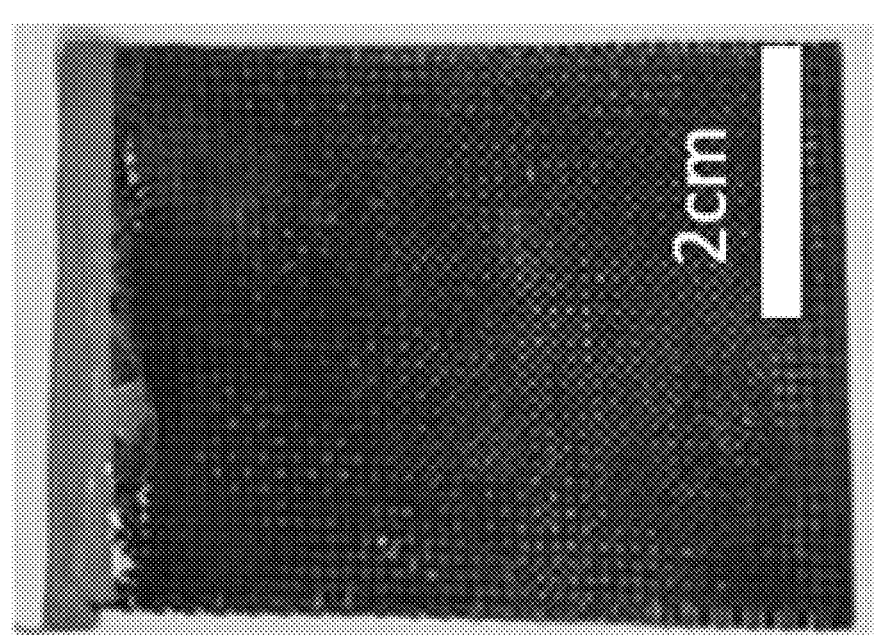
FIG. 27 depicts an example photograph from example experiments carried out in accordance with embodiments of the disclosed technology.

FIG. 27 depicts an example photograph from example experiments carried out in accordance with embodiments of the disclosed technology. Namely, FIG. 27 depicts CF fabric coated with poly-QxTh-rGO.

Figure 28:
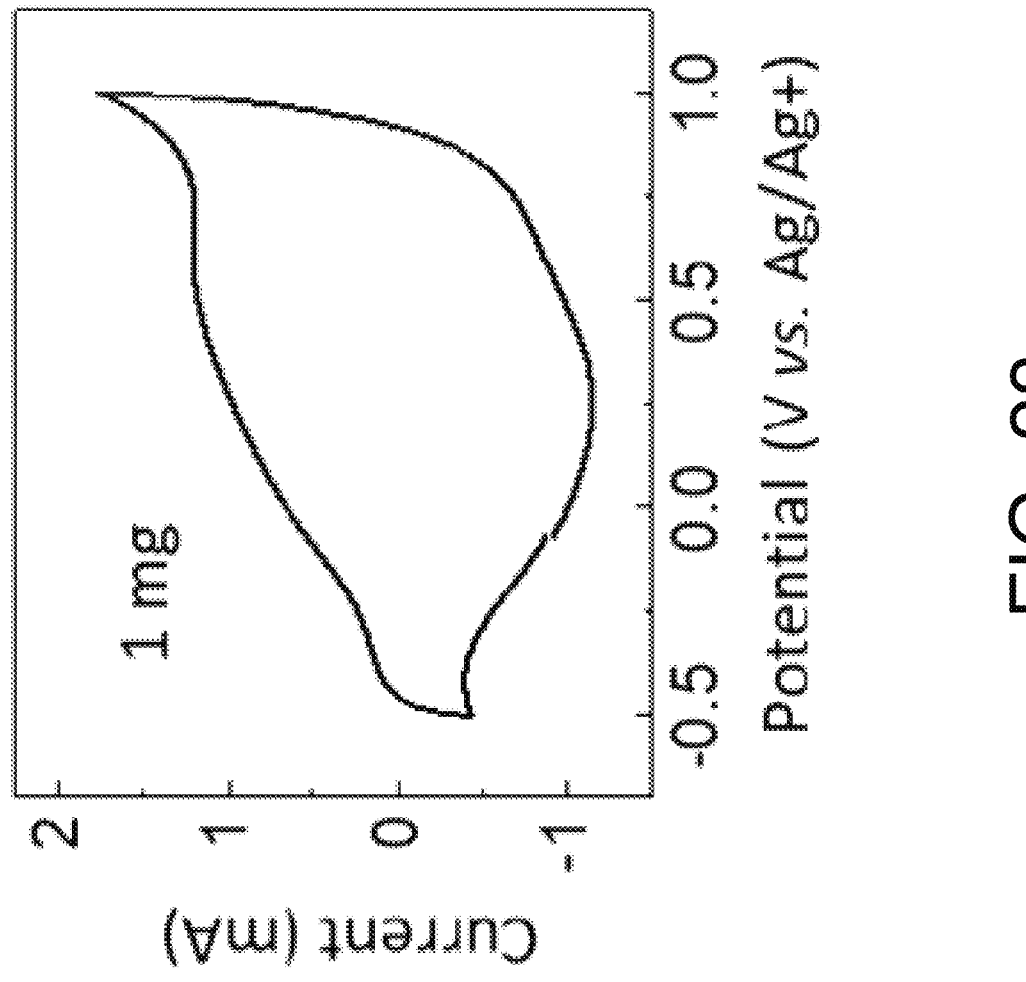
FIGS. 28-34 depict example graphs illustrating data from example experiments carried out in accordance with embodiments of the disclosed technology.
Figure 29:
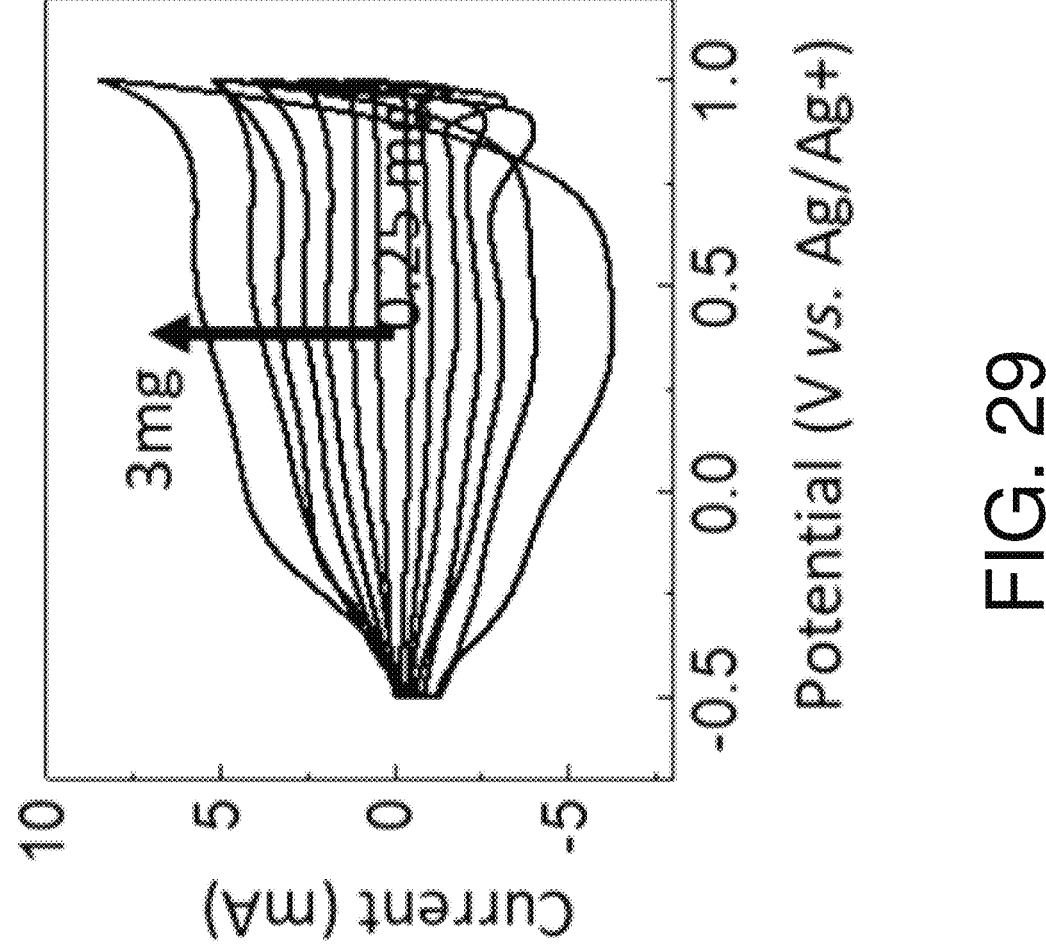
Figure 30:
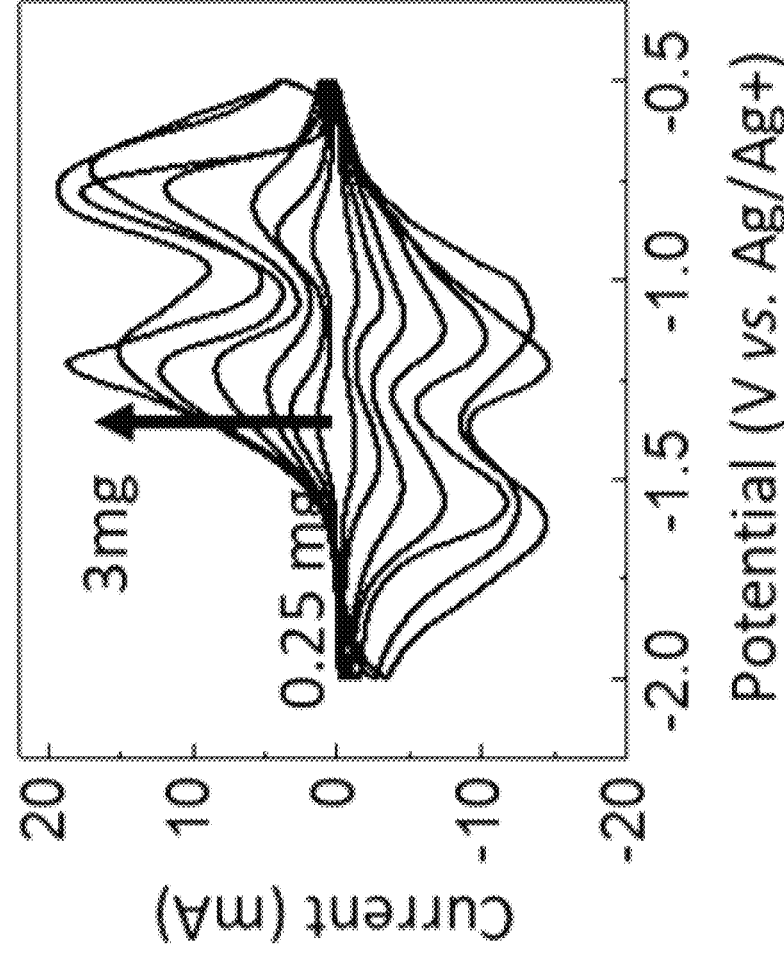
Figure 31:
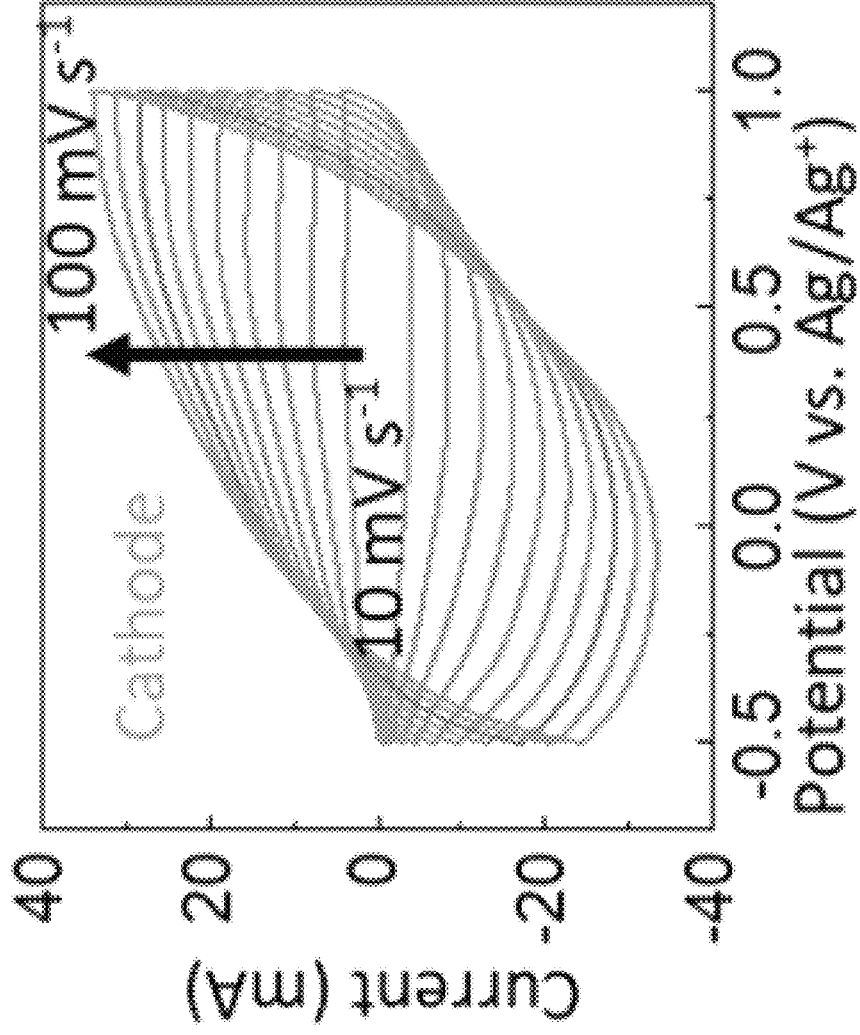
Figure 32:
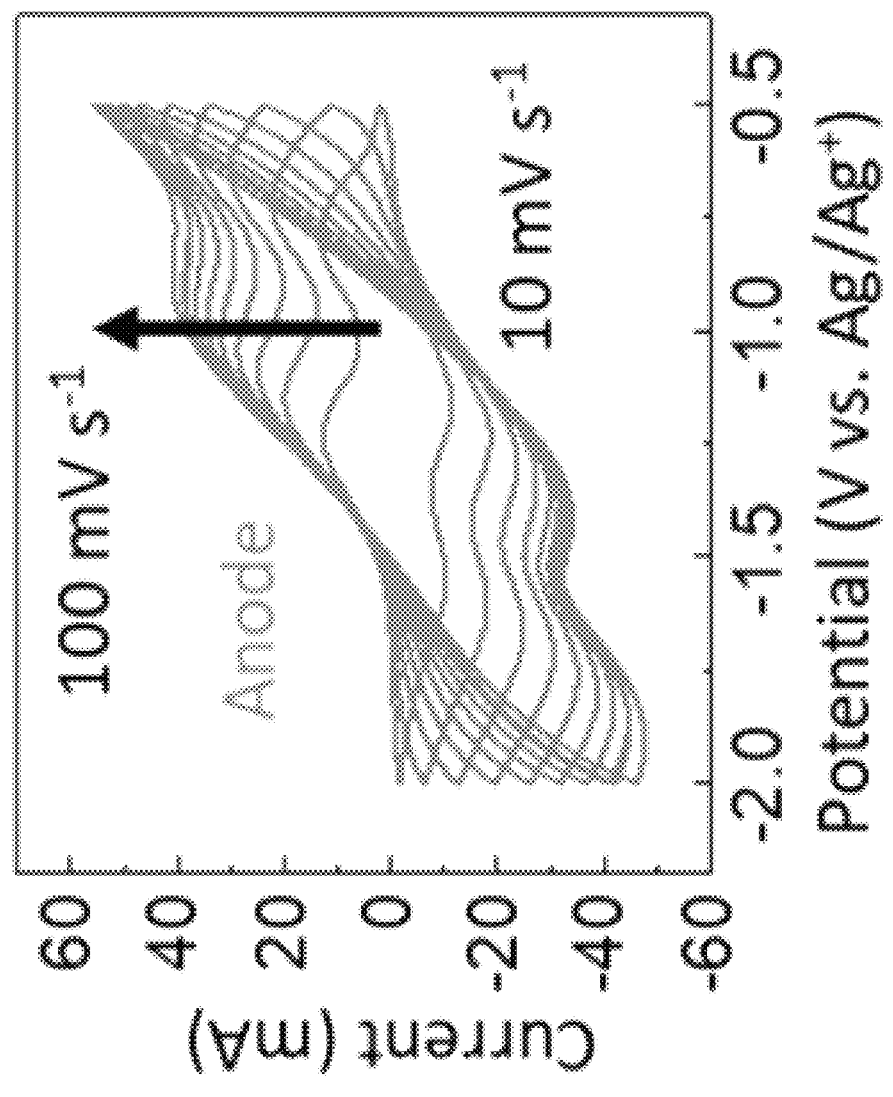
Figure 33:
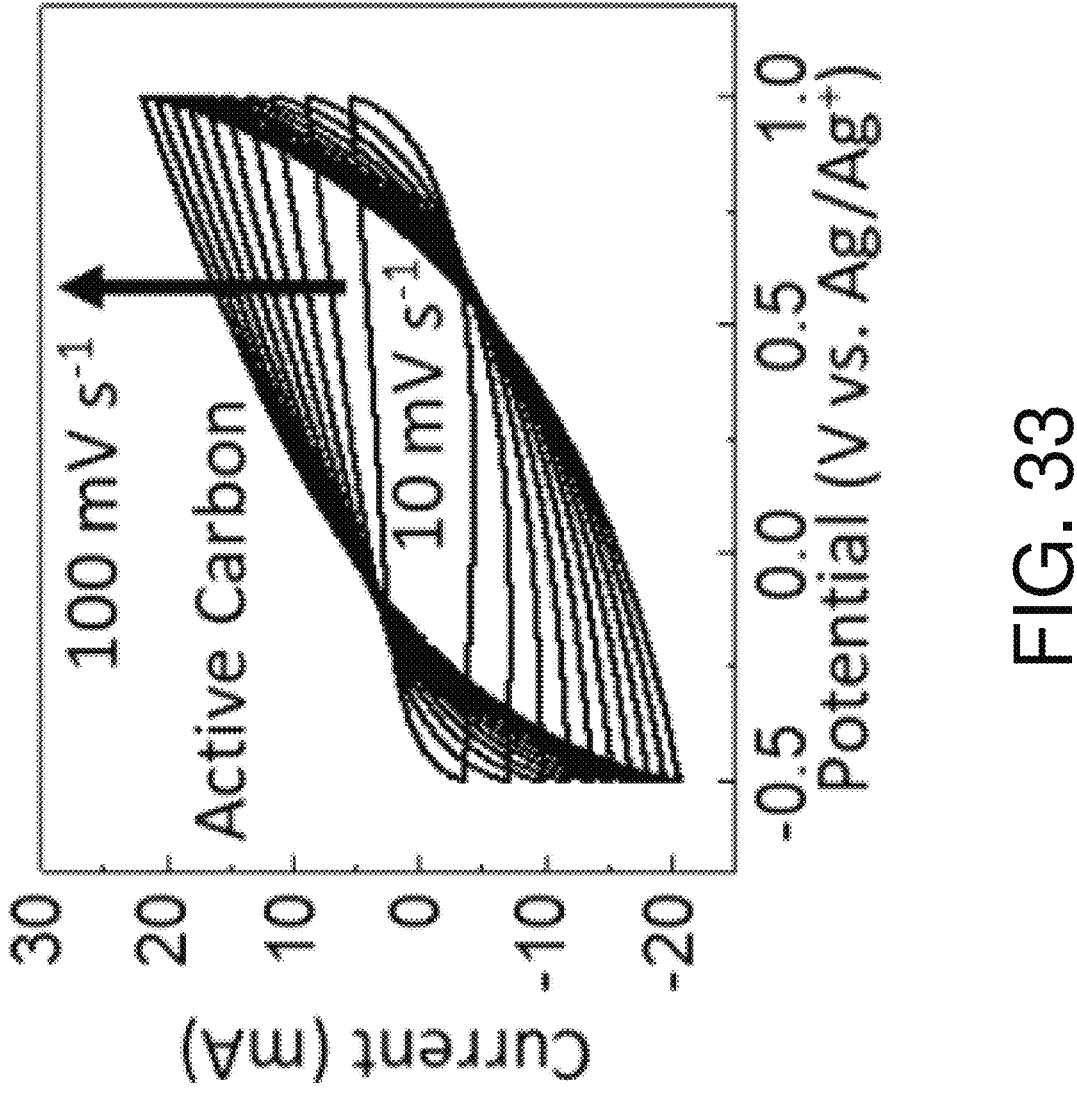
Figure 34:
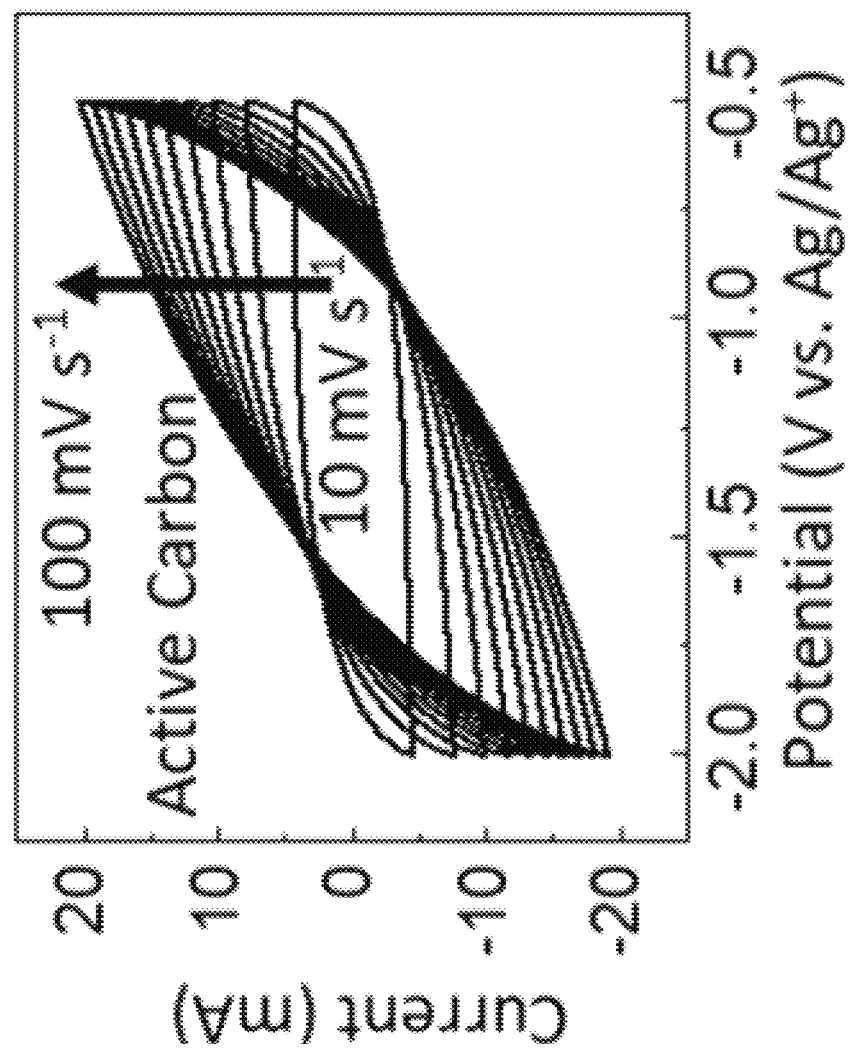

FIGS. 28-34 depict example graphs illustrating data from example experiments carried out in accordance with embodiments of the disclosed technology. Namely, FIG. 28 illustrates cyclic voltammetry (CV) at 10 mV $s^{-1}$ for a sample of poly-QxTh-rGO@CF with 1 mg QxTh-rGO loading. As depicted, in the example experiments the specific capacitance of poly-QxTh was 297.6 F $g^{-1}$; poly-QxTh-rGO was 145 F $g^{-1}$; and poly-QxTh-rGO@CF was 21 F $g^{-1}$. CV curves at 10 mV $s^{-1}$ for samples with different poly-QxTh-rGO loading, from 0.25, 0.5, 1, 1.5, 2, 2.5, 3 mg, in the (FIG. 29) cathode potential range of −0.5 V to 1 V and (FIG. 30) anode potential range of −2 V to −0.5 V. CV curves of poly-QxTh-rGO-CF (FIG. 31) cathode and (FIG. 32) anode. CV curves of active carbon (FIG. 33) cathode and (FIG. 34) anode at various scan rates.

Figure 35:
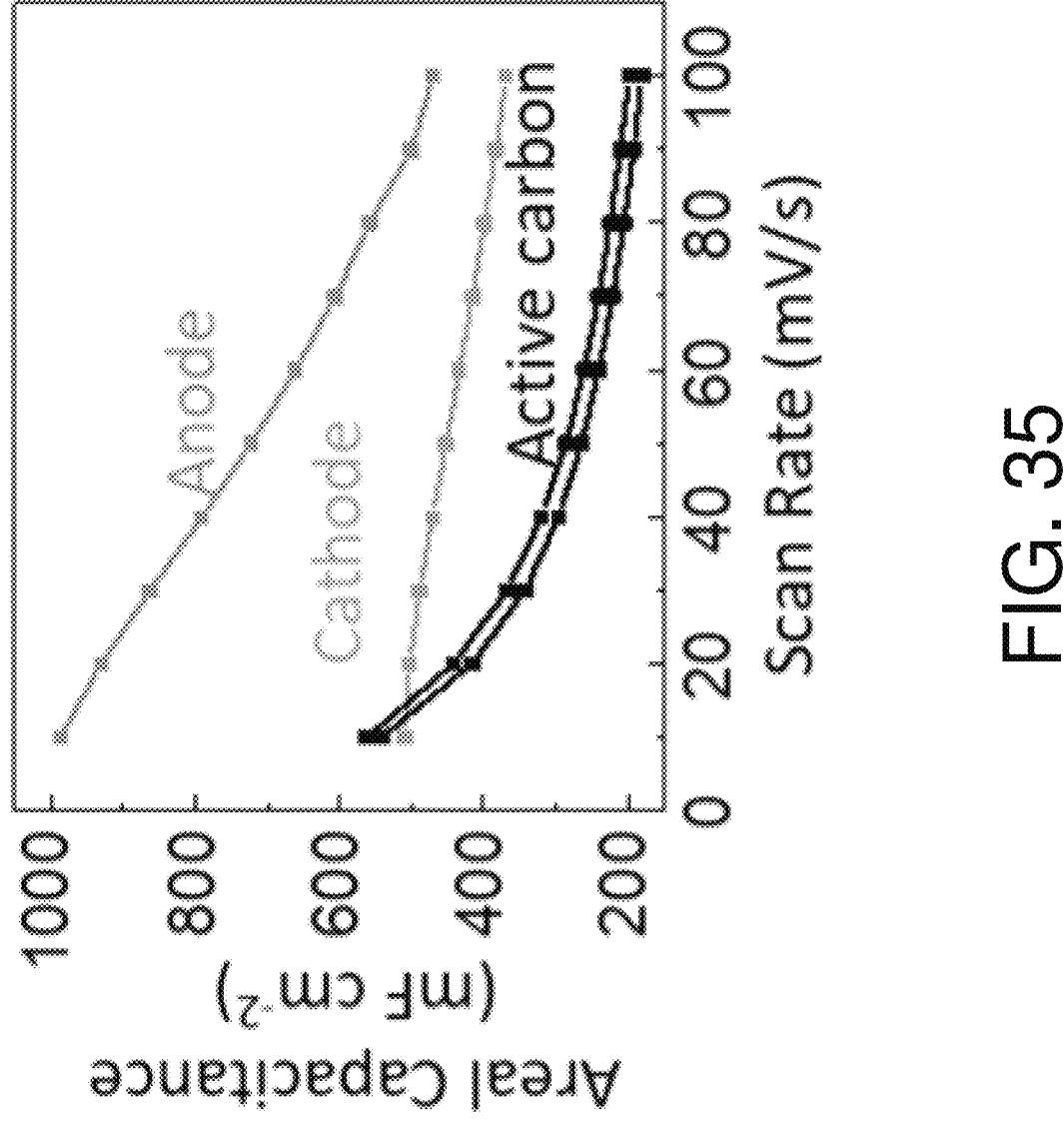
FIG. 35 depicts an example graph illustrating data from example experiments carried out in accordance with embodiments of the disclosed technology.

FIG. 35 depicts an example graph illustrating data from example experiments carried out in accordance with embodiments of the disclosed technology. Namely, FIG. 35 depicts capacitance change as a function of scan rate. The area of the electrodes in part FIG. 31 to FIG. 34 were 0.78 $cm^2$ with 3 mg poly-QxTh-rGO loading.

FIG. 36 depicts an example table illustrating data from example experiments carried out in accordance with embodiments of the disclosed technology. Namely, FIG. 36 depicts poly-QxTh-rGO loading on CF electrodes (0.78 cm2, 9.93 mg). The specific capacitance accounted for the combined mass of poly-QxTh-rGO and CF.

Figure 37:
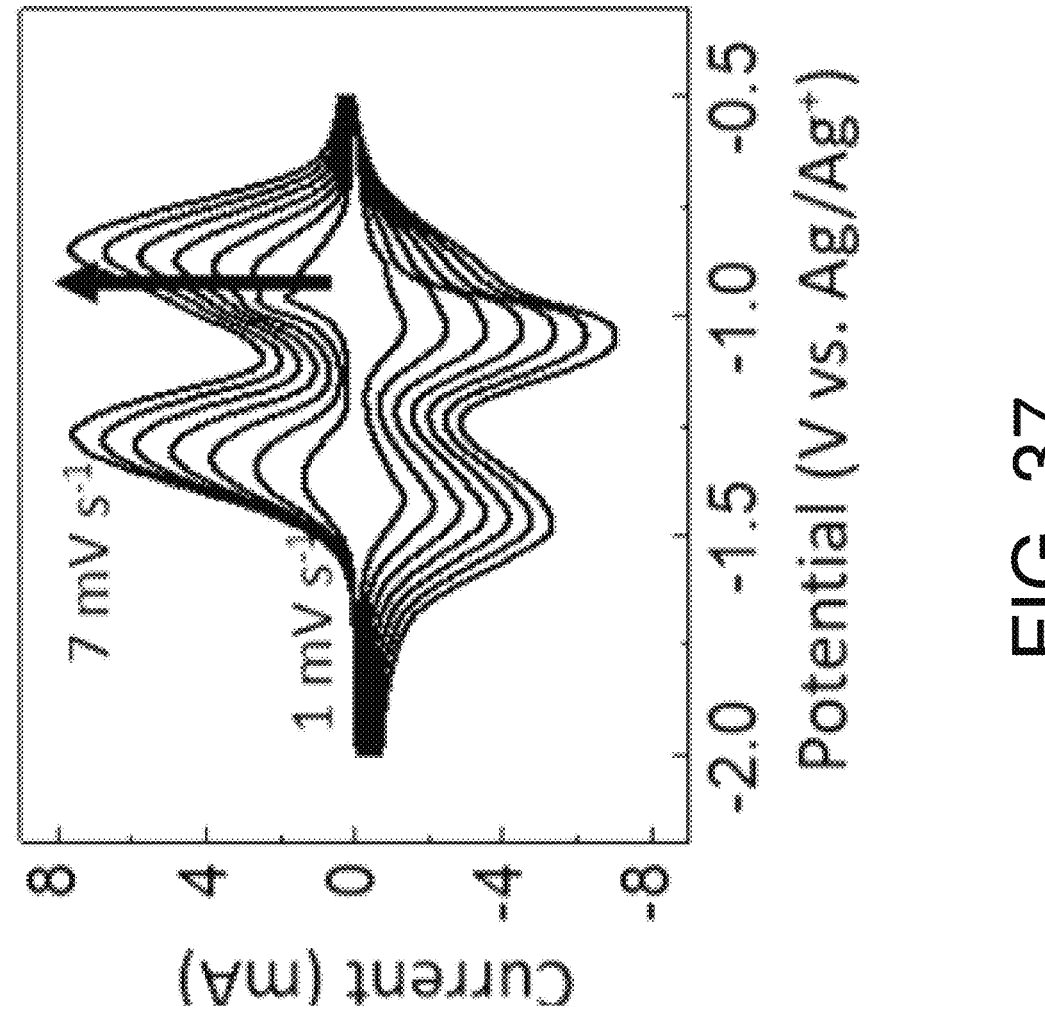
FIG. 37 depicts an example graph illustrating data from example experiments carried out in accordance with embodiments of the disclosed technology.

FIG. 37 depicts an example graph illustrating data from example experiments carried out in accordance with embodiments of the disclosed technology. Namely, FIG. 37 depicts CV curves from 1 mV s-1 to 7 mV s-1 of poly-QxTh-rGO@CF electrode with 2 mg poly-QxTh-rGO loading.

Figure 38:
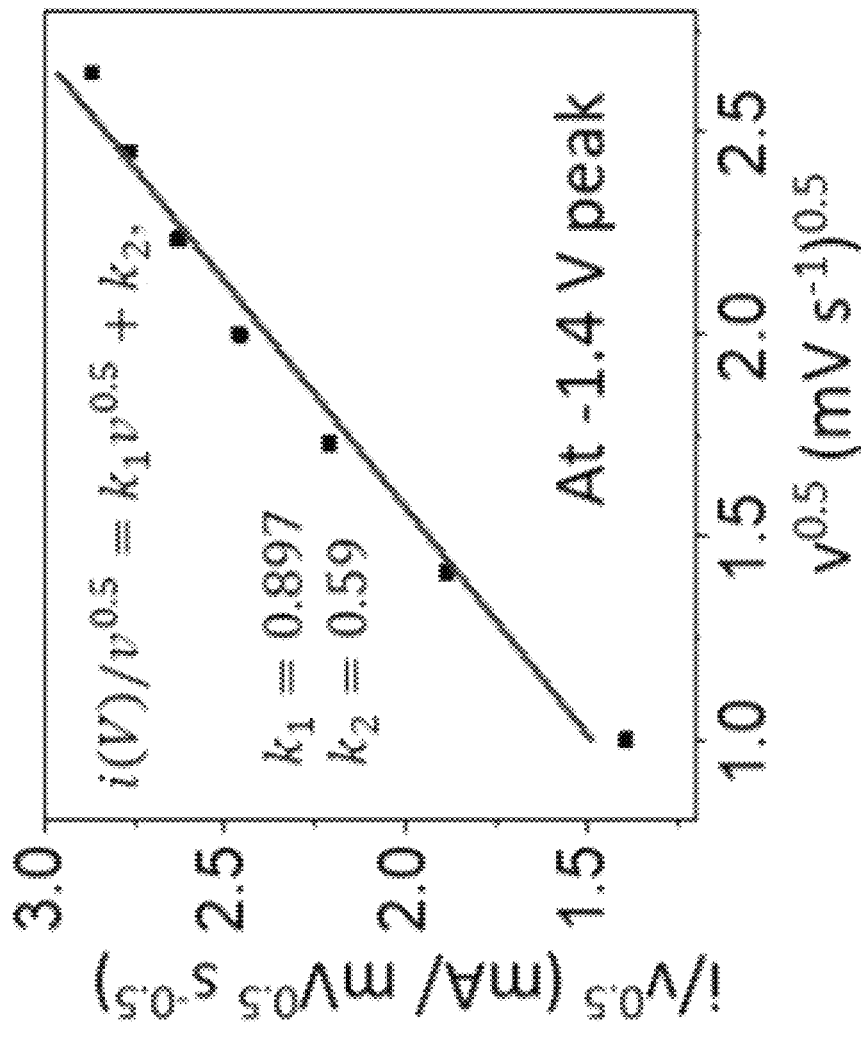
FIG. 38 depicts an example graph illustrating data from example experiments carried out in accordance with embodiments of the disclosed technology.

FIG. 38 depicts an example graph illustrating data from example experiments carried out in accordance with embodiments of the disclosed technology. Namely, FIG. 38 depicts current divided by scan rate at the oxidation peak of −1.4V as a function of scan rates (solid line is the fitting curve).

Figure 39:
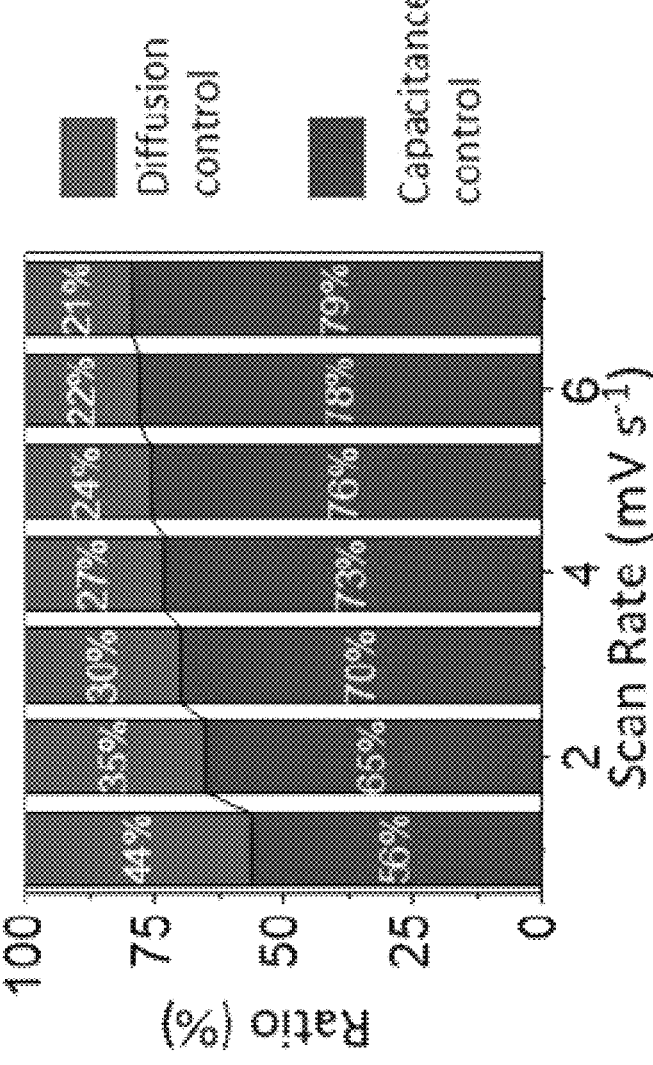
FIG. 39 depicts an example graph illustrating data from example experiments carried out in accordance with embodiments of the disclosed technology.

FIG. 39 depicts an example graph illustrating data from example experiments carried out in accordance with embodiments of the disclosed technology. Namely, FIG. 39 depicts a ratio of current contribution from capacitive versus redox mechanism. The equations used for ratio calculation follow.

$$\text{Ratio of capacitive contribution} = k_1 v / (k_1 v + k_2 v^{0.5})$$

$$\text{Ratio of redox/diffusion contribution} = k_2 v^{0.5} / (k_1 v + k_2 v^{0.5})$$

Figure 40:
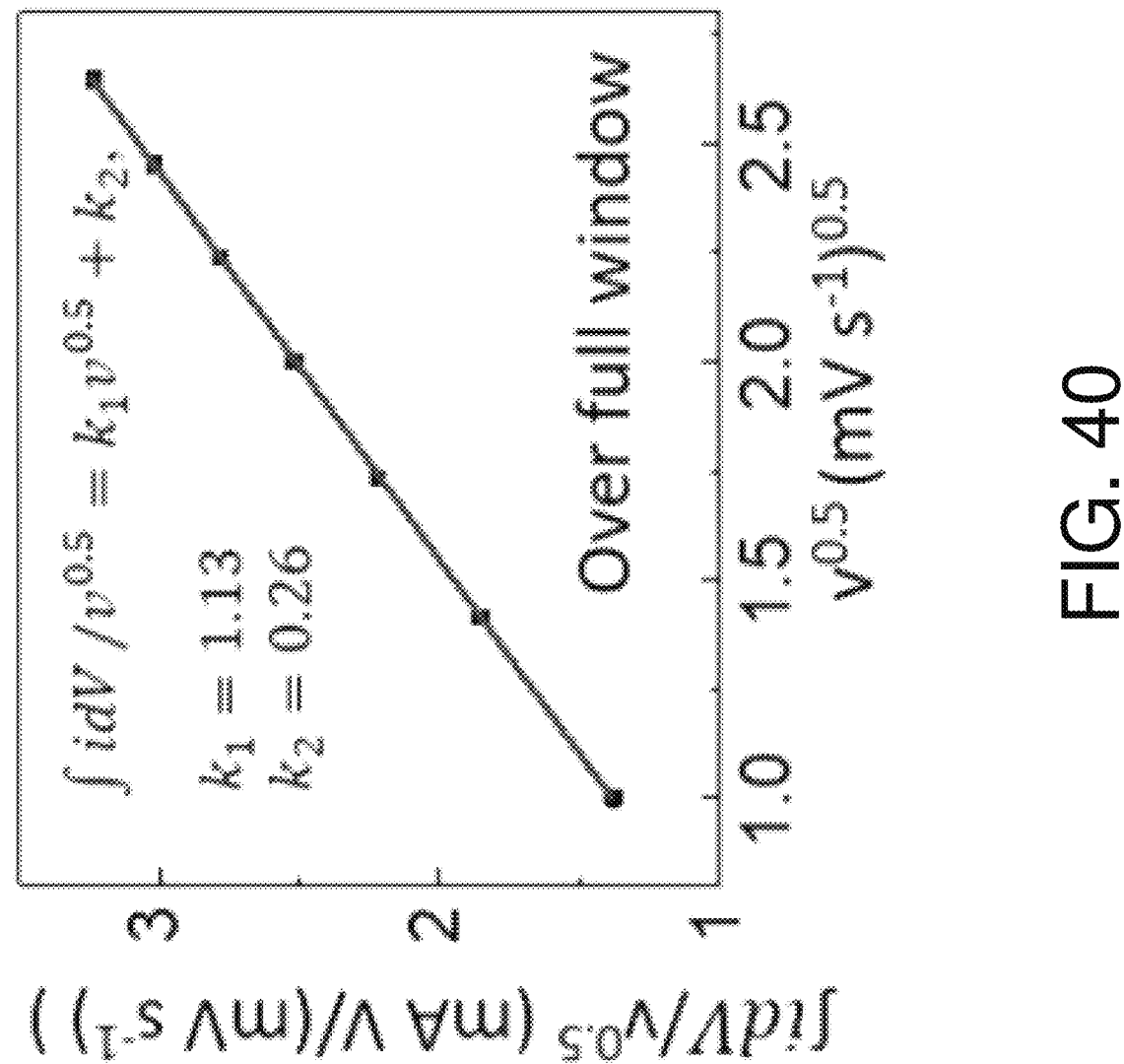
FIG. 40 depicts an example graph illustrating data from example experiments carried out in accordance with embodiments of the disclosed technology.

FIG. 40 depicts an example graph illustrating data from example experiments carried out in accordance with embodiments of the disclosed technology. Namely, FIG. 40 depicts integrated area of each CV curve divided by the respective scan rate, as a function of scan rates. This was done to average over the full potential window, as opposed to only at one peak voltage as done in FIG. 38.

Figure 41:
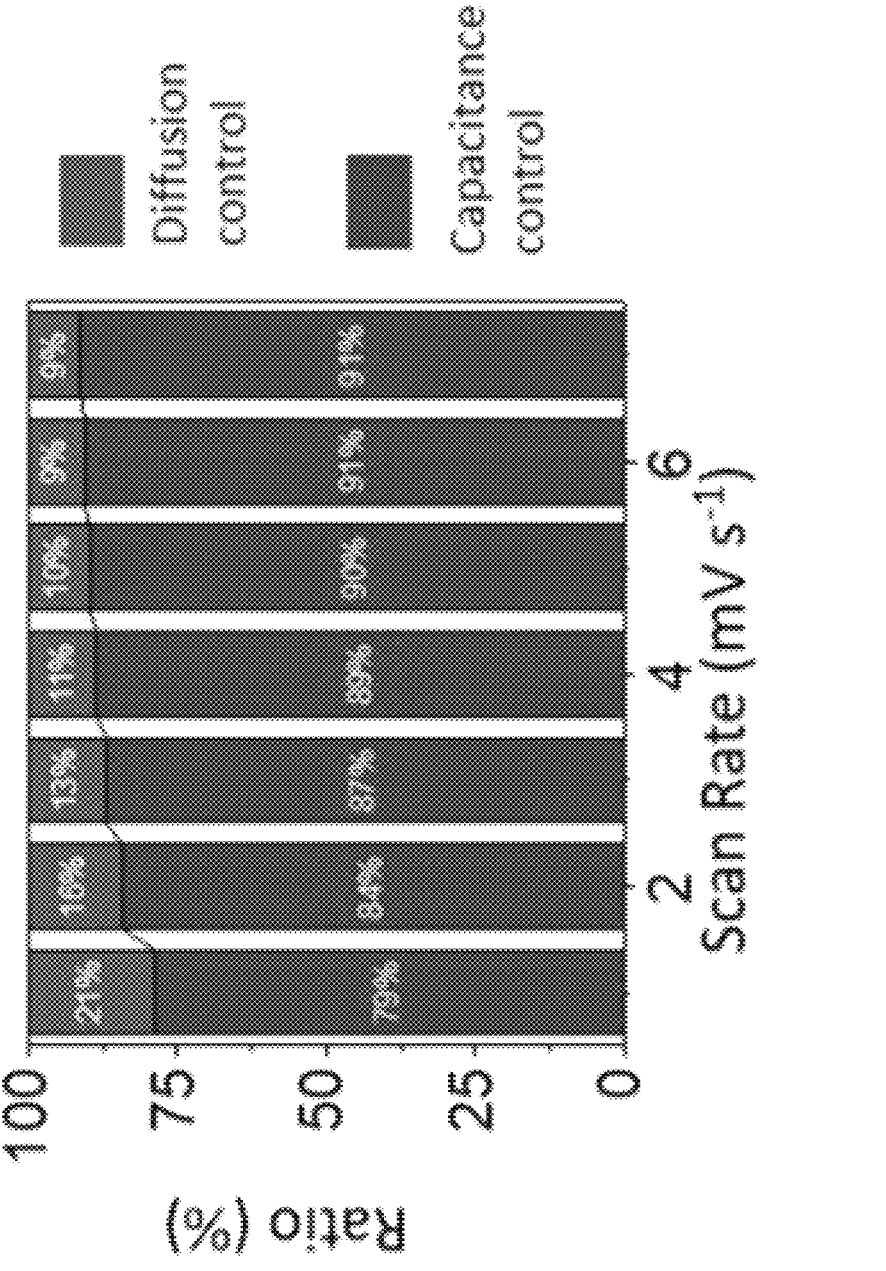
FIG. 41 depicts an example graph illustrating data from example experiments carried out in accordance with embodiments of the disclosed technology.

FIG. 41 depicts an example graph illustrating data from example experiments carried out in accordance with embodiments of the disclosed technology. Namely, FIG. 41 depicts a ratio of capacitive versus redox mechanism calculated from FIG. 40.

Figure 42:
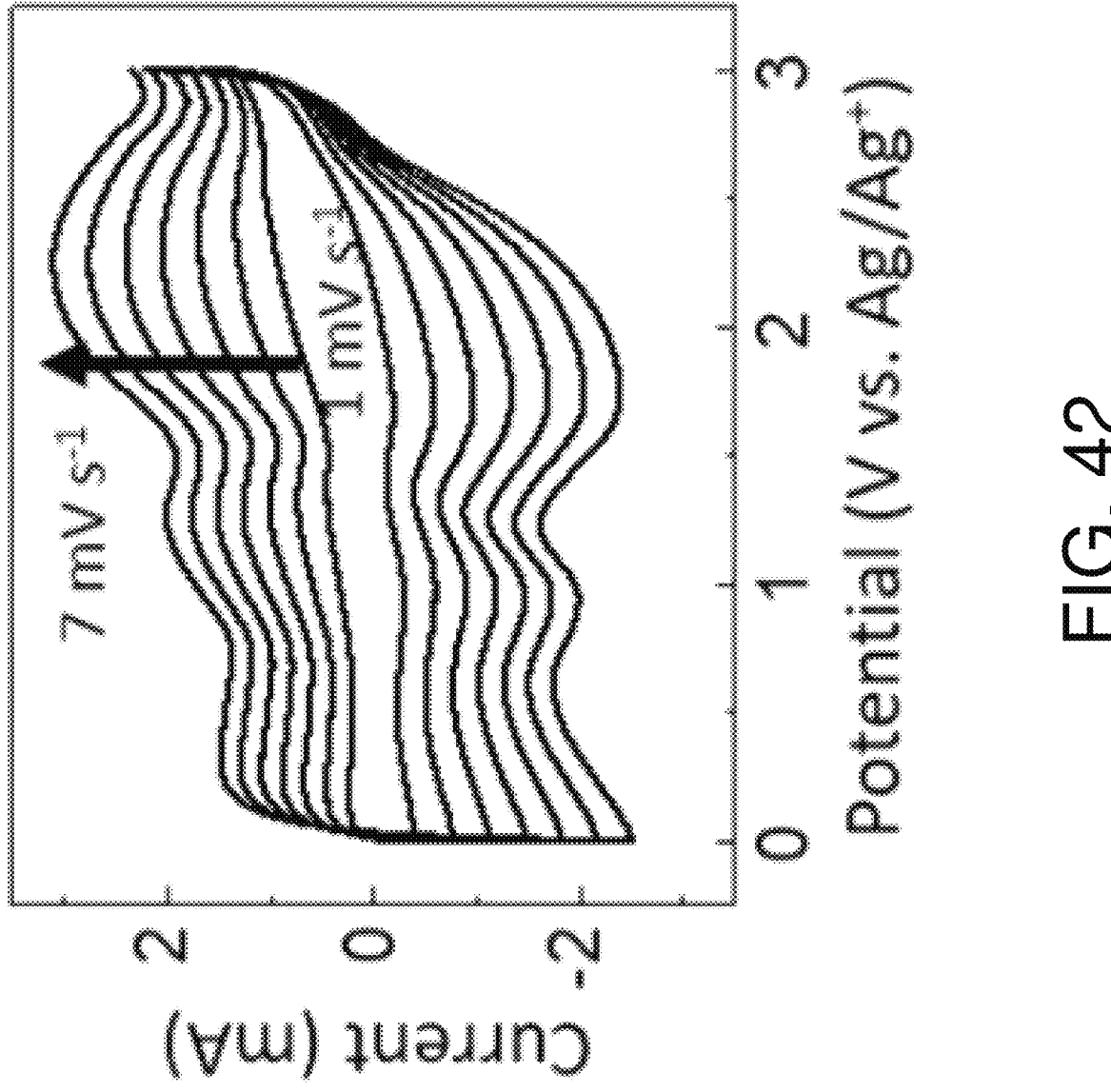
FIG. 42 depicts an example graph illustrating data from example experiments carried out in accordance with embodiments of the disclosed technology.

FIG. 42 depicts an example graph illustrating data from example experiments carried out in accordance with embodiments of the disclosed technology. Namely, FIG. 42 depicts CV curves from 1 mV s-1 to 7 mV $\text{s}^{-1}$ of poly-QxTh-rGO@CF on a supercapacitor with a liquid electrolyte of 0.5M $\text{TEABF}_4$ in PC.

Figure 43:
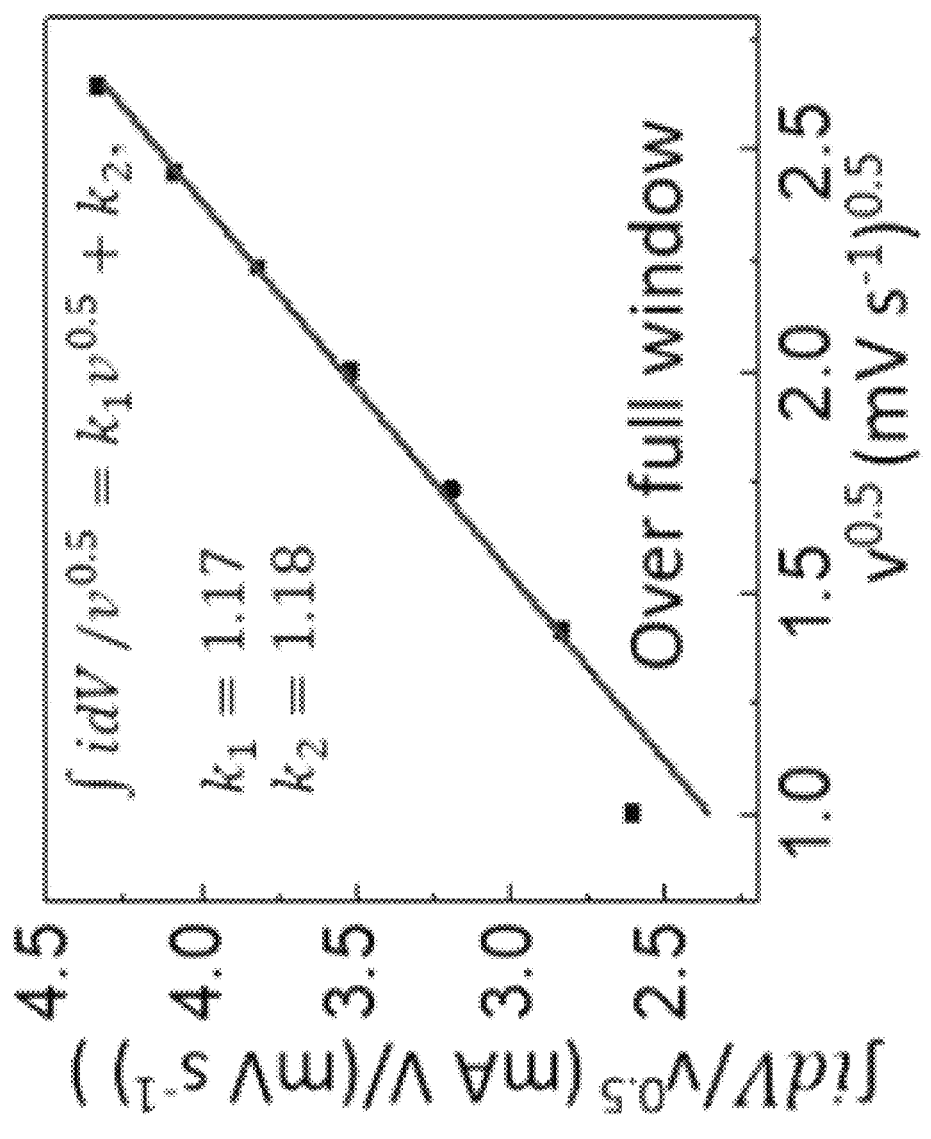
FIG. 43 depicts an example graph illustrating data from example experiments carried out in accordance with embodiments of the disclosed technology.

FIG. 43 depicts an example graph illustrating data from example experiments carried out in accordance with embodiments of the disclosed technology. Namely, FIG. 43 depicts integrated area of each CV curve divided by the respective scan rate, as a function of scan rates.

Figure 44:
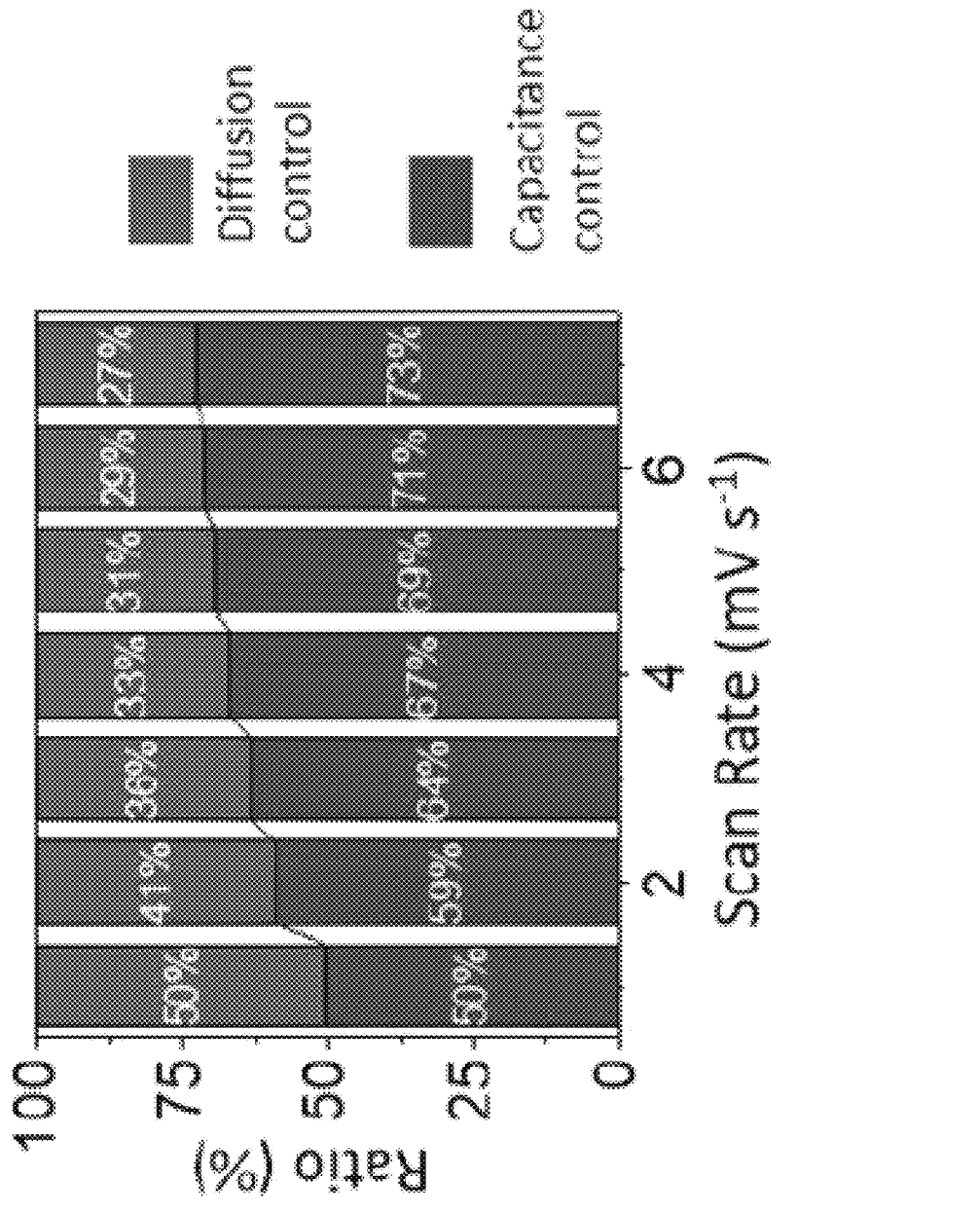
FIG. 44 depicts an example graph illustrating data from example experiments carried out in accordance with embodiments of the disclosed technology.

FIG. 44 depicts an example graph illustrating data from example experiments carried out in accordance with embodiments of the disclosed technology. Namely, FIG. 44 depicts a ratio of capacitive versus redox mechanism calculated from FIG. 43.

Figure 45:
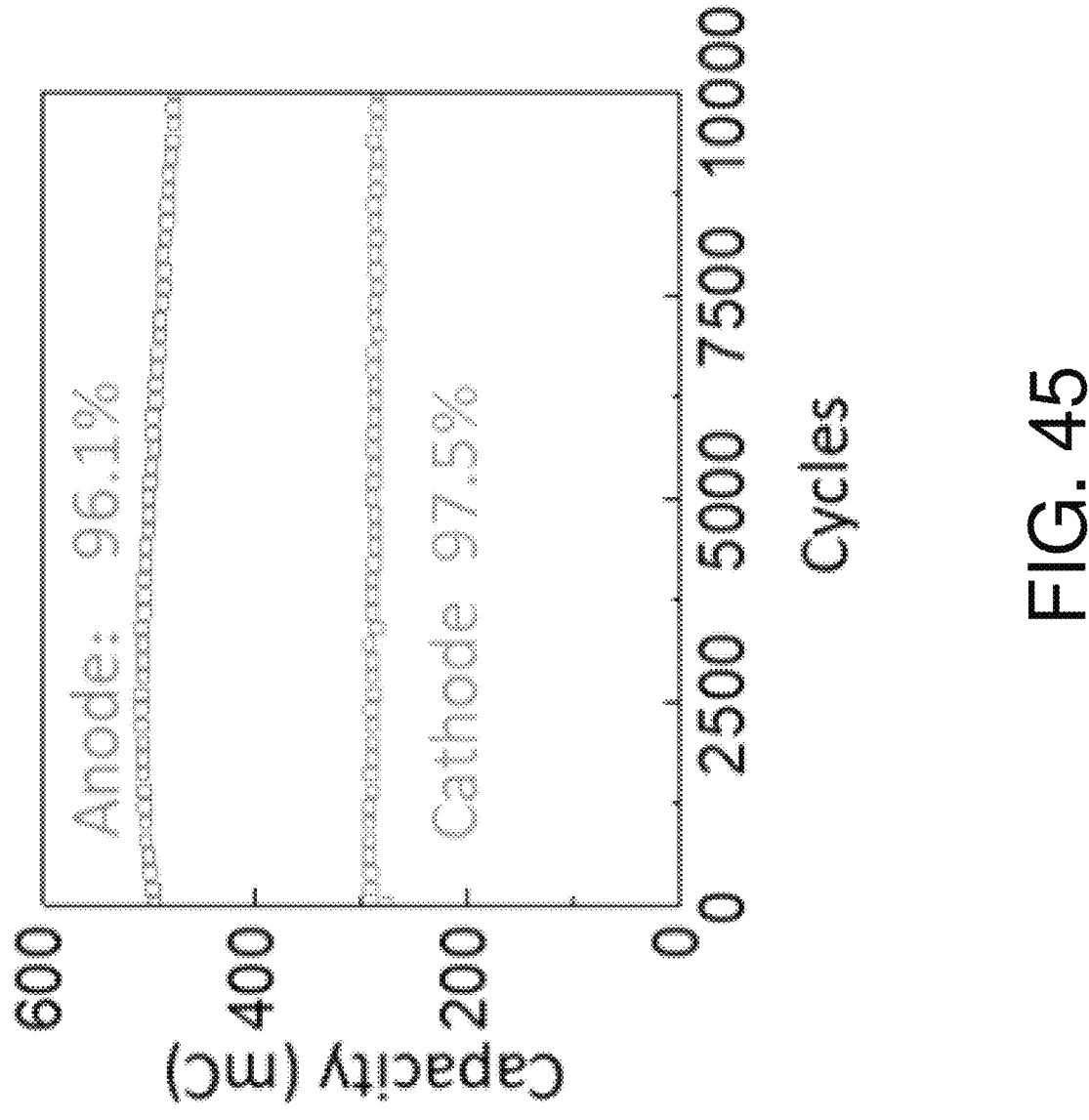
FIGS. 45-47 depict example graphs illustrating data from example experiments carried out in accordance with embodiments of the disclosed technology.
Figure 46:
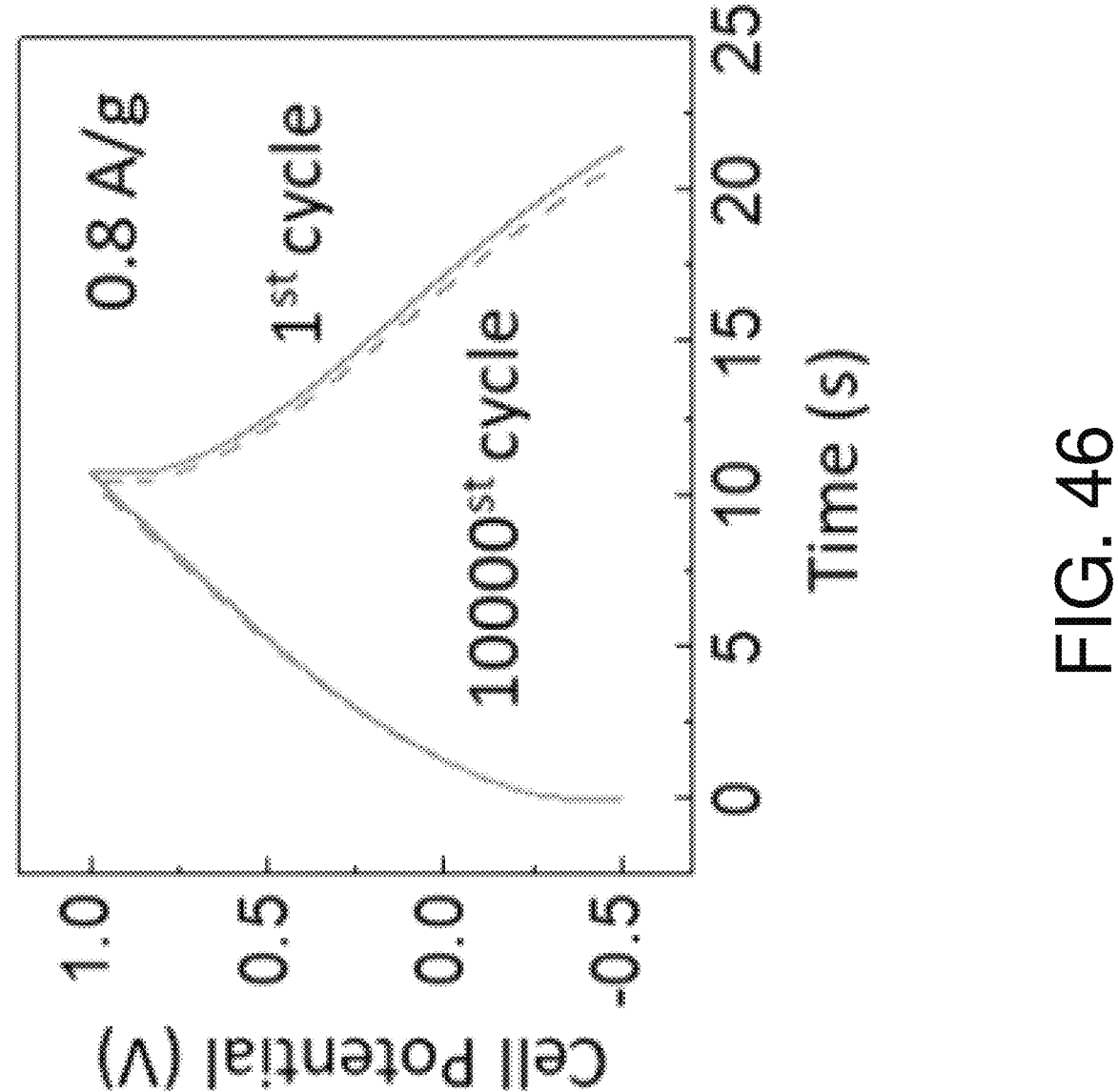
Figure 47:
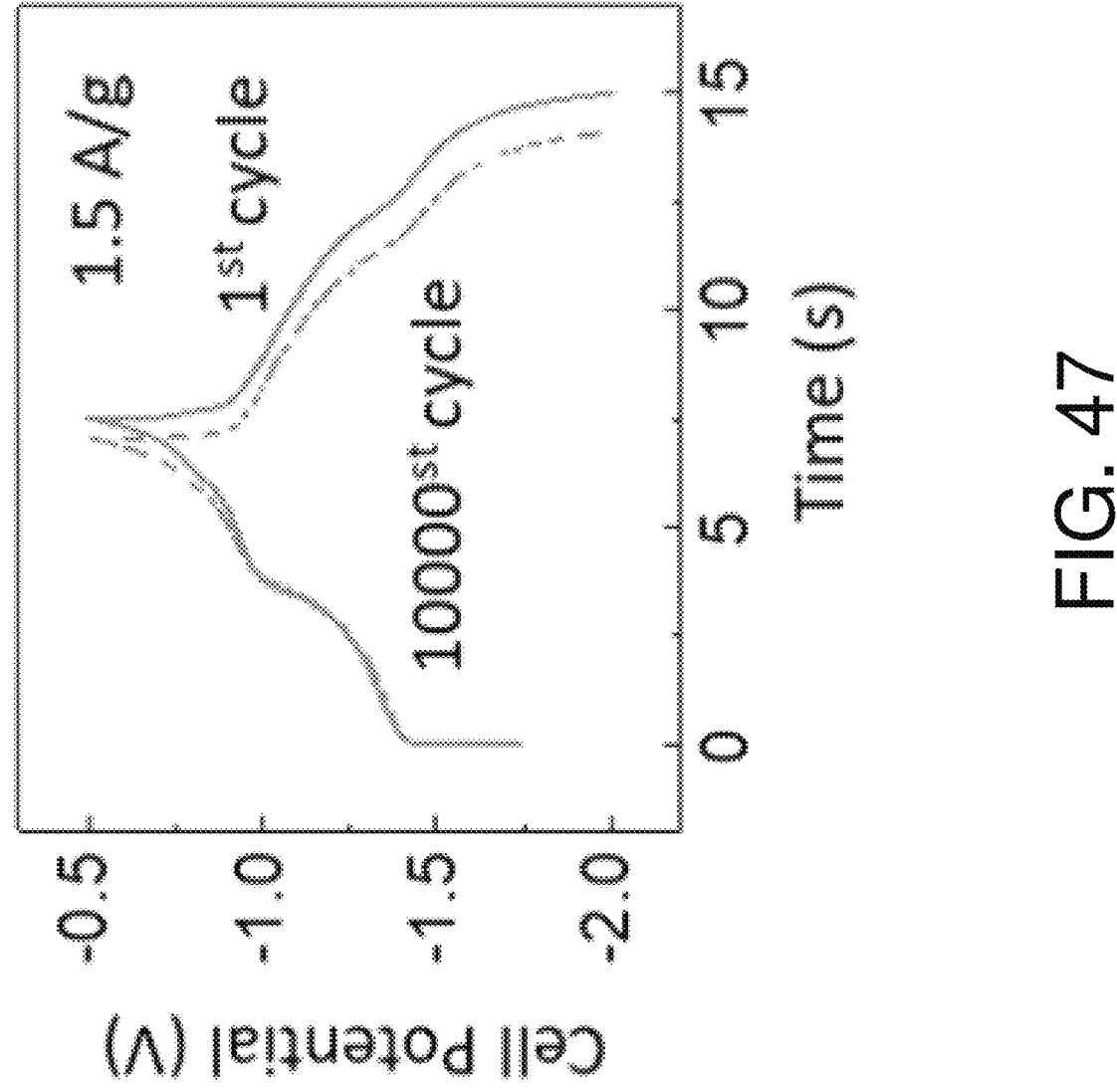

FIGS. 45-47 depict example graphs illustrating data from example experiments carried out in accordance with embodiments of the disclosed technology. Namely, FIG. 45 depicts redox cycling performance of poly-QxTh-rGO-CF electrodes in a 3-electrode setup with 0.5 M $\text{TEABF}_4$/PC electrolyte. FIG. 46 depicts the 1st and 10000st galvanostatic charge-discharge (GCD) characteristics of the cathode. FIG. 47 depicts the 1st and 10000st galvanostatic charge-discharge (GCD) characteristics of the anode.

Figure 48:
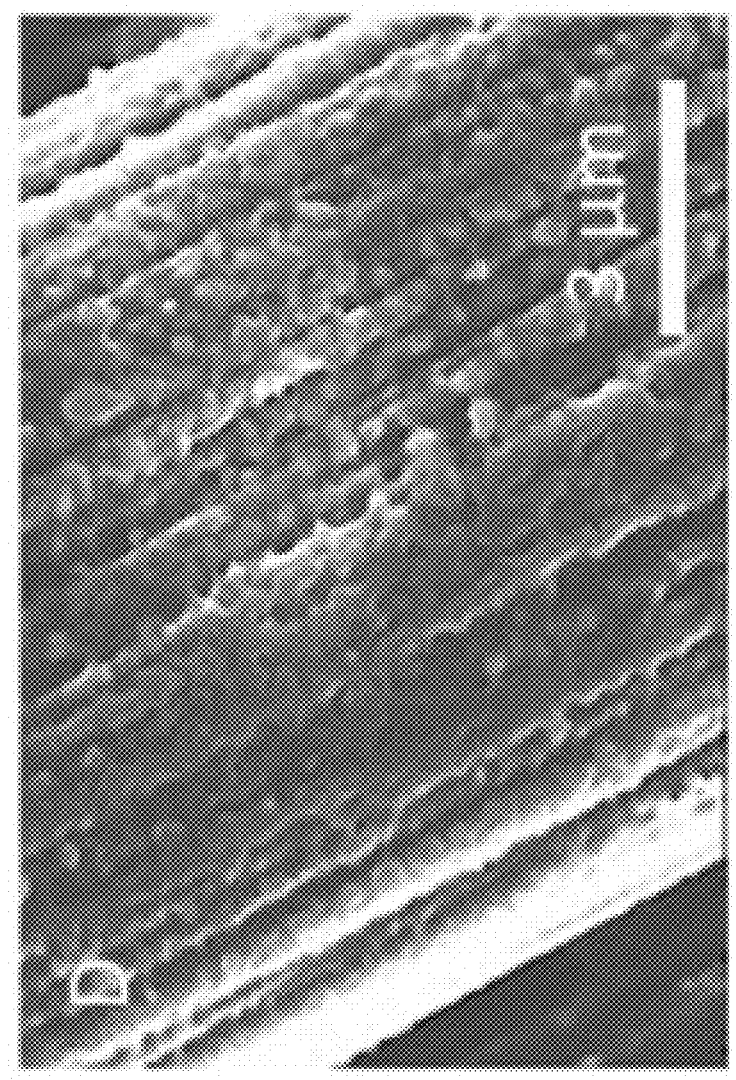
FIGS. 48-51 depict example scanning electron microscopy (SEM) images from example experiments carried out in accordance with embodiments of the disclosed technology.
Figure 49:
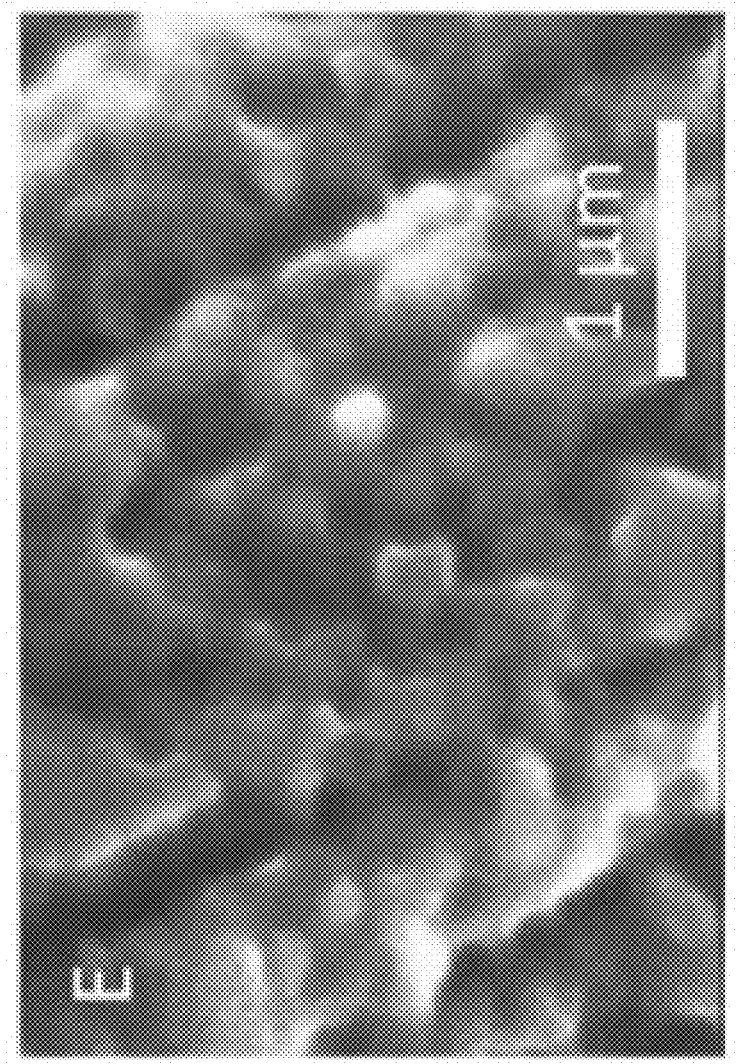
Figure 50:
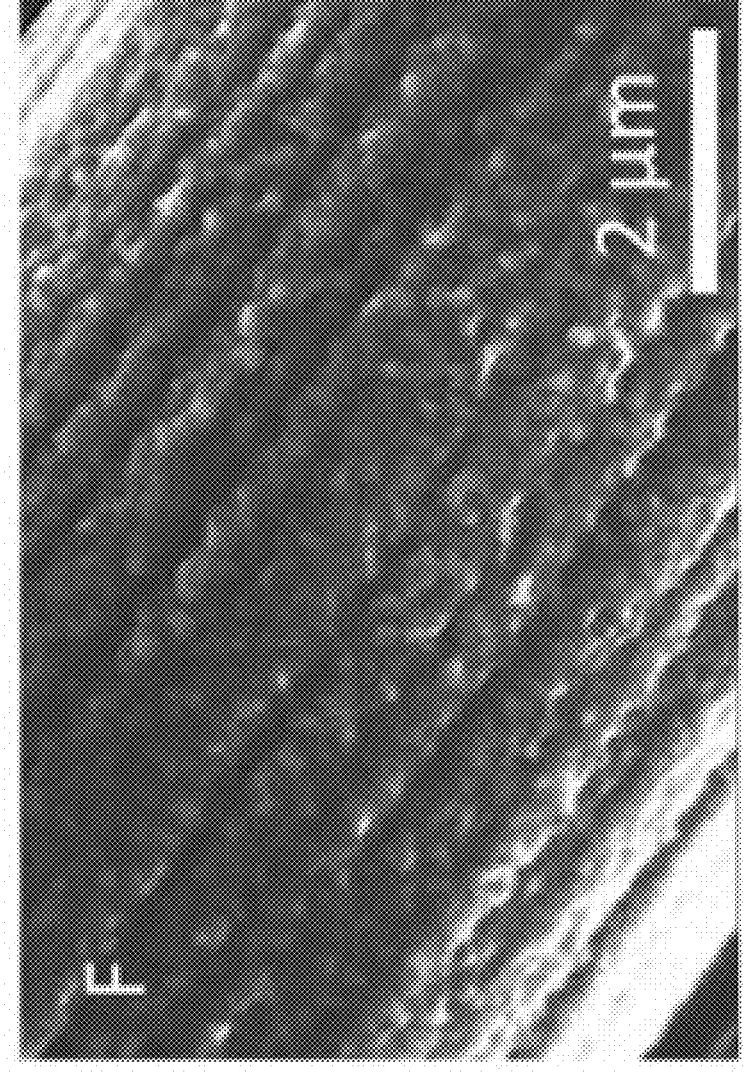
Figure 51:
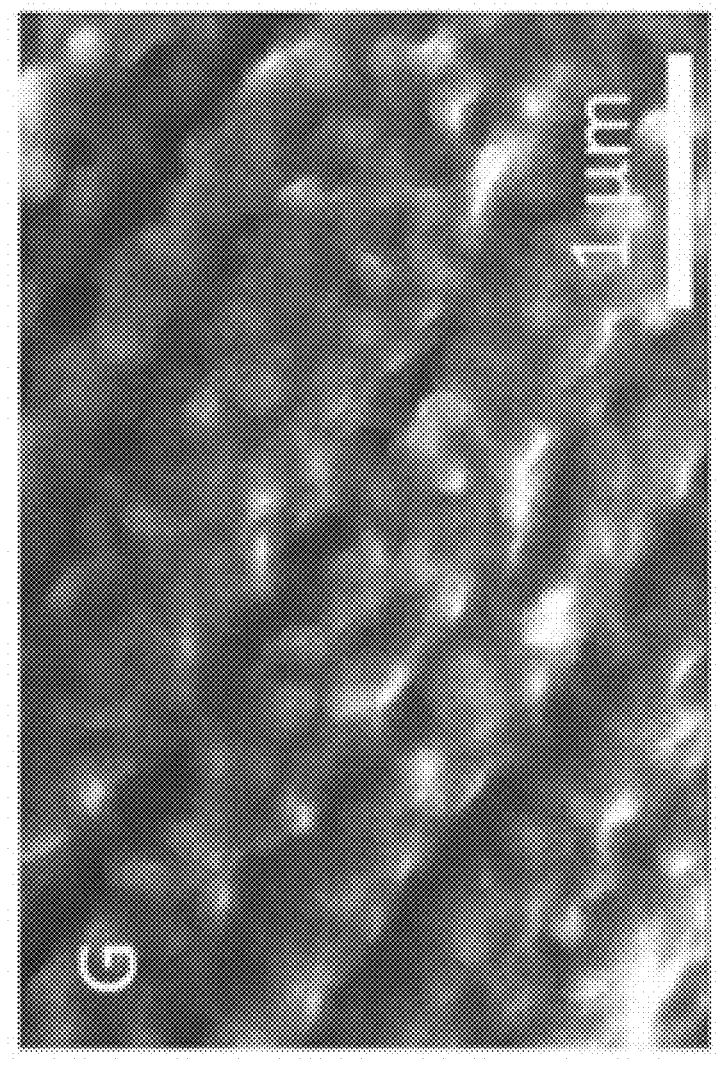

FIGS. 48-51 depict example scanning electron microscopy (SEM) images from example experiments carried out in accordance with embodiments of the disclosed technology. Namely, FIGS. 48-49 depict SEM images of CF-poly-QxTh-rGO before the 10000 charge-discharge cycles. FIGS. 50-51 depict SEM images of the CF-poly-QxTh-rGO after the 10000 charge-discharge cycles.

Figure 52:
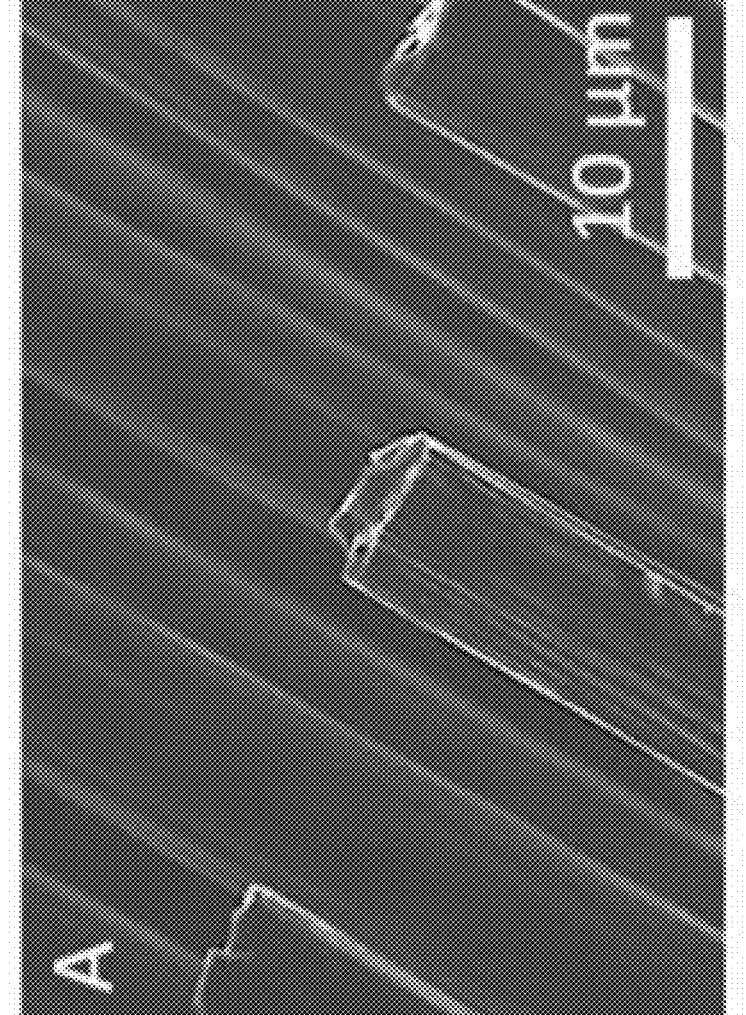
FIGS. 52-55 also depict example scanning electron microscopy (SEM) images from example experiments carried out in accordance with embodiments of the disclosed technology.
Figure 53:
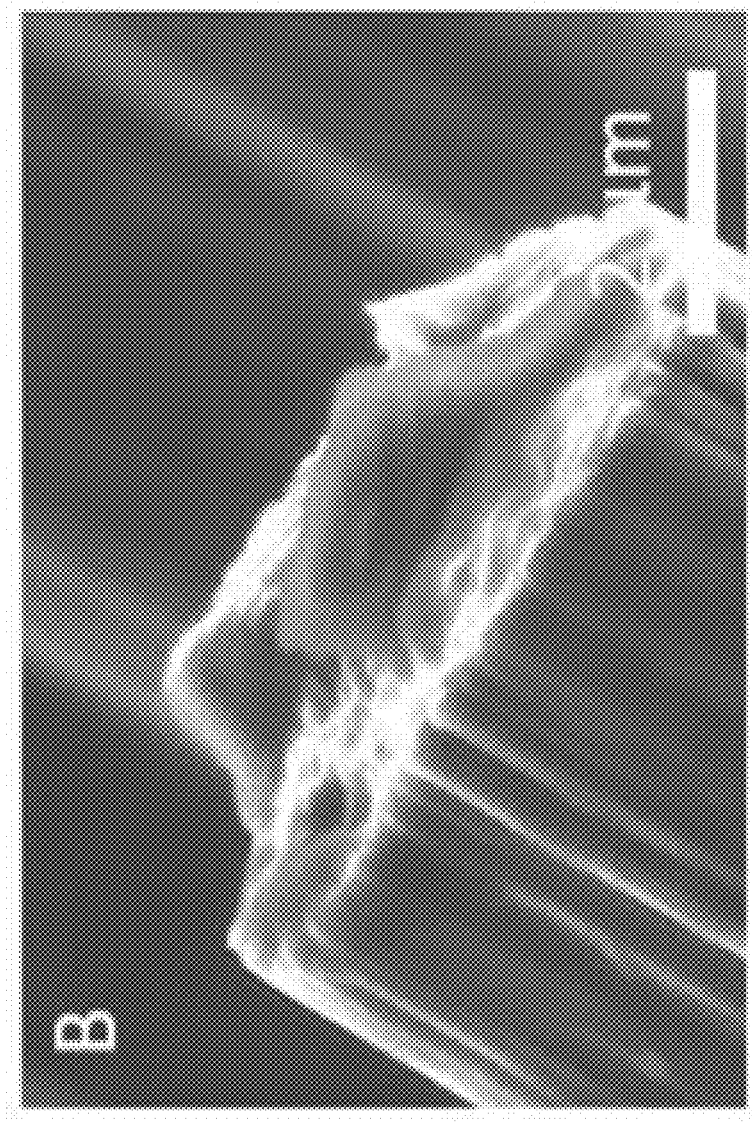
Figure 54:
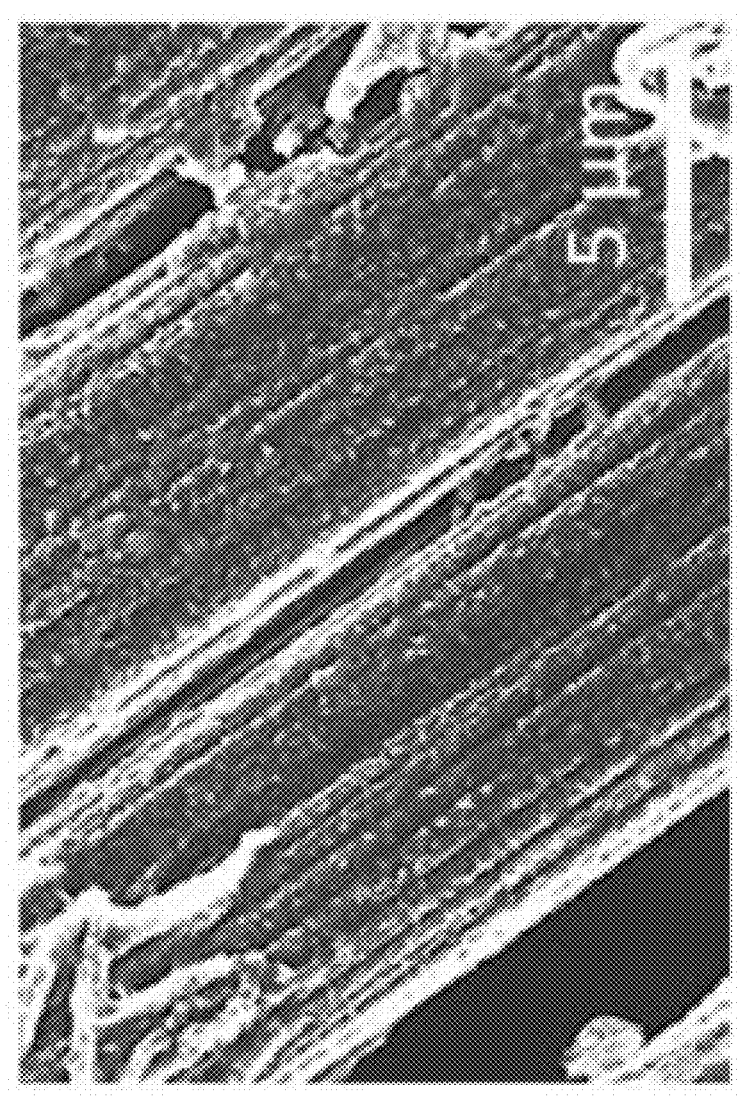
Figure 55:
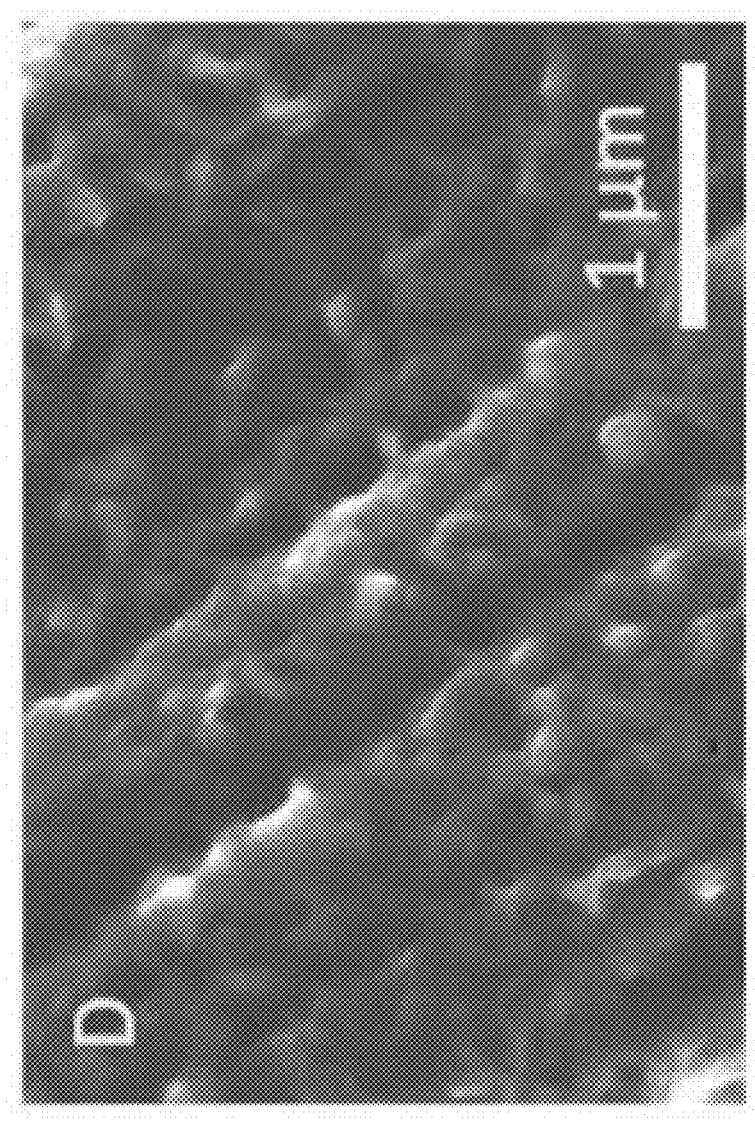

FIGS. 52-55 also depict example scanning electron microscopy (SEM) images from example experiments carried out in accordance with embodiments of the disclosed technology. Namely, FIGS. 52-53 depict SEM images of CF after a tensile test. Namely, FIGS. 54-54 depict SEM images of poly-QxTh-rGO-CF after a tensile test.

FIG. 56 depicts an example table 5600 illustrating data from example experiments carried out in accordance with embodiments of the disclosed technology. Namely, table 5600 depicts performance comparison of structural electrodes.

FIG. 57 depicts an example diagram, in accordance with embodiments of the disclosed technology. Namely, FIG. 57 depicts example chemical structures for epoxy resin and hardener used in a structural electrolyte of the present technology.

Figure 58:
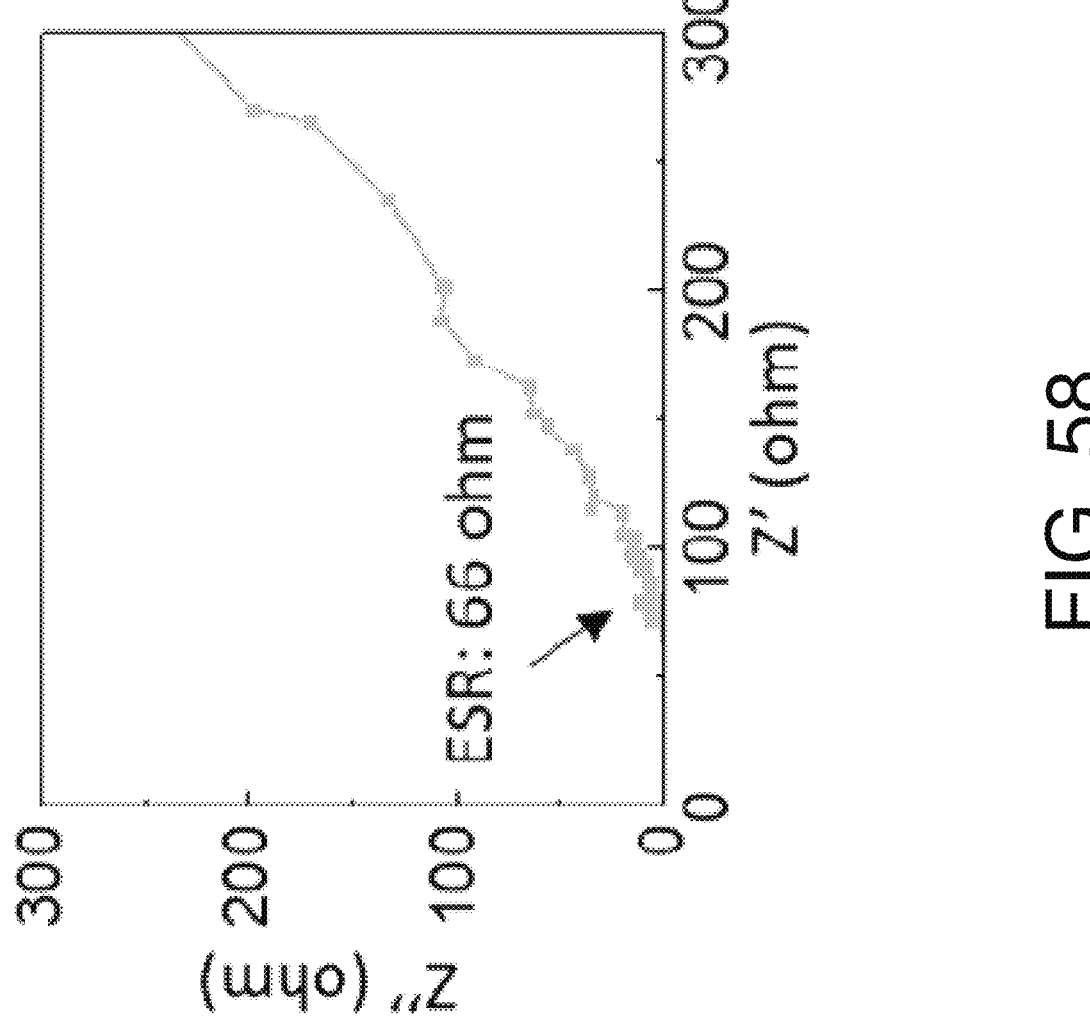
FIG. 58-59 depict example graphs illustrating data from example experiments carried out in accordance with embodiments of the disclosed technology.
Figure 59:
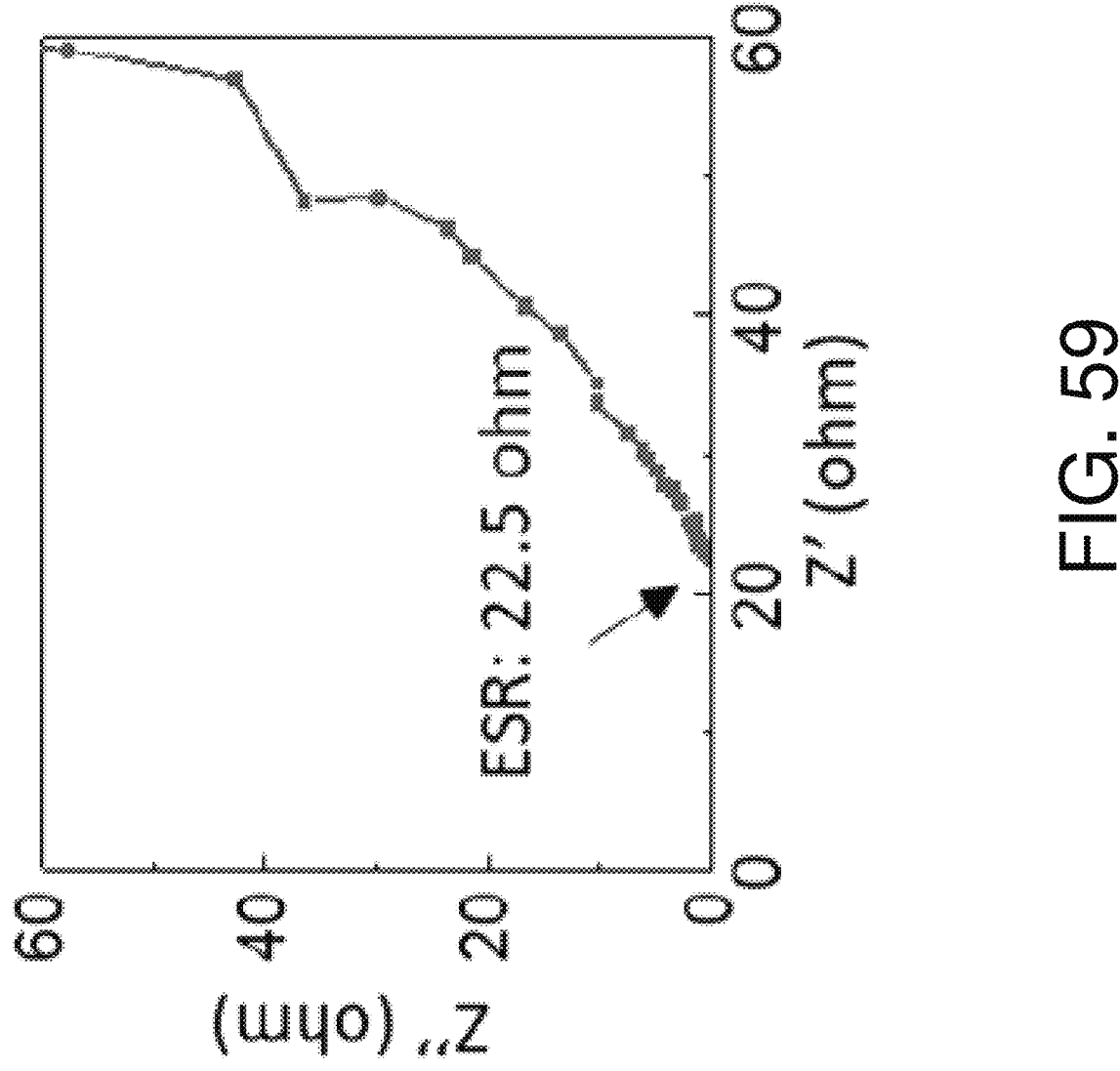

FIG. 58-59 depict example graphs illustrating data from example experiments carried out in accordance with embodiments of the disclosed technology. Namely, FIG. 58 depicts electrochemical impedance spectroscopy (EIS) of structural electrolytes with the ratio of (5.3% $\text{TEABF}_4$, 10.5% PEO). FIG. 59 depicts electrochemical impedance spectroscopy (EIS) of structural electrolytes with the ratio of (18.2% $\text{TEABF}_4$, 9% PEO). In example experiments, two 0.78 $\text{cm}^2$ carbon-fiber fabrics were used as the cathode and the anode, while cellulose paper was used as the separator in the EIS measurement, with the electrolyte thickness of ~0.07 mm.

FIG. 60 depicts an example table 6000 illustrating data from example experiments carried out in accordance with embodiments of the disclosed technology. Namely, table 6000 depicts ionic conductivity of structural electrolytes of the present technology with different PEO and salt ratios. Area of cathode and anode were 0.78 $\text{cm}^2$; the average thickness of the electrolytes was 70 μm.

Figure 61:
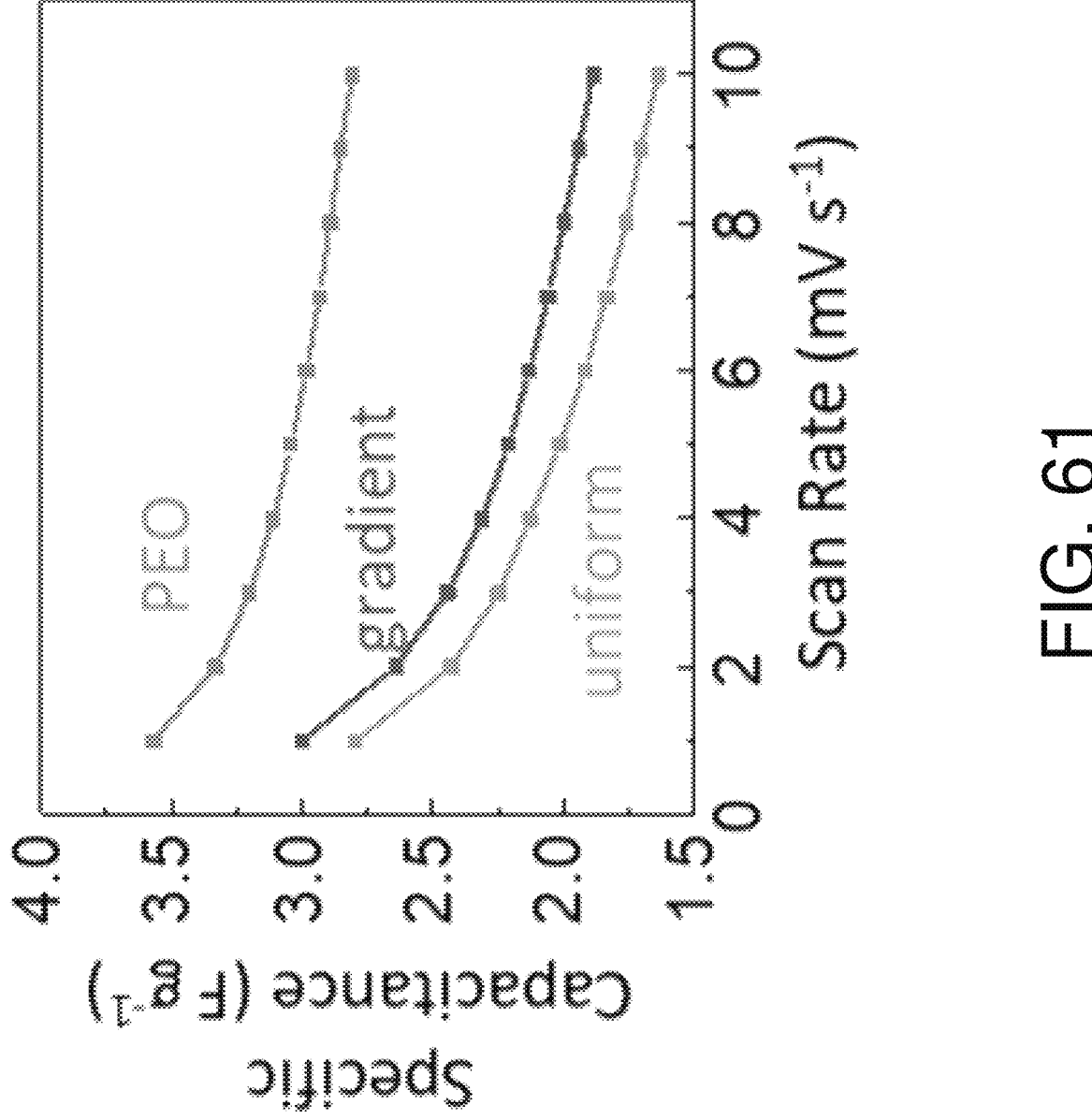
FIG. 61 depicts an example graph illustrating data from example experiments carried out in accordance with embodiments of the disclosed technology.

FIG. 61 depicts an example graph illustrating data from example experiments carried out in accordance with embodiments of the disclosed technology. Namely, FIG. 61 depicts specific capacitance versus scan rate of structural supercapacitors of the present technology with different polymer electrolytes. The poly-QxTh-rGO loading was 2 mg for the anode and 3 mg for the cathode. The composition of uniform electrolyte was approximately 5% salt and 10% PEO by weight. The gradient electrolyte was a combination for which the composition near the electrode was approximately 20% salt and 10% PEO by weight while its bulk corresponded approximately to 5% salt and 10% PEO by weight. The PEO electrolyte had the same salt ratio as the uniform electrolyte but no epoxy.

Figure 62:
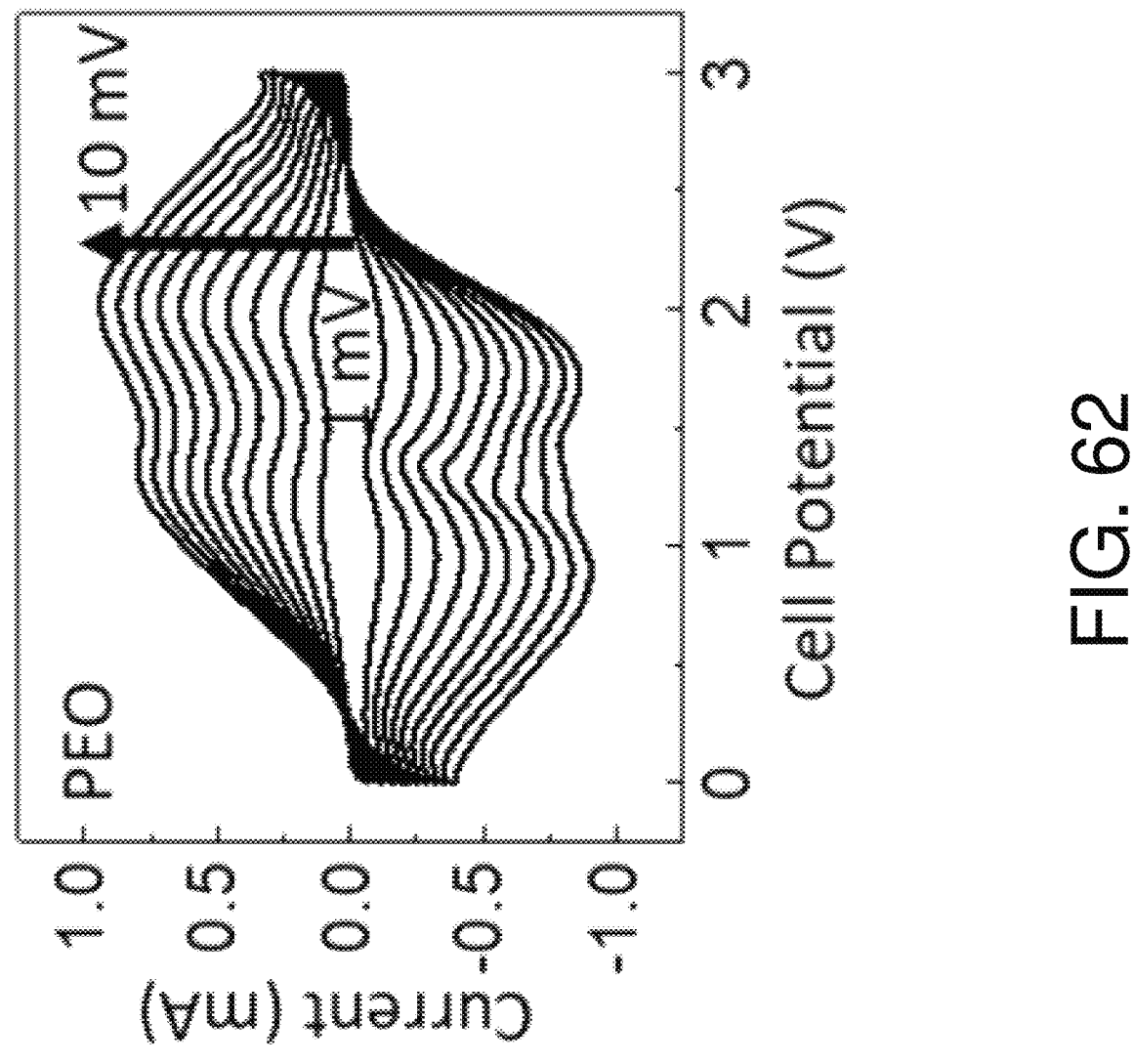
FIGS. 62-64 depict example graphs illustrating data from example experiments carried out in accordance with embodiments of the disclosed technology.
Figure 63:
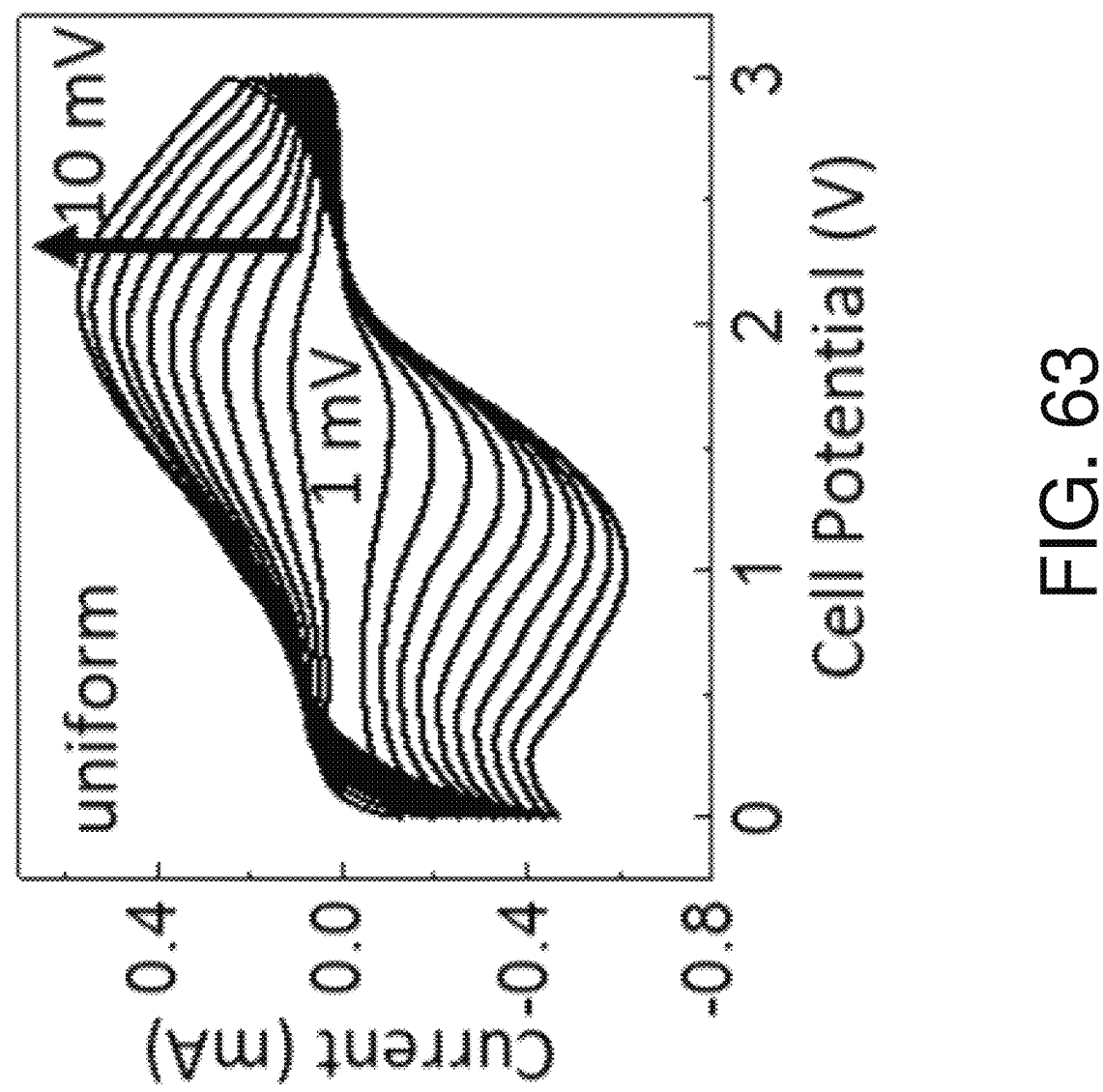
Figure 64:
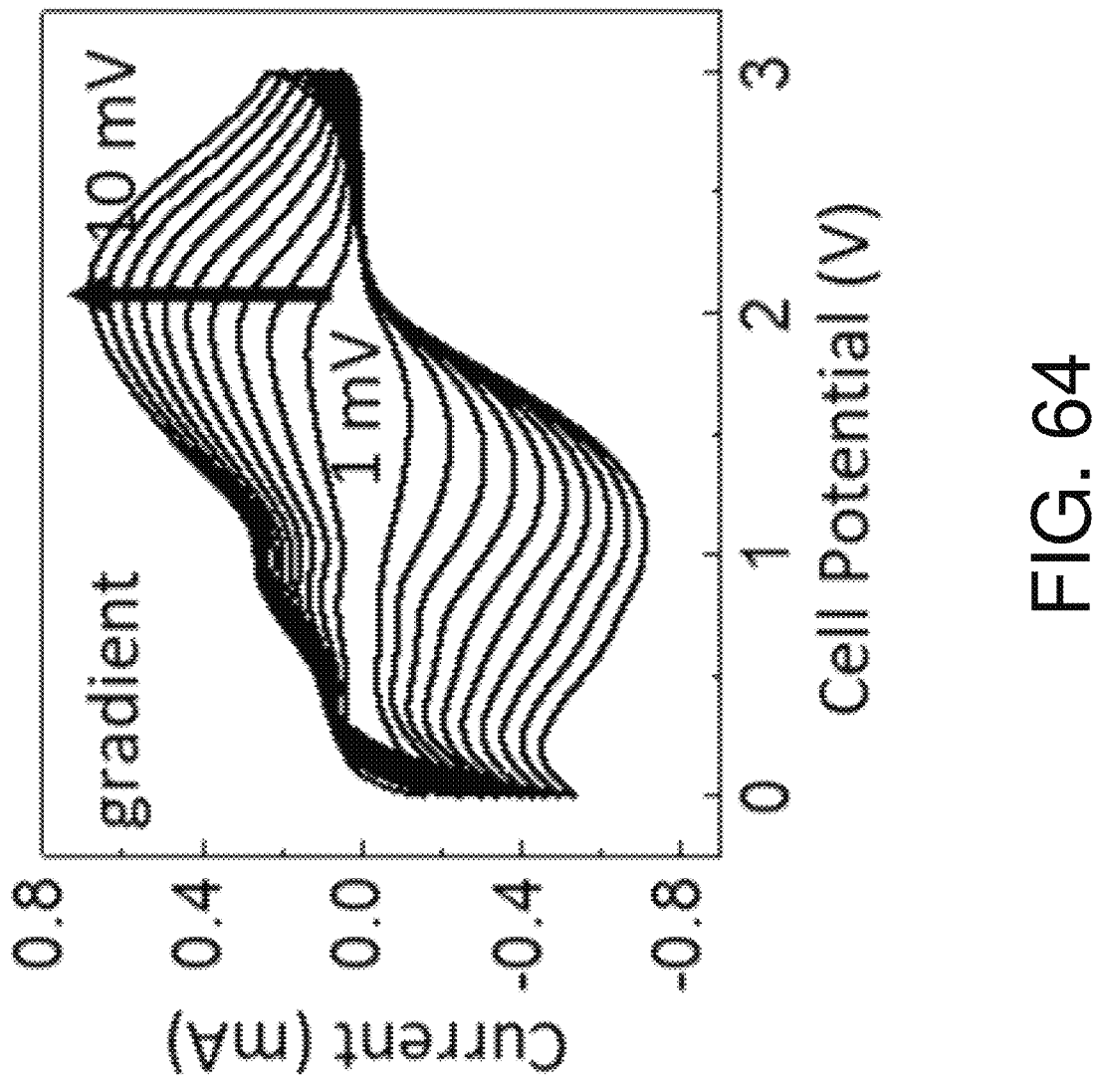

FIGS. 62-64 depict example graphs illustrating data from example experiments carried out in accordance with embodiments of the disclosed technology. Namely, FIG. 62 depicts CV curves of supercapacitors with PEO only. FIG. 63 depicts CV curves of supercapacitors with uniform structural electrolyte. FIG. 64 depicts CV curves of supercapacitors with gradient structural electrolyte.

Figure 65:
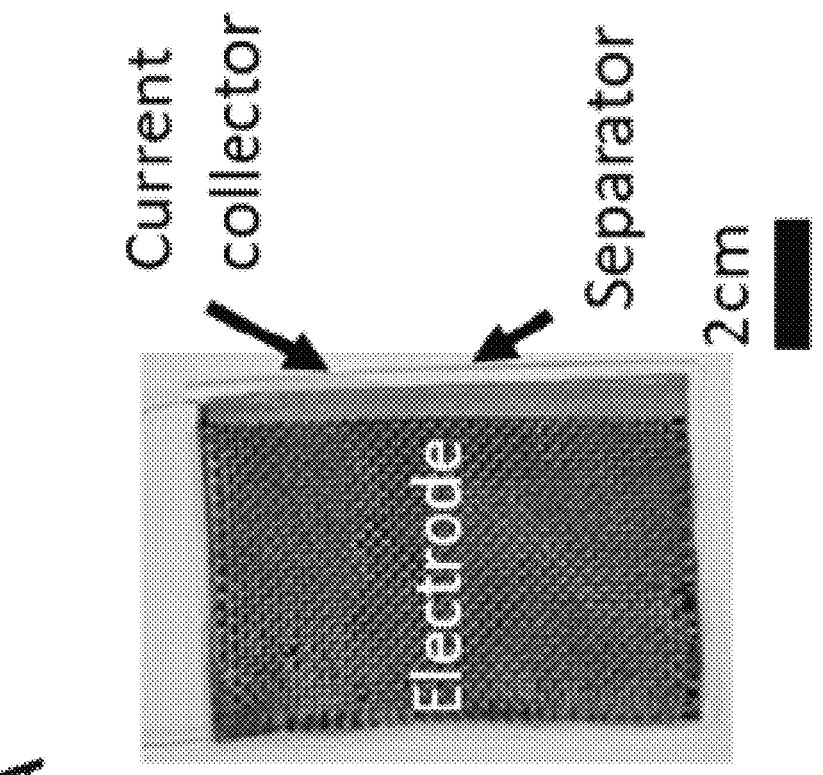
FIG. 65 depicts a photograph from example experiments carried out in accordance with embodiments of the disclosed technology.

FIG. 65 depicts a photograph from example experiments carried out in accordance with embodiments of the disclosed technology. Namely FIG. 65 depicts an example structural supercapacitor of the present technology.

Figure 66:
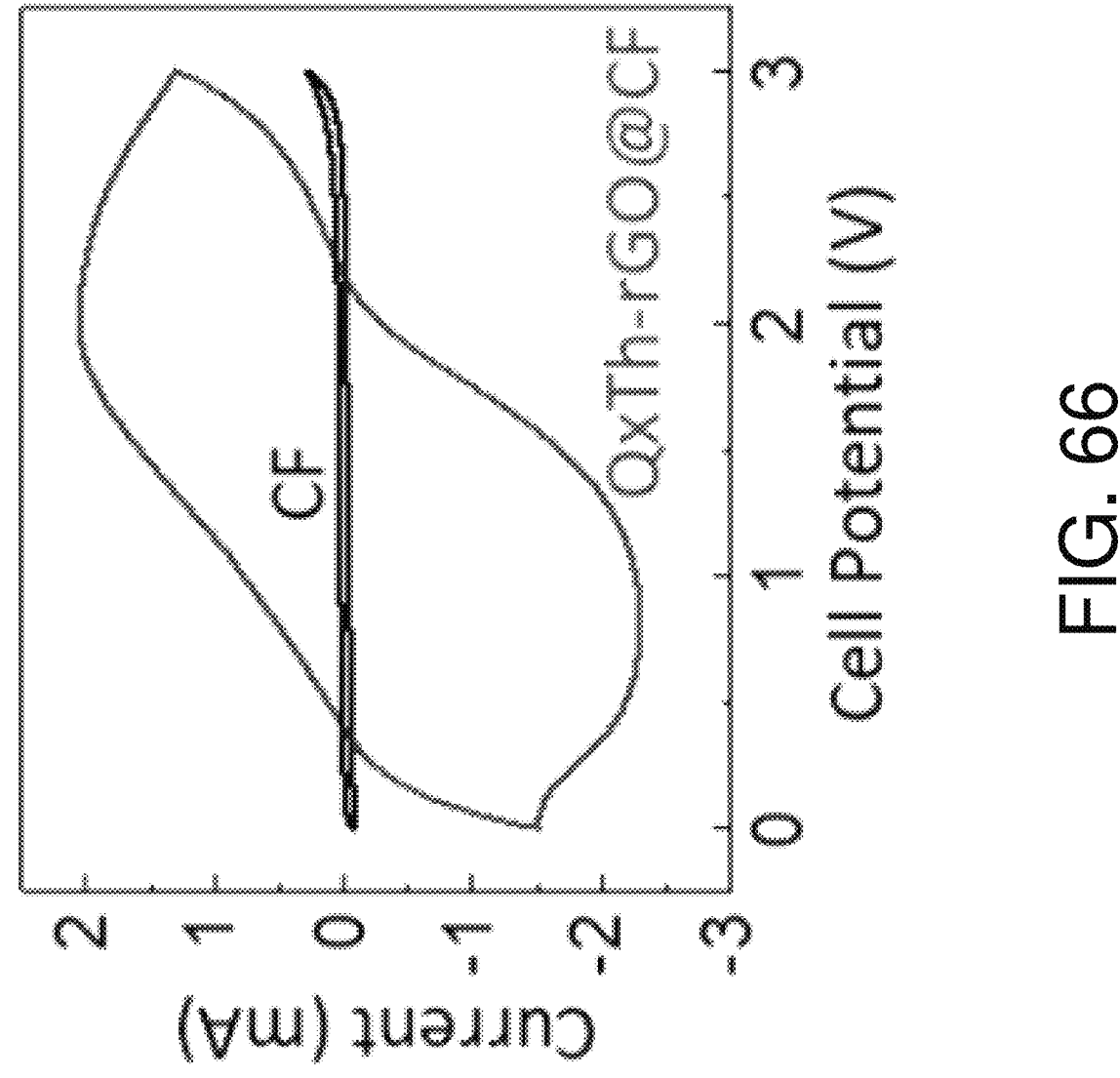
FIGS. 66-72 depicts example graphs illustrating data from example experiments carried out in accordance with embodiments of the disclosed technology.
Figure 67:
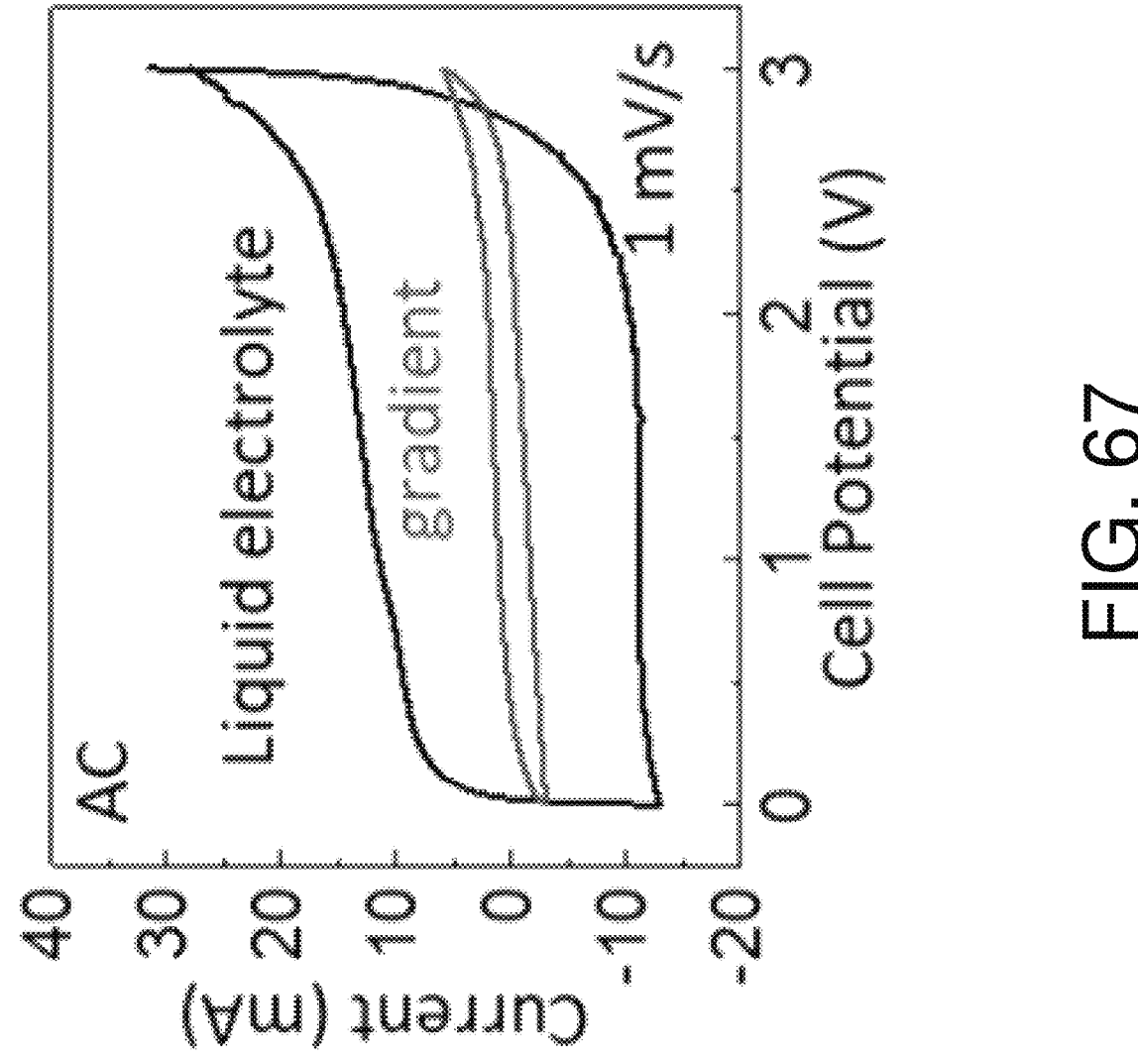
Figure 68:
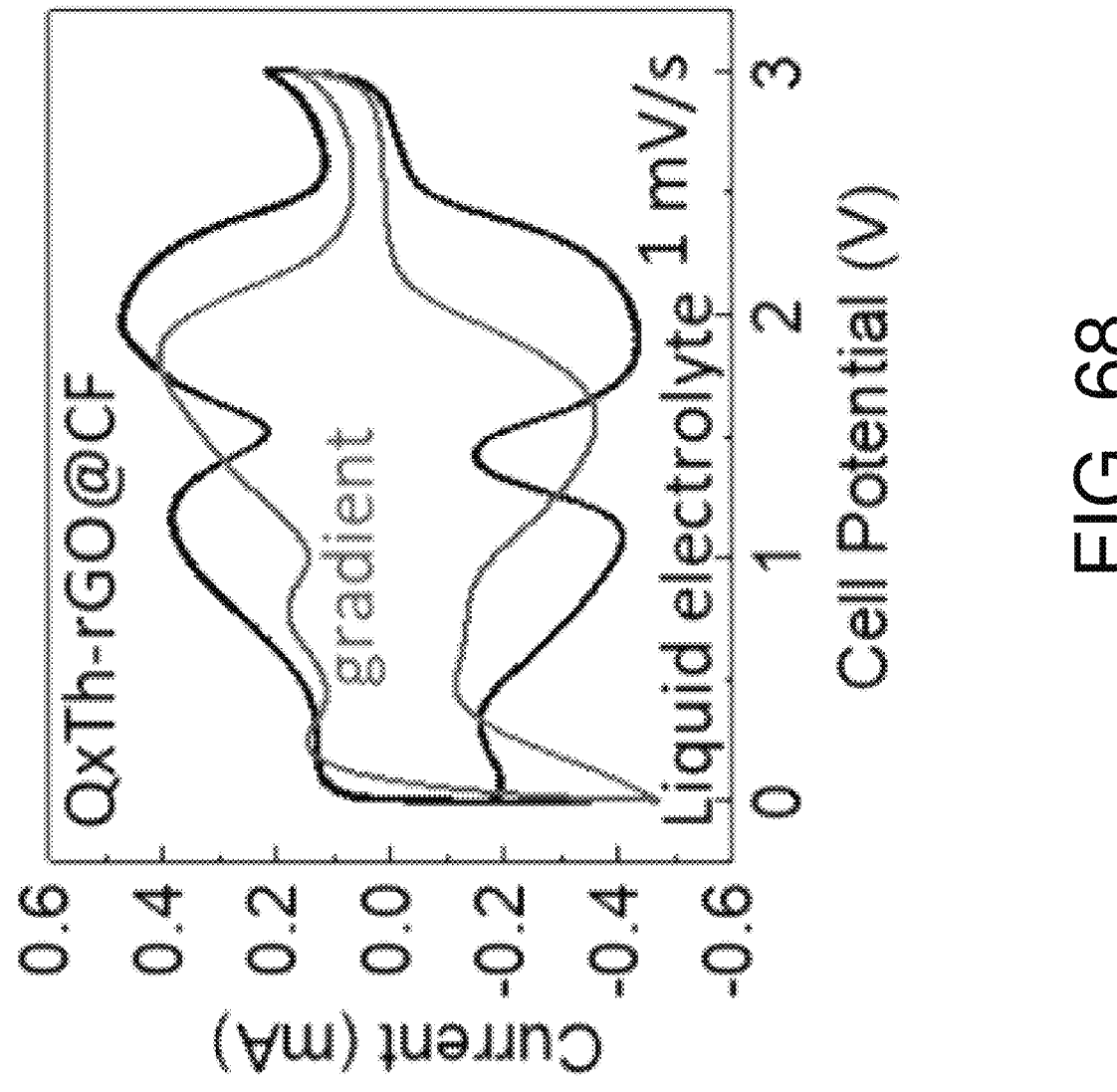
Figure 69:
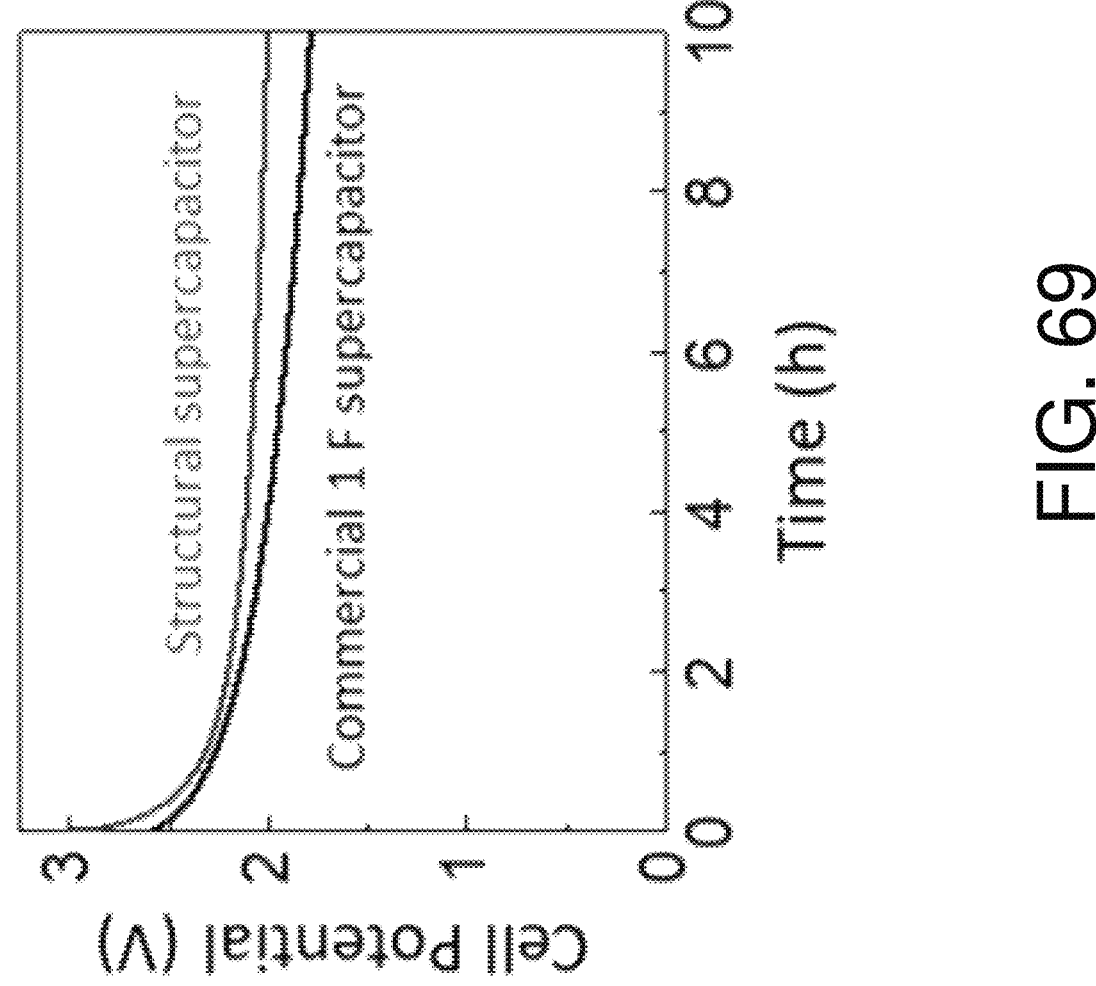
Figure 70:
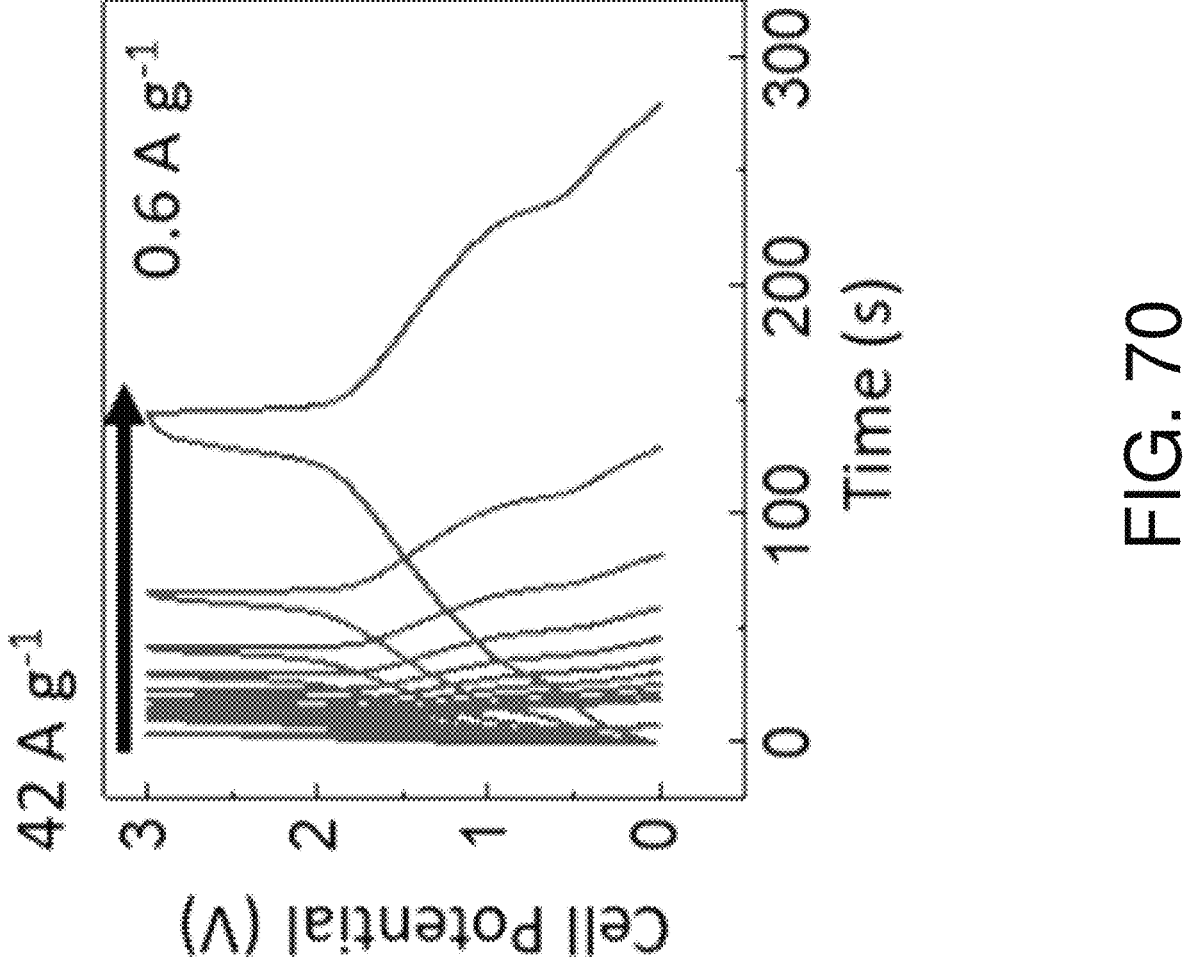
Figure 71:
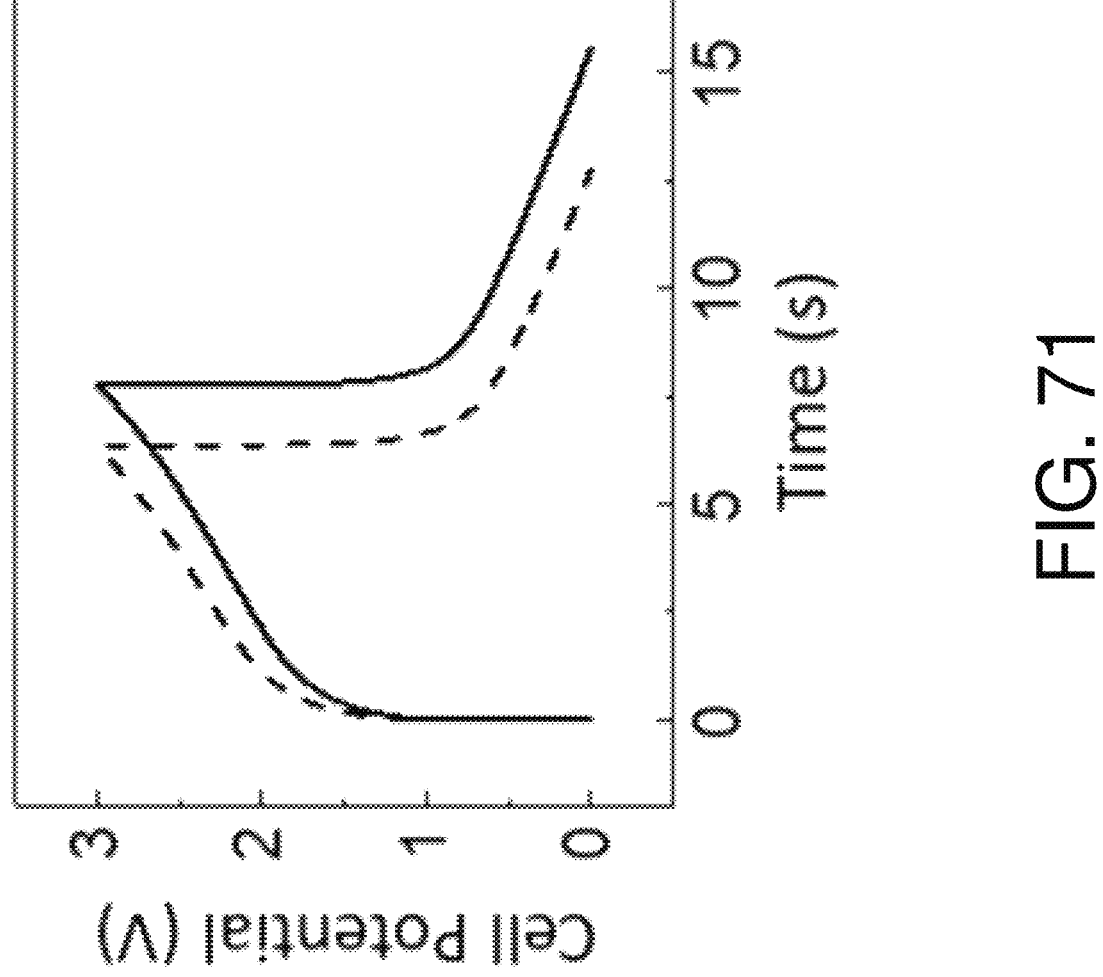

FIGS. 66-72 depicts example graphs illustrating data from example experiments carried out in accordance with embodiments of the disclosed technology. Namely, FIG. 66 depicts CV curves of structural supercapacitors with pristine CF or poly-QxTh-rGO@CF electrodes at 20 mV $\text{s}^{-1}$. FIG. 67 depicts CV characteristics of supercapacitors of the present technology with activated carbon electrodes. FIG. 68 depicts CV characteristics of supercapacitors of the present technology with poly-QxTh-rGO@CF electrodes in liquid electrolyte of 0.5 M $\text{TEABF}_4$ in PC or a gradient solid-polymer electrolyte configuration of the present technology. FIG. 69 depicts self-discharge performance of a structural supercapacitor of the present technology and a commercial supercapacitor. The supercapacitors were held at 3 V for 1 hr before the start of this self-discharge measurement. FIG. 70 depicts GCD curves from 0.6 A $\text{g}^{-1}$ to 42 A $\text{g}^{-1}$ of the structural supercapacitor of the present technology with the gradient electrolyte. FIG. 71 depicts GCD curves at 42 A $\text{g}^{-1}$ of the structural supercapacitor of the present technology with the gradient electrolyte, after the first cycle (solid line) and 10,000 cycles (dashed line). FIG. 72 depicts electrochemical impedance spectroscopy measured at 1 V bias on the structural supercapacitor of the present technology with the gradient electrolyte.

FIGS. 73A-73B depict an example table 7300 illustrating data from example experiments carried out in accordance with embodiments of the disclosed technology. Namely, table 7300 depicts performance comparison of structural supercapacitors.

FIG. 74 depicts a photograph from example experiments carried out in accordance with embodiments of the disclosed technology. Namely FIG. 74 depicts an a flexural stress measurement.

Figure 75:
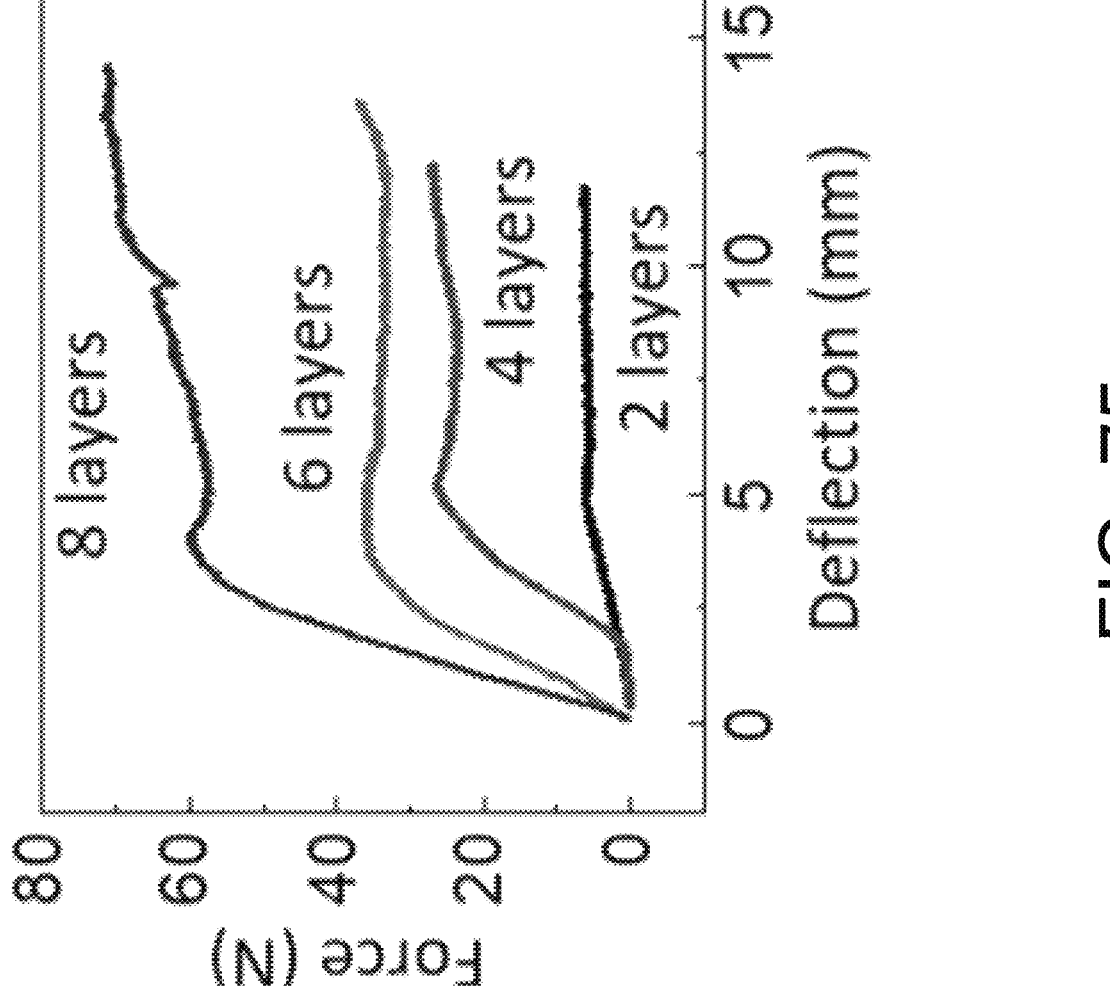
FIGS. 75-76 depict example graphs illustrating data from example experiments carried out in accordance with embodiments of the disclosed technology.
Figure 76:
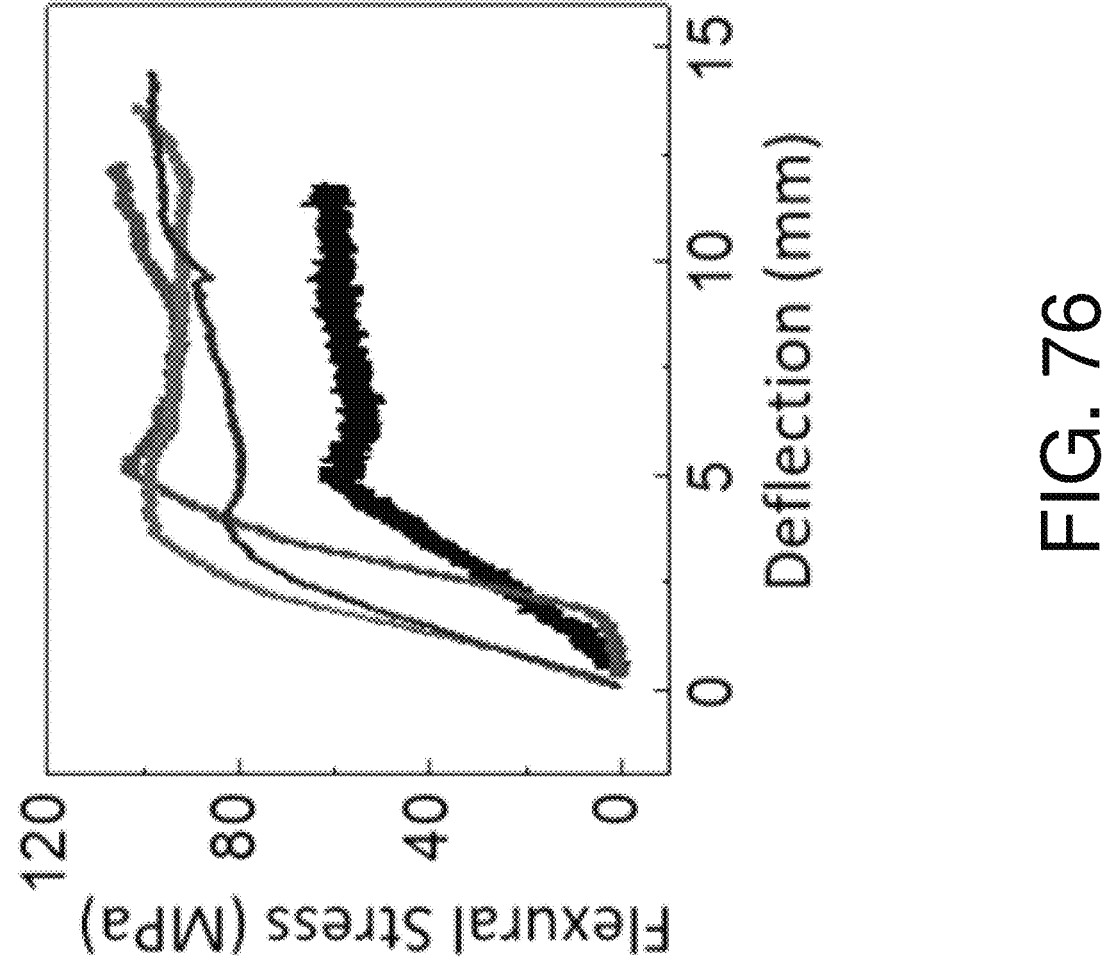

FIGS. 75-76 depict example graphs illustrating data from example experiments carried out in accordance with embodiments of the disclosed technology. Namely, FIG. 75 depicts bending force vs. deflection of poly-QxTh-rGO-CF electrodes. FIG. 76 depicts flexural stress vs. deflection of poly-QxTh-rGO-CF electrodes.

FIG. 77 depicts structures of 2-layer (2L) and 9-layer (9L) supercapacitors, in accordance with various examples of the presently disclosed technology.

Figure 78:
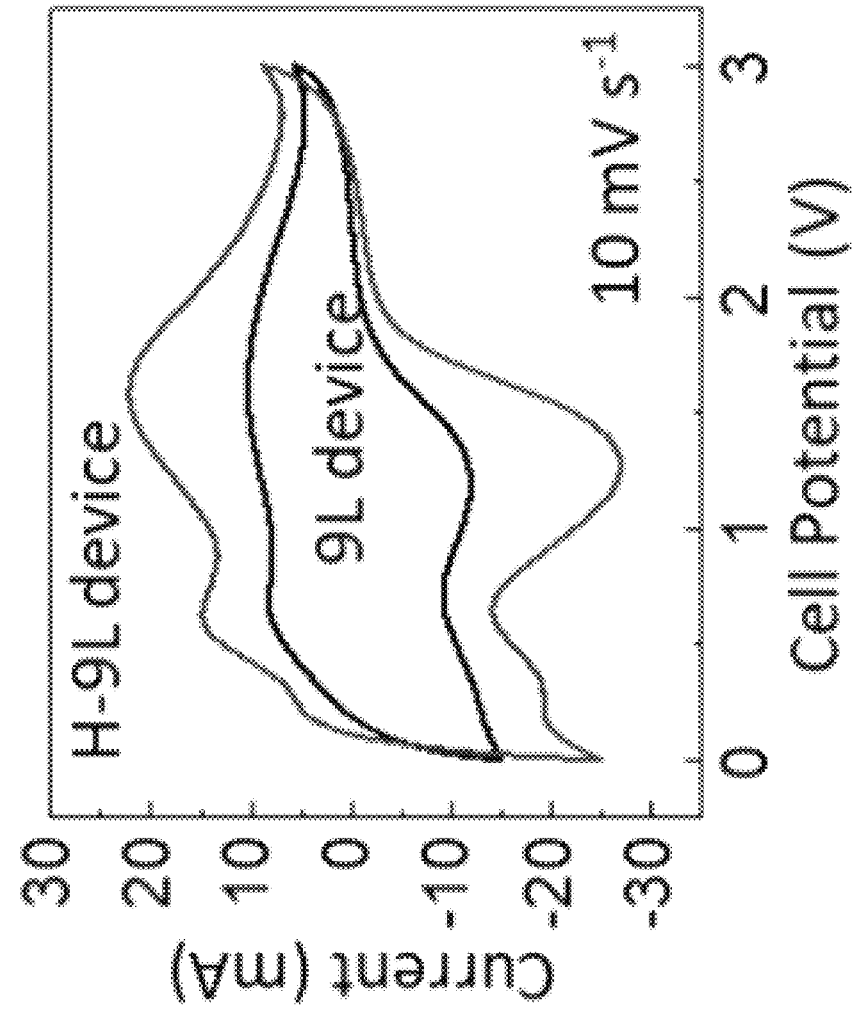
FIGS. 78-80 depict example graphs illustrating data from example experiments carried out in accordance with embodiments of the disclosed technology.
Figure 79:
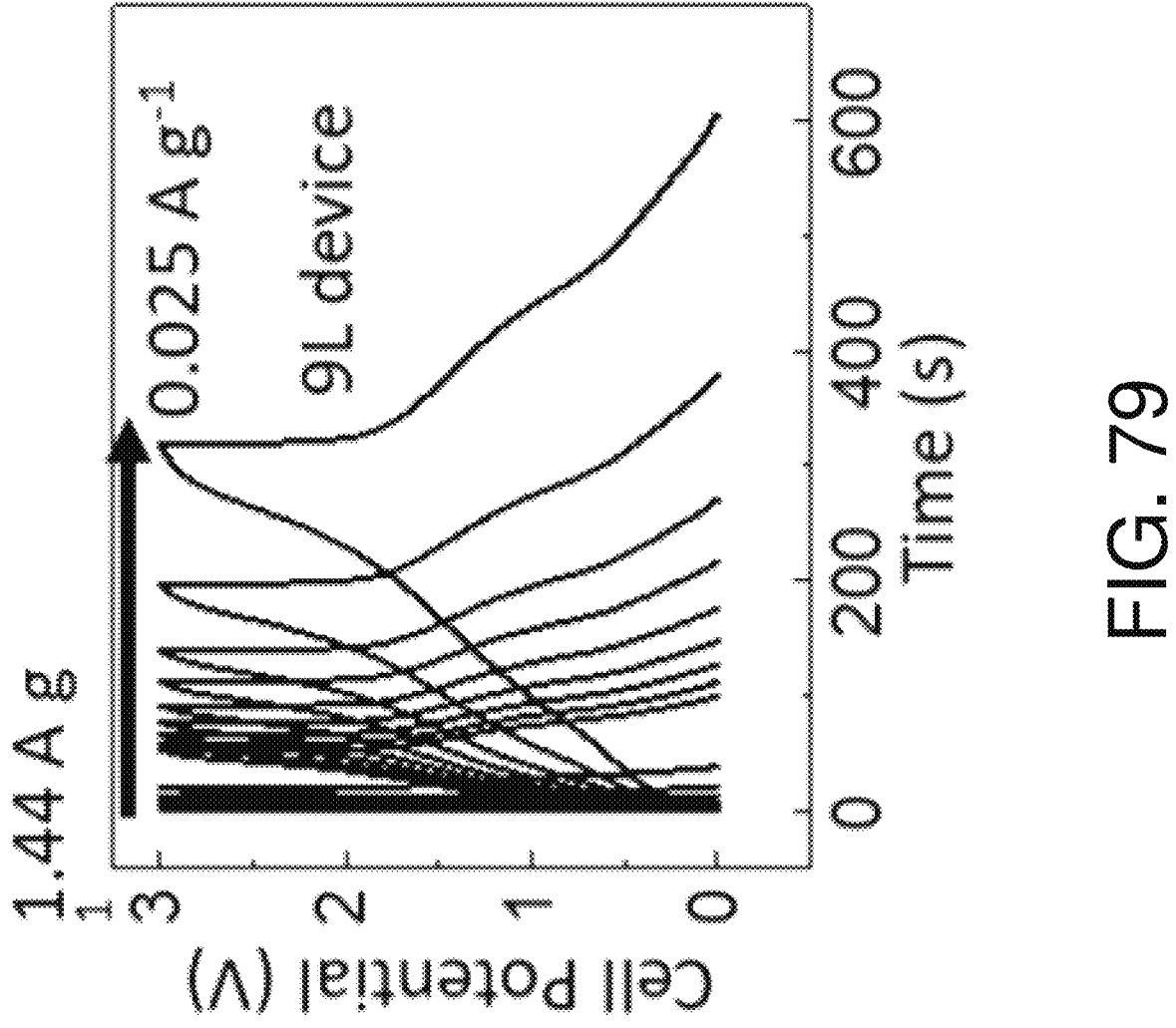
Figure 80:
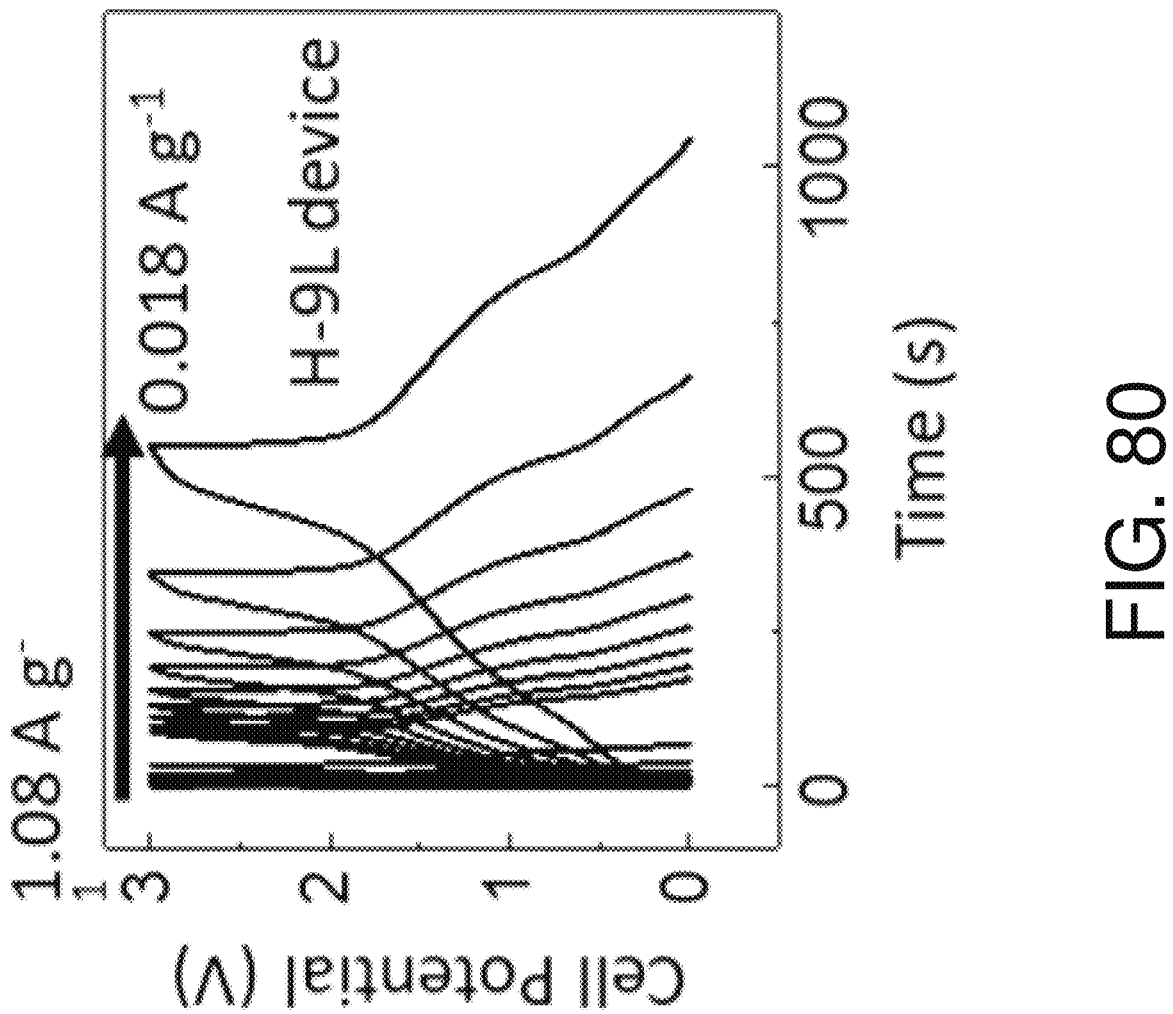

FIGS. 78-80 depict example graphs illustrating data from example experiments carried out in accordance with embodiments of the disclosed technology. Namely, FIG. 78 depicts CV characteristics of 9L and H-9L supercapacitors of the present technology. The H-9L supercapacitor had twice the poly-QxTh-rGO loading compared to the 9L supercapacitor. FIG. 79 depicts GCD curves from 0.025 A $g^{-1}$ to 1.44 A $g^{-1}$ of the 9-layer structural supercapacitor with gradient electrolyte. FIG. 80 depicts GCD curves from 0.018 A $g^{-1}$ to 1.08 A $g^{-1}$ of H-9L structural supercapacitor with the gradient electrolyte.

Figure 81:
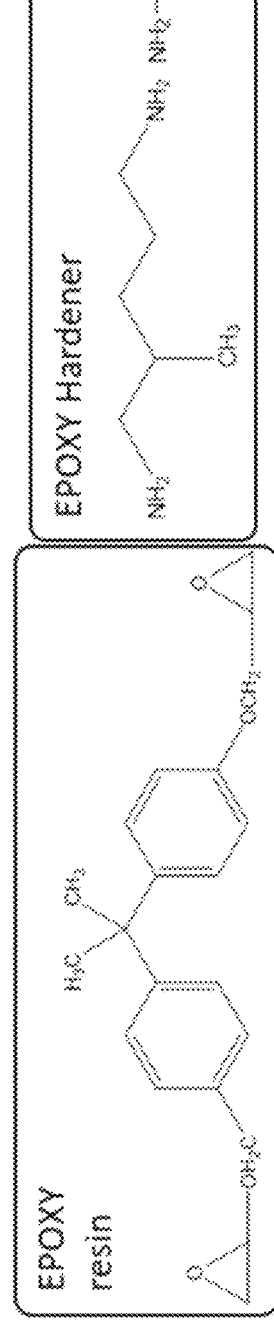
FIG. 81 depicts chemical structures of infusion epoxy for sealing an example structural supercapacitor boat hull fabricated in accordance with embodiments of the presently disclosed technology.

FIG. 81 depicts chemical structures of infusion epoxy for sealing the example structural supercapacitor boat hull fabricated in accordance with embodiments of the presently disclosed technology.

FIG. 82 depicts an example sealing process to encapsulate the structural supercapacitor boat hull, in accordance with embodiments of the presently disclosed technology. As depicted, a vacuum bag was used to shape the boat and de-gas the infusion epoxy. After curing overnight at room temperature, the boat hull was released from the vacuum bag.

FIGS. 83A-83B depict example circuit diagrams and an example photograph, in accordance with embodiments of the presently disclosed technology. Namely, FIGS. 83A-83B depict circuit diagrams and a photograph of the control circuit for the structural supercapacitor boat hull. Power consumption was 200 uW for the whole circuit.

Figure 84:
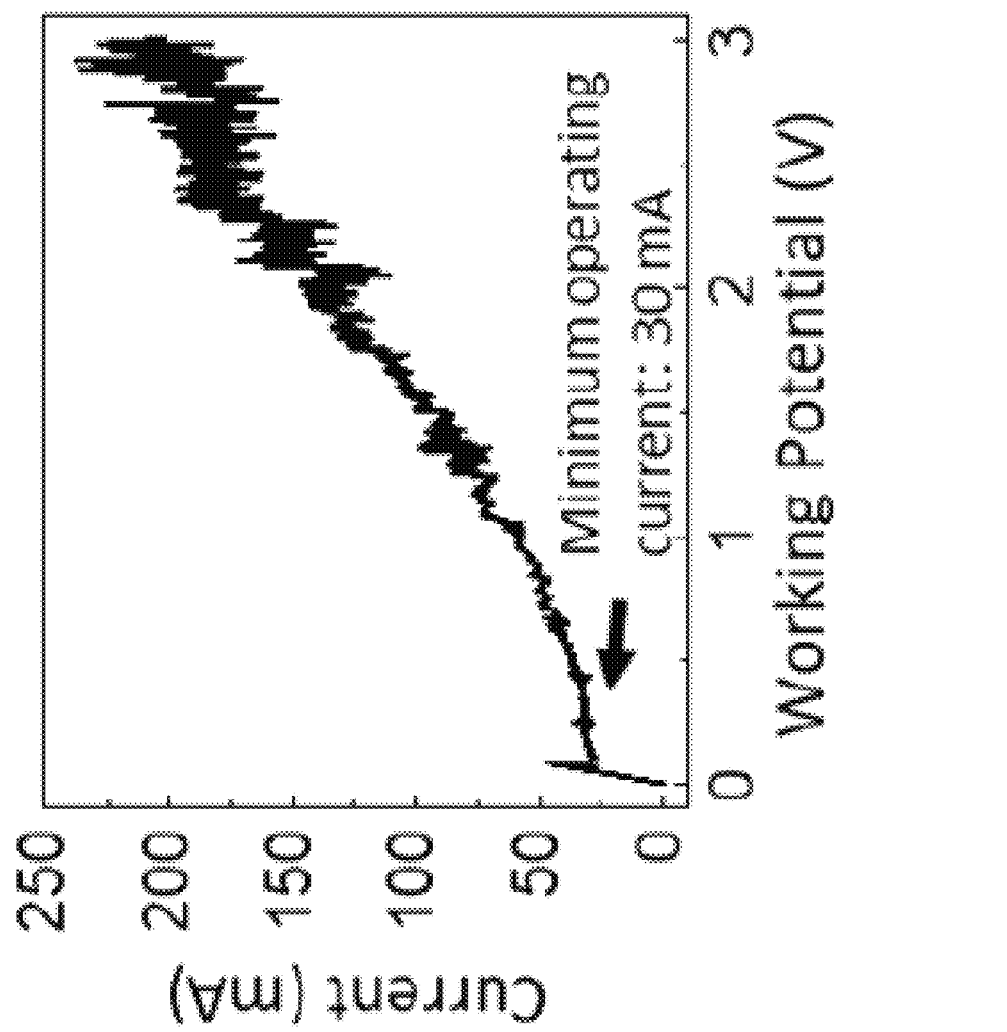
FIGS. 84-88 depict example graphs illustrating data from example experiments carried out in accordance with embodiments of the disclosed technology.
Figure 85:
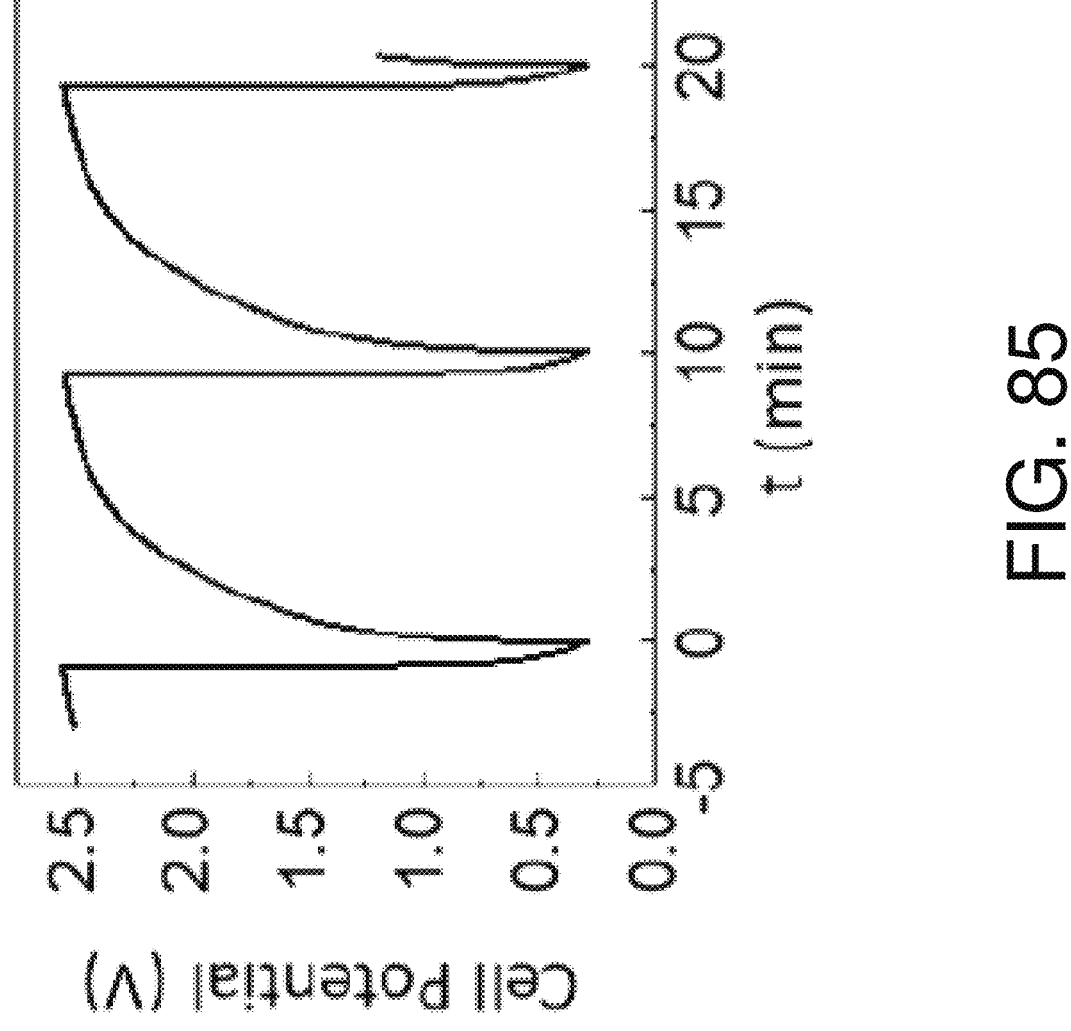
Figure 86:
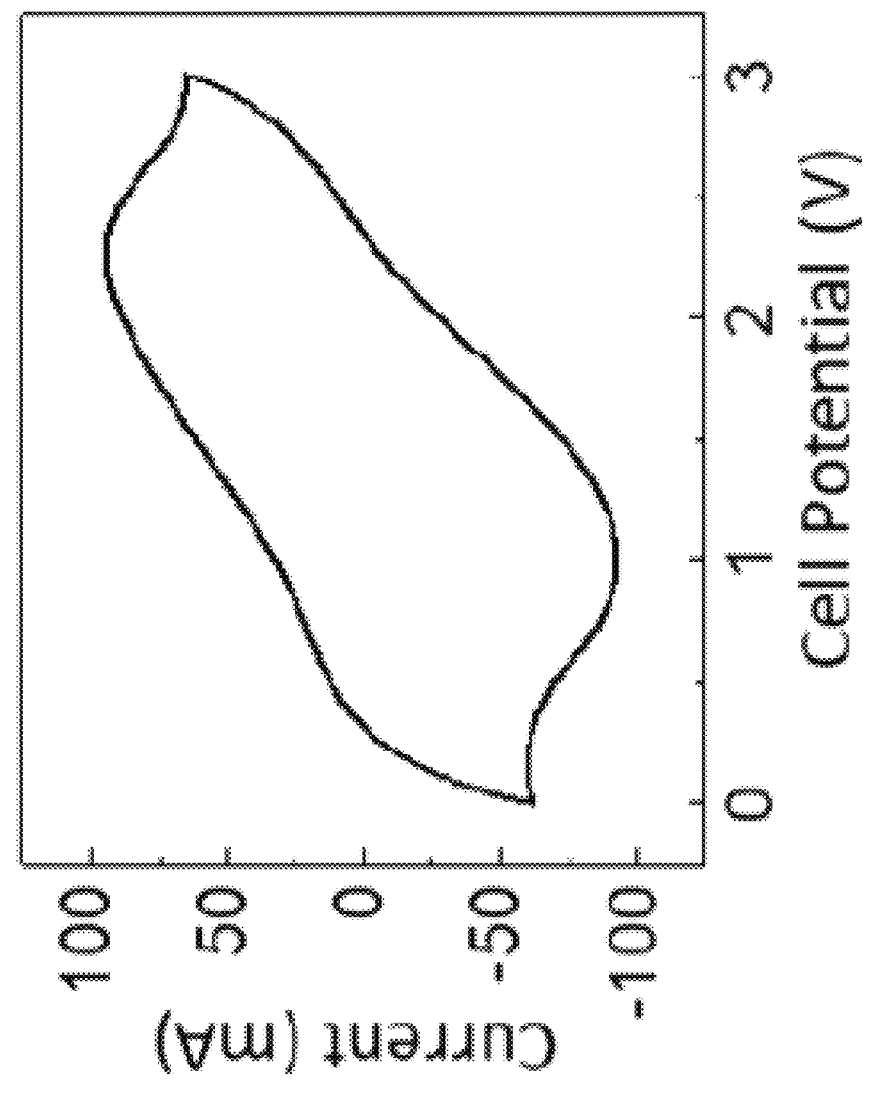

FIGS. 84-88 depict example graphs illustrating data from example experiments carried out in accordance with embodiments of the disclosed technology. Namely, FIG. 84 depicts current versus potential at the boat motor terminals. The minimum operating current for the motor was 30 mA (at 0.1 V potential). The solar panel output 20 mA and thus cannot drive the motor directly but needs the supercapacitor storage to increase the current output to the motor. FIG. 85 depicts charging and discharging of the structural supercapacitor boat hull between 0.3 V and 2.58 V. The charging time to raise the potential from 2.1 V to 2.5 V took a longer time compared to charging to lower potentials, due to the constant-potential charging process with the solar panel. While the structural supercapacitor was stable up to 3 V, it was operated up to 2.1 V to shorten the charging period for the structural supercapacitor boat hull demonstration. FIG. 86 depicts the CV curve at 20 mV s-1, measured on the structural supercapacitor boat hull sealed by infusion epoxy.

Figure 87:
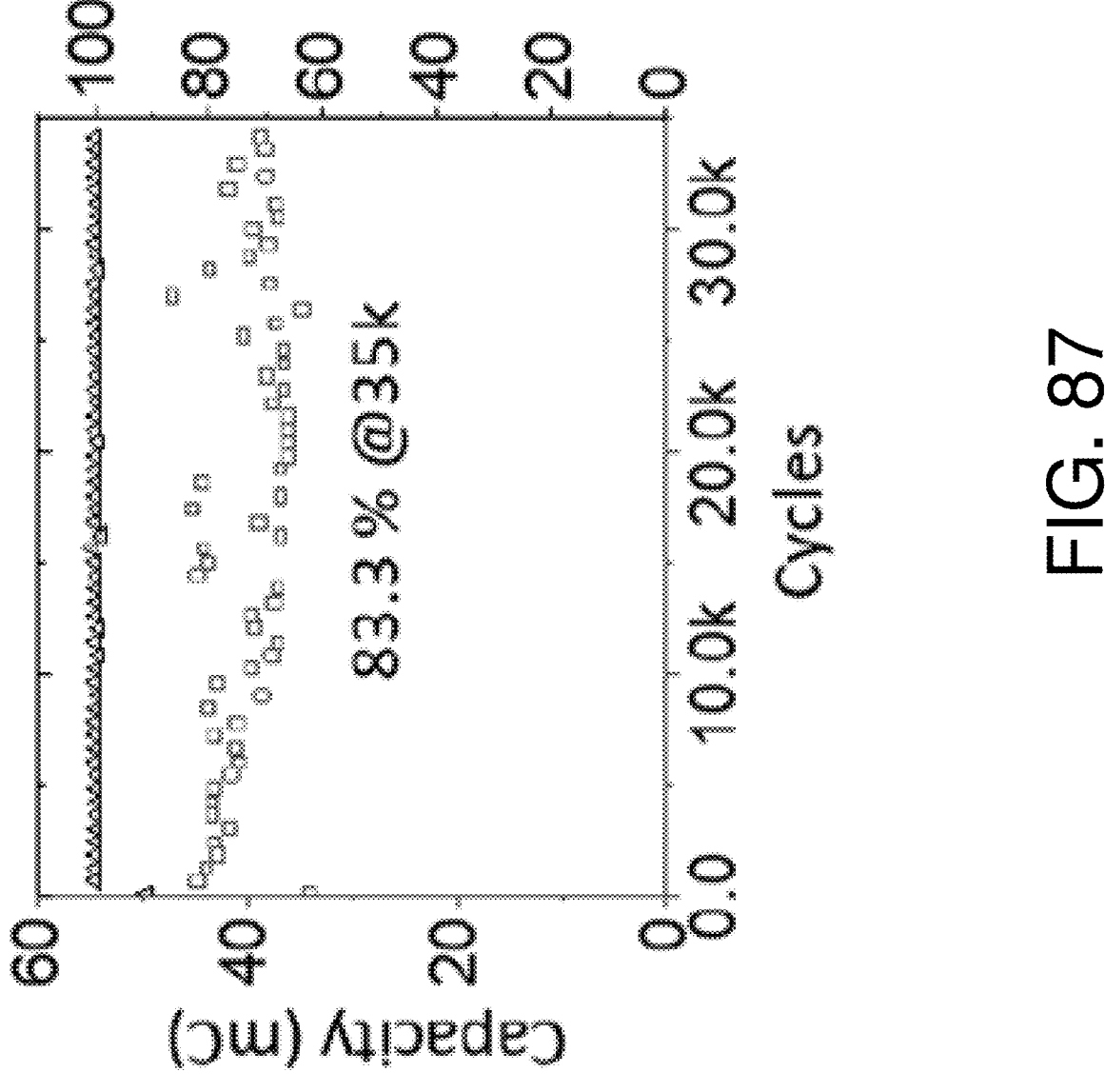
Figure 88:
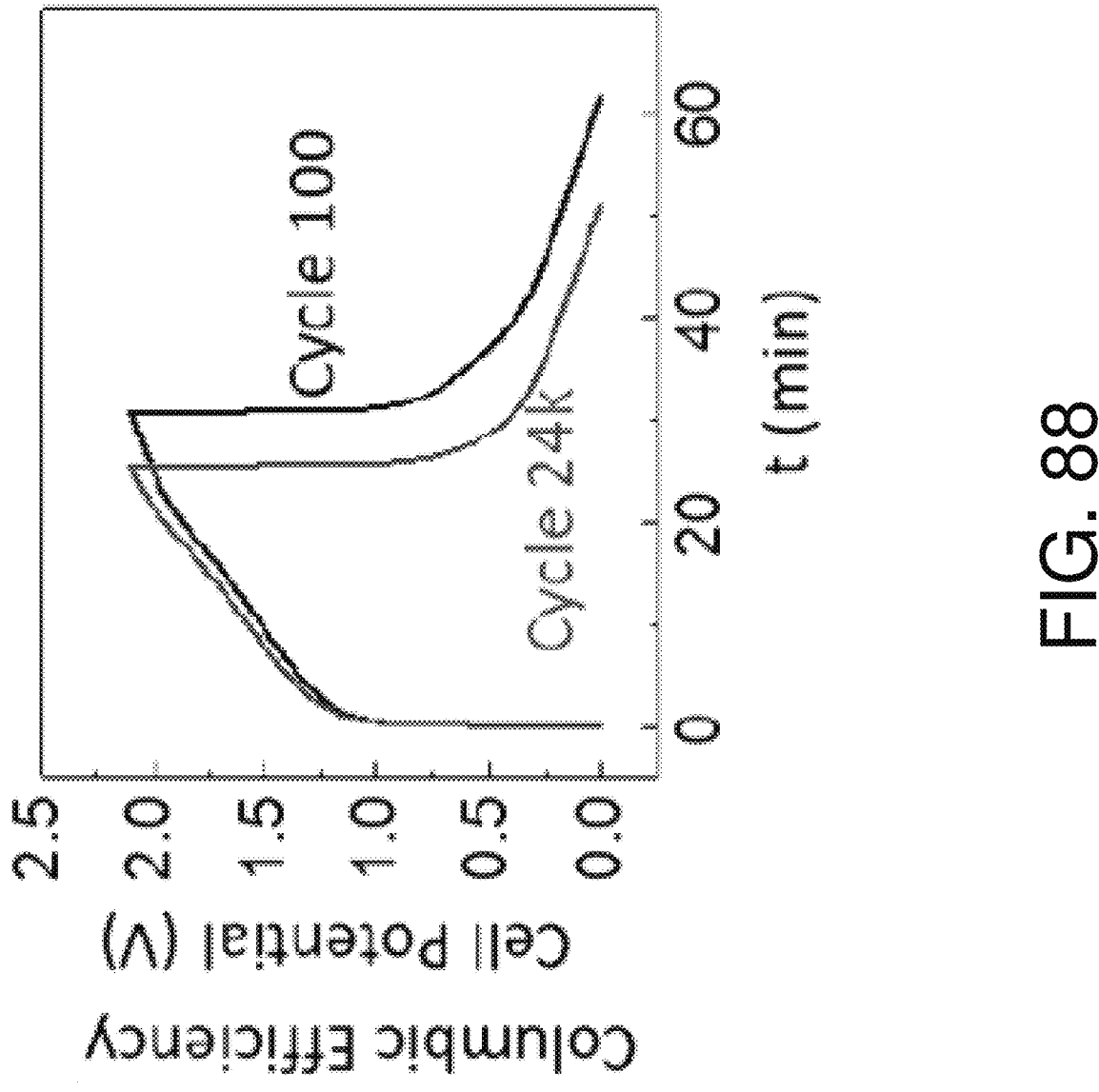

The capacitance was 2.72 F. FIG. 87 depicts capacity retention and Coulombic efficiency of the structural supercapacitor boat hull under charge-discharge cycles of 2.1 V at a current of 1 mA cm$^{-2}$. FIG. 88 depicts GCD curves after 100 and 24,000 redox cycles at 2.1 V.

Figure 89:
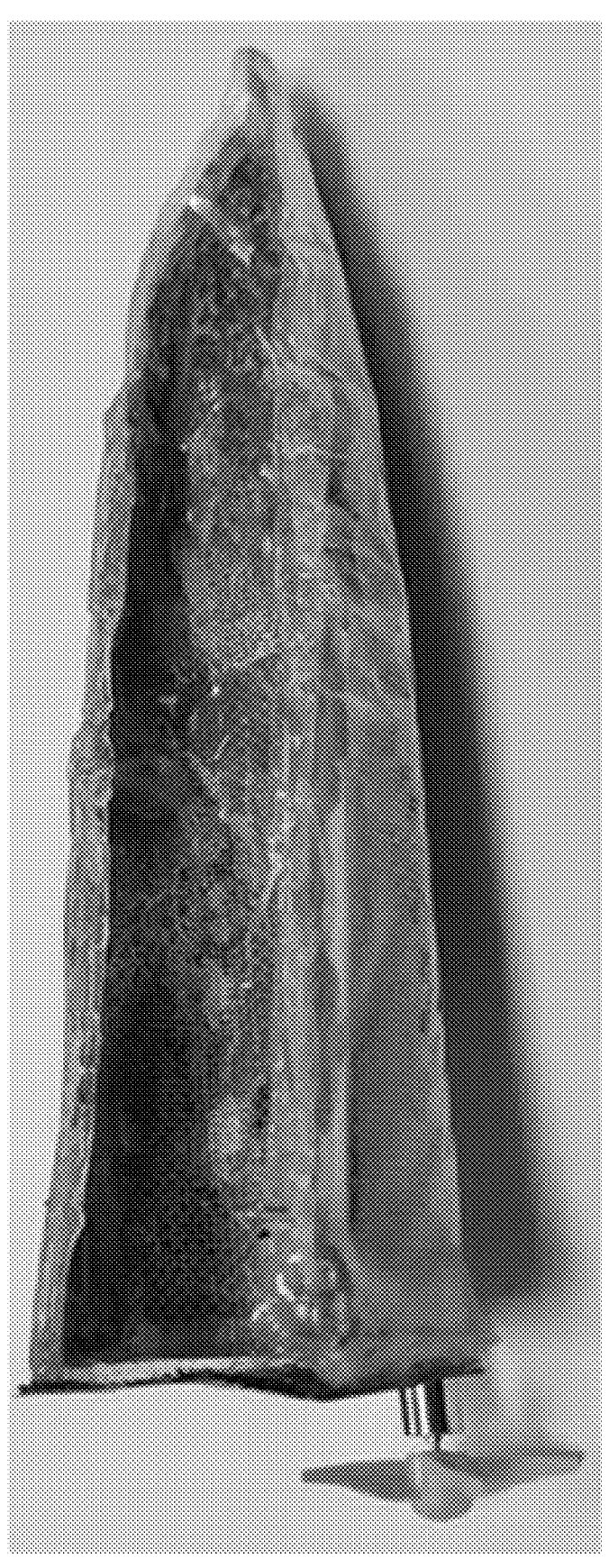
FIG. 89 depicts a photograph from example experiments carried out in accordance with embodiments of the disclosed technology.

FIG. 89 depicts a photograph from example experiments carried out in accordance with embodiments of the disclosed technology. Namely, FIG. 89 depicts a structural supercapacitor boat hull sealed by PET film, which is an alternative encapsulation approach to infusion epoxy (total mass: 12.9 g, including the mass of PET film).

FIG. 90 depicts an example table illustrating data from example experiments carried out in accordance with embodiments of the disclosed technology. Namely, FIG. 90 depicts specific masses and dimensions of electrodes and devices used for calculations of gravimetric capacitance and energy/power densities.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at anytime in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed:

1. A structural supercapacitor comprising:
an electrode comprising a coating material coating a surface of the electrode that interfaces with a structural electrolyte, wherein the coating material comprises a conjugated redox polymer and a carbon-based compound; and
the structural electrolyte comprising an epoxy resin, an ion-conducting polymer, and a salt, wherein concentration of the salt in the structural electrolyte increases with increasing proximity to interfaces between the structural electrolyte and electrodes of the structural supercapacitor.

2. The structural supercapacitor of claim 1, wherein concentration of the ion-conducting polymer increases with increasing proximity to the interfaces between the structural electrolyte and the electrodes of the structural supercapacitor.

3. The structural supercapacitor of claim 1, wherein the conjugated redox polymer comprises a stable conjugated open shell redox polymer.

4. The structural supercapacitor of claim 3, wherein the stable conjugated open shell redox polymer comprises alternating bithiophene donors and thiophene substituted thiadiazoloquinoxaline acceptors.

5. The structural supercapacitor of claim 3, wherein the stable conjugated open shell redox polymer comprises poly-4,6,7,9-tetra(thiophen-2-yl)-[1,2,5]thiadiazolo[3,4-g]quinoxaline (poly-QxTh).

6. The structural supercapacitor of claim 5, wherein the carbon-based compound comprises reduced graphene oxide (rGO).

7. The structural supercapacitor of claim 1, wherein the electrode further comprises a core structure comprising a carbon fiber-based material.

8. The structural supercapacitor of claim 1, wherein the ion-conducting polymer comprises polyethylene oxide (PEO).

9. The structural supercapacitor of claim 1, further comprising a second structural electrolyte, wherein:
the coating material also coats a surface of the electrode that interfaces with the second structural electrolyte; and
the second structural electrolyte comprises the epoxy resin, the ion-conducting polymer, and the salt, wherein concentration of the salt within the second structural electrolyte increases with increasing proximity to interfaces between the second structural electrolyte and the electrodes of the structural supercapacitor.

10. A structural electrode comprising:
a core structure; and
a coating material coating a surface of the structural electrode that interfaces with a structural electrolyte, wherein the coating material comprises a conjugated redox polymer and a carbon-based compound.

11. The structural electrode of claim 10, wherein the conjugated redox polymer comprises a stable conjugated open shell redox polymer.

12. The structural electrode of claim 11, wherein the stable conjugated open shell redox polymer comprises alternating bithiophene donors and thiophene substituted thiadiazoloquinoxaline acceptors.

13. The structural electrode of claim 11, wherein the stable conjugated open shell redox polymer comprises poly-4,6,7,9-tetra(thiophen-2-yl)-[1,2,5]thiadiazolo[3,4-g]quinoxaline (poly-QxTh).

14. The structural electrode of claim 13, wherein the carbon-based compound comprises reduced graphene oxide (rGO).

15. The structural electrode of claim 14, wherein a ratio of poly-QxTh to rGO in the coating material is between 3:1 and 1:1.

16. The structural electrode of claim 10, wherein the core structure comprises a carbon fiber-based material.

17. A structural electrolyte comprising:
an epoxy resin;
an ion-conducting polymer; and
a salt;
wherein concentrations of the ion-conducting polymer and the salt in the structural electrolyte increase with increasing proximity to interfaces between the structural electrolyte and one or more electrodes.

18. The structural electrolyte of claim 17, wherein the concentrations of the ion-conducting polymer and the salt increase as gradients between a middle region of the structural electrolyte and the interfaces between the structural electrolyte and the one or more electrodes.

19. The structural electrolyte of claim 17, wherein:
concentration of the ion-conducting polymer in a middle region of the structural electrolyte is between 8% and 10% by weight; and
concentration of the salt in the middle region of the structural electrolyte is between 2% and 8% by weight.

20. The structural electrolyte of claim 17, wherein the ion-conducting polymer comprises polyethylene oxide (PEO).

\* \* \* \* \*